US012262429B2

(12) United States Patent
Freda et al.

(10) Patent No.: US 12,262,429 B2
(45) Date of Patent: Mar. 25, 2025

(54) DEVICE TO DEVICE RELAY CONNECTION ESTABLISHMENT AND CONFIGURATION

(71) Applicant: InterDigital Patent Holdings, Inc., Wilmington, DE (US)

(72) Inventors: Martino Freda, Laval (CA); Jaya Rao, Montreal (CA); Tuong Hoang, Montreal (CA); Tao Deng, New York, NY (US); Moon Il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/778,299

(22) Filed: Jul. 19, 2024

(65) Prior Publication Data

US 2024/0373486 A1    Nov. 7, 2024

Related U.S. Application Data

(63) Continuation of application No. 17/917,633, filed as application No. PCT/US2021/026398 on Apr. 8, 2021.

(Continued)

(51) Int. Cl.
*H04W 76/14* (2018.01)
*H04W 76/27* (2018.01)
*H04W 88/04* (2009.01)

(52) U.S. Cl.
CPC .......... *H04W 76/14* (2018.02); *H04W 76/27* (2018.02); *H04W 88/04* (2013.01)

(58) Field of Classification Search
CPC ..... H04W 76/14; H04W 76/27; H04W 88/04; H04W 76/23; H04W 92/18
See application file for complete search history.

(56) References Cited

U.S. PATENT DOCUMENTS

| 2021/0243829 A1* | 8/2021 | Paladugu | H04W 76/12 |
| 2022/0295375 A1* | 9/2022 | Wang | H04W 76/14 |
| 2022/0361267 A1* | 11/2022 | Wang | H04W 76/14 |

FOREIGN PATENT DOCUMENTS

| WO | WO-2013086324 A1 * | 6/2013 | .......... H04W 76/023 |
| WO | WO-2016073984 A2 * | 5/2016 | ............ H04W 24/04 |

(Continued)

OTHER PUBLICATIONS

Huawei et al., "Procedures for remote or relay UE in idle mode," S3GPP TSG RAN WG2 Meeting #95bis, R2-166914, Kaohsiung (Oct. 10-14, 2016).

(Continued)

*Primary Examiner* — Thomas R Cairns
(74) *Attorney, Agent, or Firm* — Volpe Koenig

(57) ABSTRACT

There may be one or more systems, methods, and/or devices that address a relay wireless communication scenario. For example, in such a scenario, there may be at least three entities, a remote a wireless transmit receive unit (WTRU) may need to communicate with a network node (e.g., gNB) and/or another WTRU that it cannot directly communicate with. This remote WTRU may communicate with a relay WTRU in order to communicate with the ultimate destination (e.g., another WTRU or a network node). The use of a relay may require establishment and configuration of one or more entities involved.

10 Claims, 13 Drawing Sheets

Related U.S. Application Data

(60) Provisional application No. 63/007,148, filed on Apr. 8, 2020, provisional application No. 63/061,493, filed on Aug. 5, 2020, provisional application No. 63/089,358, filed on Oct. 8, 2020, provisional application No. 63/136,463, filed on Jan. 12, 2021.

(56) References Cited

FOREIGN PATENT DOCUMENTS

| WO | WO-2016164808 A1 | * | 10/2016 | ............. H04B 7/155 |
| WO | WO-2017099833 A1 | * | 6/2017 | |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

Intel Corporation, "Open aspects of UE-to-Network relay connection establishment," 3GPP TSG RAN WG2 Meeting #91, R2-154381, Malmö, Sweden (Oct. 5-9, 2015).

Interdigital Inc., "Connection Establishment and Maintenance for L2 Relays," 3GPP RAN WG2 Meeting #112, electronic, R2-2009203, Online (Nov. 2020).

Interdigital Inc., "Control Plane Aspects for UE to NW Relays," 3GPP RAN WG2 Meeting #112, electronic, R2-2009202, Online (Nov. 2020).

Interdigital Inc., "Discussion and TP on UE to NW Relay Based on L2 Relay Architecture," 3GPP RAN WG2 Meeting #111-e, R2-2006759, Electronic, Aug. 17-28, 2020).

Interdigital Inc., "Discussion and TP on UE to UE Relay Based on L2 Relay Architecture," 3GPP RAN WG2 Meeting #111-e, R2-2006760, Electronic, Aug. 17-28, 2020).

LG Electronics Inc., "RRC connection establishment for idle and connected relay UE," 3GPP TSG-RAN WG2 Meeting #97bis, R2-1703333, Spokane, Washington, USA (Apr. 3-7, 2017).

OPPO, "New SID: Study on NR sidelink relay," 3GPP TSG RAN Meeting #86, RP-193253, Sitges, Spain (Dec. 9-13, 2019).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0 (Dec. 2018).

Third Generation Partnership Project, "Technical Specification Group Radio Access Network; Study on further enhancements to LTE Device to Device (D2D), User Equipment (UE) to network relays for Internet of Things (IoT) and wearables; (Release 15)," 3GPP TR 36.746 V15.1.1 (Apr. 2018).

Third Generation Partnership Project, "Technical Specification Group Radio Access Network; NR; NR and NG-RAN Overall Description; Stage 2 (Release 16)," 3GPP TS 38.300 V16.0.0 (Dec. 2019).

Third Generation Partnership Project, "Technical Specification Group Radio Access Network; NR; Radio Resource Control (RRC) protocol specification (Release 16)," 3GPP TS 38.331 V16.0.0 (Mar. 2020).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.0.0 (Dec. 2019).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.5.0 (Mar. 2021).

Third Generation Partnership Project, "Technical Specification Group Radio Access Network; NR; Radio Resource Control (RRC) protocol specification (Release 16)," 3GPP TS 38.331 V16.4.1 (Mar. 2021).

Third Generation Partnership Project, "Technical Specification Group Radio Access Network; NR; NR and NG-RAN Overall Description; Stage 2 (Release 16)," 3GPP TS 38.300 V16.5.0 (Mar. 2021).

Third Generation Partnership Project, "Technical Specification Group Radio Access Network; NR; NR and NG-RAN Overall Description; Stage 2 (Release 16)," 3GPP TS 38.300 V16.1.0 (Mar. 2020).

* cited by examiner

DEVICE TO DEVICE RELAY CONNECTION ESTABLISHMENT AND CONFIGURATION

CROSS-REFERENCE TO RELATED APPLICATIONS

This application is a continuation of U.S. patent application Ser. No. 17/917,633, filed Oct. 7, 2022, which is the U.S. National Stage, under 35 U.S.C. 371, of International Patent Application No. PCT/US2021/026398, filed Apr. 8, 2021, which claims the benefit of U.S. Provisional Application No. 63/007,148, filed Apr. 8, 2020, U.S. Provisional Application No. 63/061,493, filed Aug. 5, 2020, U.S. Provisional Application No. 63/089,358, filed Oct. 8, 2020, U.S. Provisional Application No. 63/136,463, filed Jan. 12, 2021, the contents of which are incorporated herein by reference.

BACKGROUND

In the field of wireless communication, device-to-device communication may become more important in certain use cases where a connection to the network may not be available or may not be preferred. Accordingly, there is a need for improvements in how device-to-device communication may be carried out.

SUMMARY

There may be one or more systems, methods, and/or devices that address a relay wireless communication scenario. For example, in such a scenario, there may be at least three entities, a remote a wireless transmit receive unit (WTRU) may need to communicate with a network node (e.g., gNB) and/or another WTRU that it cannot directly communicate with. This remote WTRU may communicate with a relay WTRU in order to communicate with the ultimate destination (e.g., another WTRU or a network node). The use of a relay may require establishment and configuration of one or more entities involved.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
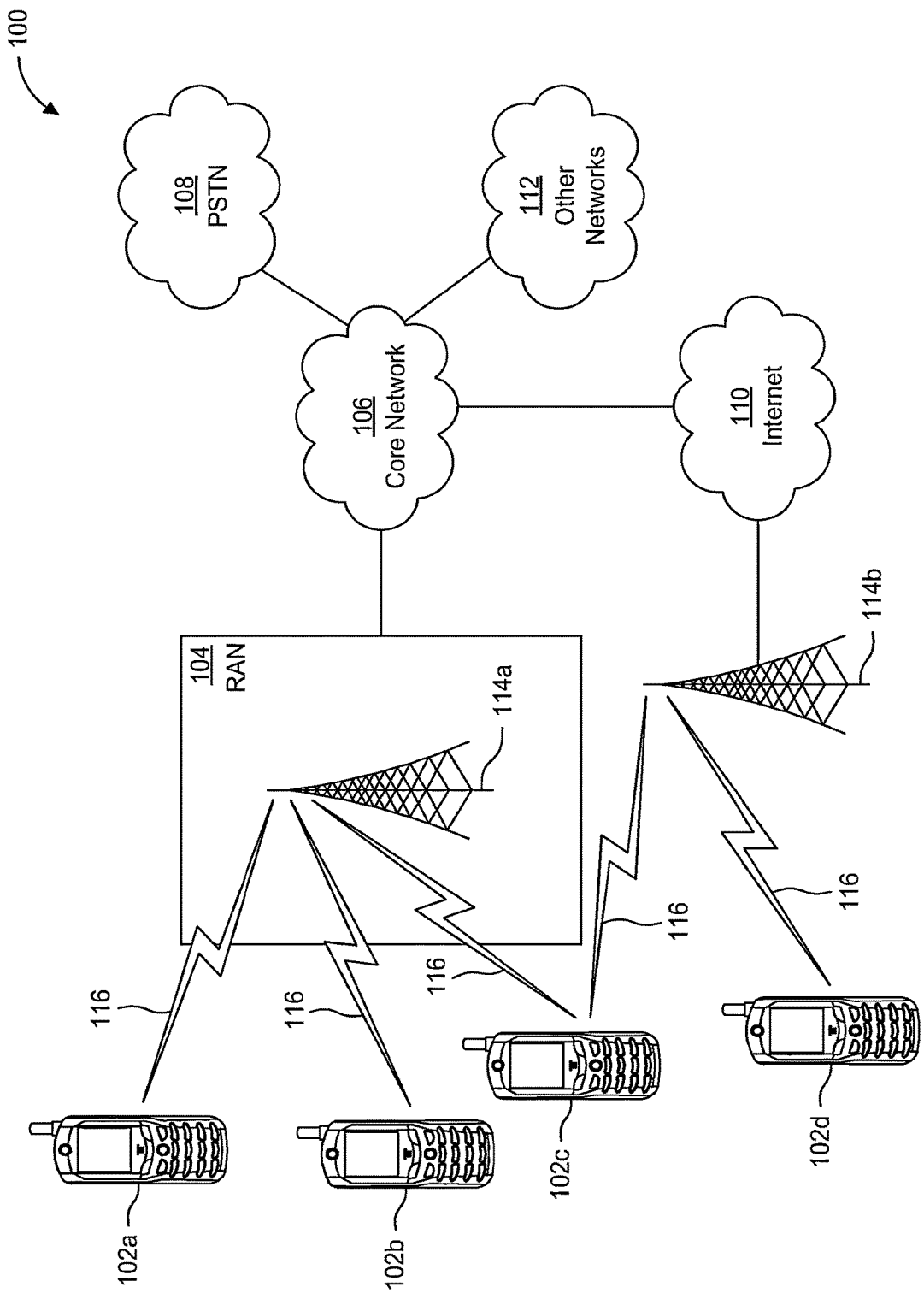
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, networks, and/or elements or nodes of a network. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a network node, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include elements or nodes of the network, such as a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element/node, it will be appreciated that the base stations 114a, 114b may include any number of interconnected base stations and/or network elements/nodes.

The base station 114a may be part of the RAN 104, which may also include other base stations and/or network elements/nodes (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
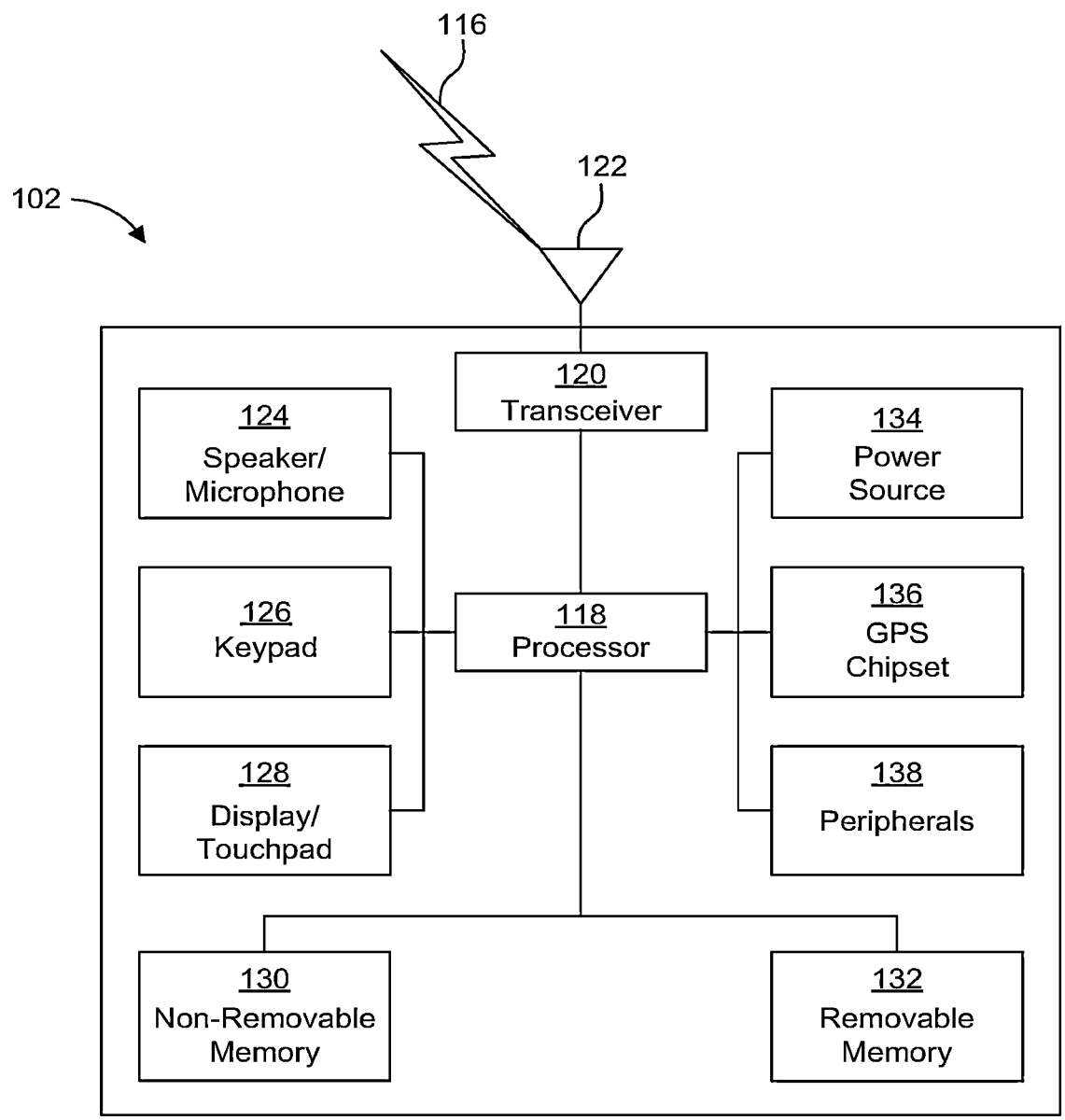
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
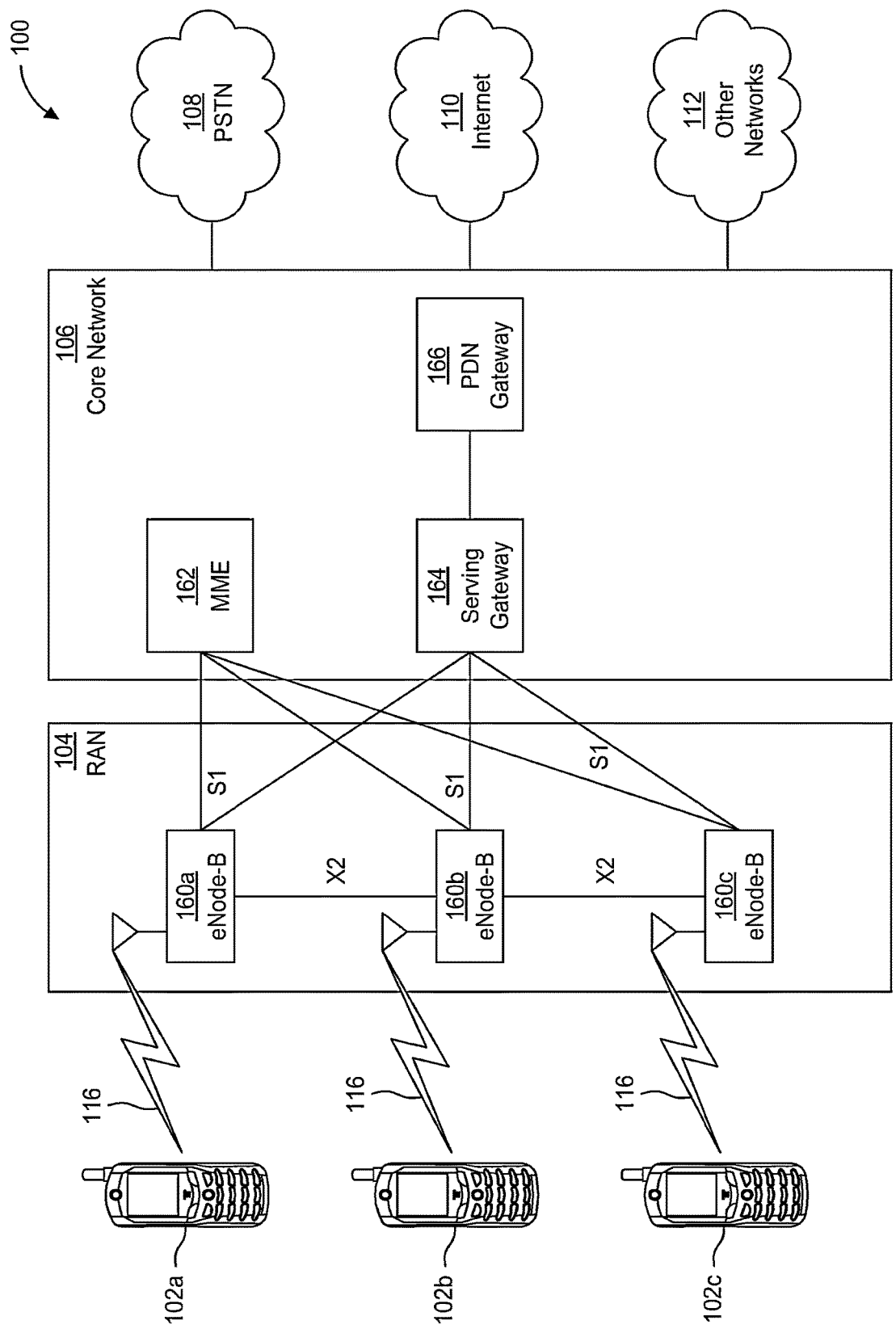
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements/nodes are depicted as part of the CN 106, it will be appreciated that any of these elements/nodes may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
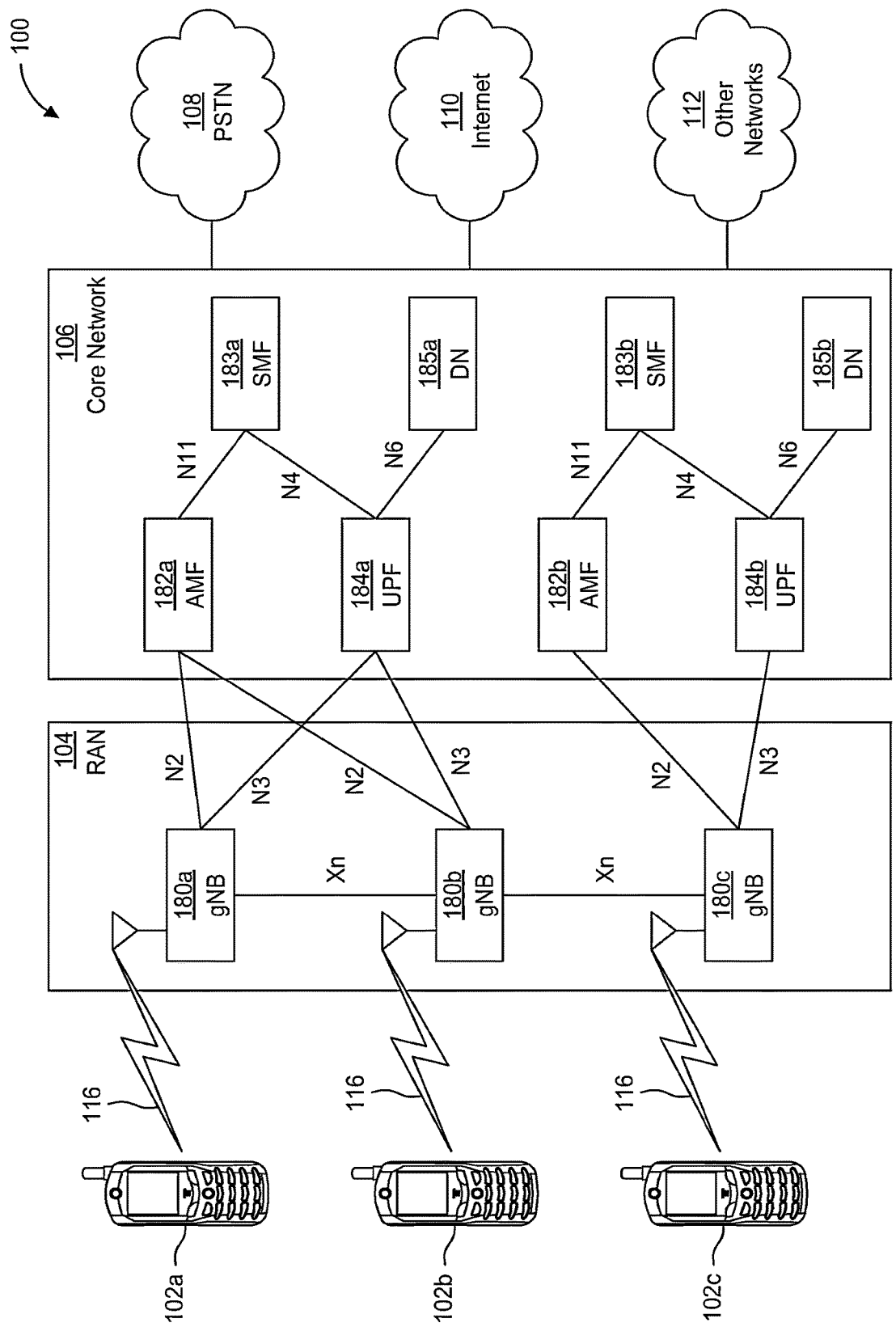
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements/nodes are depicted as part of the CN 106, it will be appreciated that any of these elements/nodes may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

Figure 1E:
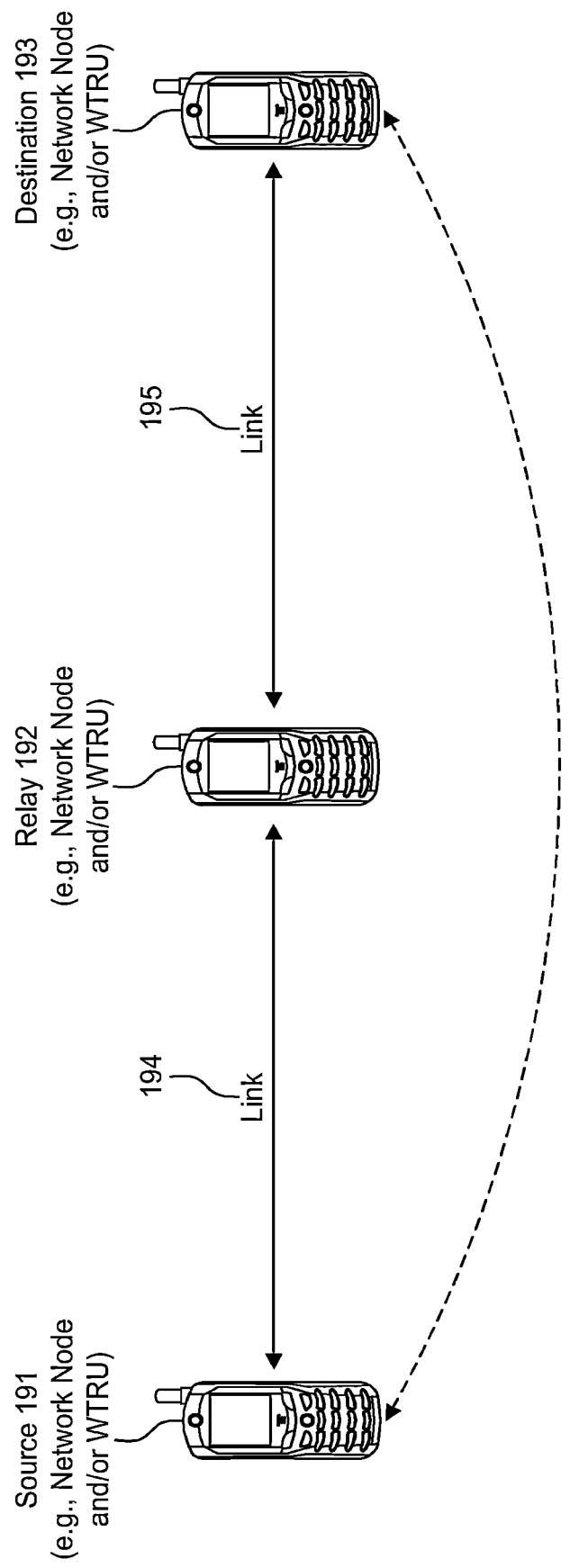
FIG. 1E is a system diagram illustrating an example relay communications system in which one or more disclosed embodiments may be implemented.

FIG. 1E a system diagram illustrating an example relay communications system in which one or more disclosed embodiments may be implemented. The example scenario shown in FIG. 1E may implement any of the example architectures as described herein (e.g., shown in FIGS. 2-8). Generally, for any relay system there are at least three entities involved, a source 191, a relay 192, and a destination 193. Note, that the source 191 may be remote from the destination 193, and in some cases the source or destination may be referred to as a remote entity. The source 191 may communicate with the relay 192 over a first link 194, and the relay 192 may communicate with the destination 193 over a second link 195. Note, while the naming may suggest that the source 191 instigates the communication, the name should not be interpreted as limiting and is for demonstrative purposes only, and communication may be instigated by any entity (e.g., relay 192 and/or destination 193). While not shown, there may be more than one relay 192, which may be represented by relay 192 even though only one entity is shown; further, any description herein may apply to multiple relays, where there would also be links in between each hop between each relay/entity. The multiple relays would facilitate communication between the source 191 and the destination 193. It follows that the links shown are not intended to limit the embodiments described herein to only one connection or one layer of connection for each link, but rather merely to show that communication may occur between the two entities. As discussed herein, one link may be representative of multiple logical links (e.g., SRB, LCH, etc.); as discussed herein, SRB and LCH may be interchangeable. The source, relay, and/or destination may be any type of entity, such as a WTRU, a network node (e.g., base station or other functional entity), and/or other entity described herein. In one example, the source 192 may be a first remote WTRU that may need to communicate with a destination 193. The destination 193 may be a network node or a second remote WTRU. In order to facilitate communication between the source 191 and destination 193, a relay 192 may be used (e.g., to bridge a distance that may be too far to allow for communication, or because such a bridge may offer other advantages, such as better bandwidth, lower latency, added security, etc.). As described herein, the source 191 may referred to as a first remote WTRU, the relay 192 as a relay WTRU, and the destination 193 as a second remote WTRU or a network node. Further, a peer WTRU may signify another WTRU than the one being discussed (e.g., a first remote WTRU may send a signal to a peer WTRU, which may by a relay WTRU, a second remote WTRU, etc.). While FIG. 1E shows a direct communication (e.g., unicast), the entities described also apply to multicast or groupcast messages, where there would be more than one source 191 and/or more than one destination 193.

In view of FIGS. 1A-1E, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In one or more embodiments described herein, there may be more than one type of relay. A relay as described herein may facilitates communication between two entities (e.g., a WTRU and a network, or a WTRU and another WTRU). Each entity may be any type of communication device as described herein (e.g., WTRU, network node, or the like). For example, a NR sidelink (SL) relay may use both WTRU-to-Network relay(s) and WTRU-to-WTRU relay(s) based on PC5 (e.g., sidelink). Specifically, NR SL may support vehicle-to-everything (V2X) related road safety services. Further, there may be support for broadcast, groupcast, and unicast communication in both out-of-coverage and in-network coverage scenarios. SL based relay functionality may address SL/network coverage extension and power efficiency improvements in order to handle a wide range of applications and services.

For WTRU-to-Network coverage extension, Uu coverage reachability may be necessary for WTRUs to reach a server in a PDN network or counterpart WTRU which is out of proximity. In some legacy systems regarding WTRU-to-Network relays, there may be have been limitations related to EUTRA-based technologies, and thus these legacy systems may not have been applicable to NR-based systems, for both NG-RAN and NR-based SL communication.

For WTRU-to-WTRU coverage extension, some legacy systems concerning proximity reachability may have been limited to single-hop SL links, either via EUTRA-based or NR-based SL technologies. However, these legacy systems may not have been sufficient for scenarios where there is no Uu coverage, considering the limitations of single-hop SL coverage.

Accordingly, there is a need to expand SL connectivity from legacy systems, and into, for example, more advanced frameworks (e.g., NR frameworks) in order to support new use cases that have more advanced demands (e.g., QoS requirements, latency, bandwidth, etc.).

There may be one or more considerations in designing a more efficient and improved system (e.g., for layer-3 relay and layer 2 relay, RAN2, NR SL Relay, etc.): relay (re) selection criterion and procedure(s); relay/remote WTRU authorization; QoS for relaying functionality; service continuity; security of relayed connection(s); and/or, impact on user plane protocol stack and control plane procedure(s) (e.g., connection management of relayed connection(s)). Also, support for upper layer operations of discovery model/procedure for SL relaying (e.g., assuming no new physical layer channel/signal RAN2) may be considered.

In some cases, a WTRU-to-Network and WTRU-to-WTRU relay may use the same relaying approach. Further, forward compatibility for multi-hop relay support may need to be taken into account. Further, for layer-2 WTRU-to-Network relay(s), the architecture of end-to-end PDCP and hop-by-hop RLC may be assumed applicable for one or more techniques described herein.

In some systems, relaying via a Proximity Service (ProSe) WTRU to Network relays may be implemented to extend network coverage to an out of coverage WTRU by using PC5 (e.g., D2D) between an out of coverage WTRU and a WTRU-to-Network relay. In this case, the out of coverage WTRU may be considered to be a remote WTRU, but not all remote WTRUs discussed herein are limited to being out of coverage. Generally, a WTRU using a relay may be considered to be a remote WTRU, as described herein. A ProSe WTRU-to-Network Relay may provide a generic L3 forwarding function that can relay any type of IP traffic between a Remote WTRU and the Network. One-to-one and one-to-many SL communications may be used between the Remote WTRU(s) and the ProSe WTRU-to-Network Relay. For both Remote WTRU and Relay WTRU only one single carrier (e.g., Public Safety ProSe Carrier) operation may be supported (e.g., Uu and PC5 may be the same carrier for Relay/Remote WTRU). The Remote WTRU may be authorized by upper layers and may be in-coverage of the Public Safety ProSe Carrier or out-of-coverage on any supported carriers including Public Safety ProSe Carrier for WTRU-to-Network Relay discovery, (re) selection, and communication. The ProSe WTRU-to-Network Relay may always be in-coverage of EUTRAN. The ProSe WTRU-to-Network Relay and the Remote WTRU may perform SL communication and SL discovery.

In some systems, relay selection/reselection for ProSe WTRU to NW relays may be performed based on a combination of an Access Stratum (AS) layer quality measurements (RSRP) and upper layer criteria. Specifically, the eNB may control whether the WTRU can act as a ProSe WTRU-to-Network Relay. For example, if the eNB broadcasts any information associated to the ProSe WTRU-to-Network Relay operation, then the ProSe WTRU-to-Network Relay operation may be supported in the cell. It may follow then, that the eNB may provide one or more of the following: Transmission resources for ProSe WTRU-to-Network Relay discovery using broadcast signaling for RRC_IDLE state and dedicated signaling for RRC_CONNECTED state; Reception resources for ProSe WTRU-to-Network Relay discovery using broadcast signaling; broadcasts of a minimum and/or a maximum Uu link quality (e.g., RSRP) threshold(s) that the ProSe WTRU-to-Network Relay needs to respect before it can initiate a WTRU-to-Network Relay discovery procedure (e.g., in RRC_IDLE, when the eNB broadcasts transmission resource pools, the WTRU may use the threshold(s) to autonomously start or stop the WTRU-to-Network Relay discovery procedure; in RRC_CONNECTED, the WTRU uses the threshold(s) to determine if it can indicate to eNB that it is a Relay WTRU and wants to start ProSe WTRU-to-Network Relay discovery). If the eNB does not broadcast transmission resource pools for ProSe-WTRU-to-Network Relay discovery, then a WTRU may initiate a request for ProSe-WTRU-to-Network Relay discovery resources by dedicated signaling, respecting these broadcasted threshold(s). If the ProSe-WTRU-to-Network Relay is initiated by broadcast signaling, it may perform ProSe WTRU-to-Network Relay discovery when in RRC_IDLE. If the ProSe WTRU-to-Network Relay is initiated by dedicated signaling, it may perform relay discovery as long as it is in RRC_CONNECTED.

A ProSe WTRU-to-Network Relay performing SL communication for ProSe WTRU-to-Network Relay operation may have to be in RRC_CONNECTED. After receiving a layer-2 link establishment request or TMGI monitoring request (e.g., upper layer message) from the Remote WTRU, the ProSe WTRU-to-Network Relay may indicate to the eNB that it is a ProSe WTRU-to-Network Relay and intends to perform ProSe WTRU-to-Network Relay SL communication. The eNB may provide resources for ProSe WTRU-to-Network Relay communication.

The remote WTRU may decide when to start monitoring for ProSe WTRU-to-Network Relay discovery. The Remote WTRU may transmit ProSe WTRU-to-Network Relay discovery solicitation messages while in RRC_IDLE or in RRC_CONNECTED depending on the configuration of resources for ProSe WTRU-to-Network Relay discovery. The eNB may broadcast a threshold, which may be used by the Remote WTRU to determine if it can transmit ProSe WTRU-to-Network Relay discovery solicitation messages, to connect or communicate with the ProSe WTRU-to-Network Relay WTRU. The RRC_CONNECTED Remote WTRU may use the broadcasted threshold to determine if it can indicate to an eNB that it is a Remote WTRU and wants to participate in ProSe WTRU-to-Network Relay discovery and/or communication. The eNB may provide, transmission resources using broadcast or dedicated signaling and reception resources using broadcast signaling for ProSe WTRU-to-Network Relay Operation. The Remote WTRU may stop using ProSe WTRU-to-Network Relay discovery and communication resources when RSRP goes above the broadcasted threshold. Note, the exact time of traffic switching from Uu to PC5 or vice versa may be up to the higher layer.

The Remote WTRU may perform radio measurements at the PC5 interface and use them for ProSe WTRU-to-Network Relay selection and/or reselection along with higher layer criterion. A ProSe WTRU-to-Network Relay may be considered suitable in terms of radio criteria if the PC5 link quality exceeds configured threshold (e.g., pre-configured or provided by eNB). The Remote WTRU may select the ProSe WTRU-to-Network Relay, which satisfies higher layer criterion and has best PC5 link quality among all suitable ProSe WTRU-to-Network Relays.

The Remote WTRU may trigger ProSe WTRU-to-Network Relay reselection when: PC5 signal strength of current ProSe WTRU-to-Network Relay is below configured signal strength threshold; and/or, it receives a layer-2 link release message (e.g., upper layer message) from the ProSe WTRU-to-Network Relay.

In some systems, WTRU-to-Network relays may be utilized by specific use cases, such as a commercial use cases with specific types of WTRUs (e.g., wearables and IoT devices) operating in a RAN. In such a use case, unlike ProSe WTRU-to-Network relays that use a L3 (IP layer) relaying approach, the WTRU-to-Network relays for wearables may utilize a L2 relaying approach based on the protocol stacks shown in FIG. 2 and/or FIG. 3.

Figure 2:
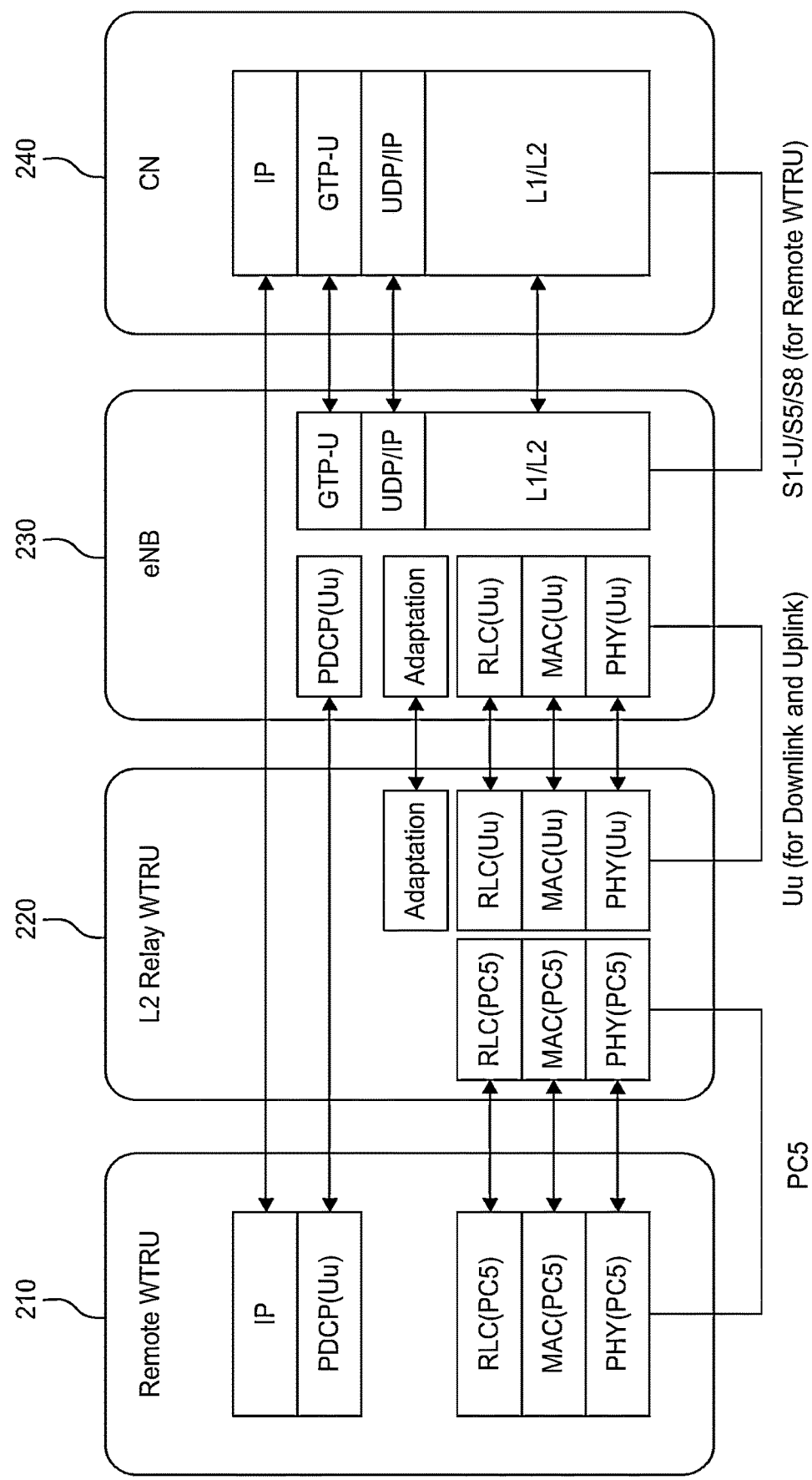
FIG. 2 illustrates an example of a User plane radio protocol stack for layer 2 evolved WTRU-to-Network relay (PC5)

FIG. 2 illustrates an example of a user plane radio protocol stack for layer 2 evolved WTRU-to-Network relay (PC5). In the example of FIG. 2, there is a 210 a remote WTRU, a 220 L2 relay WTRU, a 230 eNB, and a 240 core network (CN).

Figure 3:
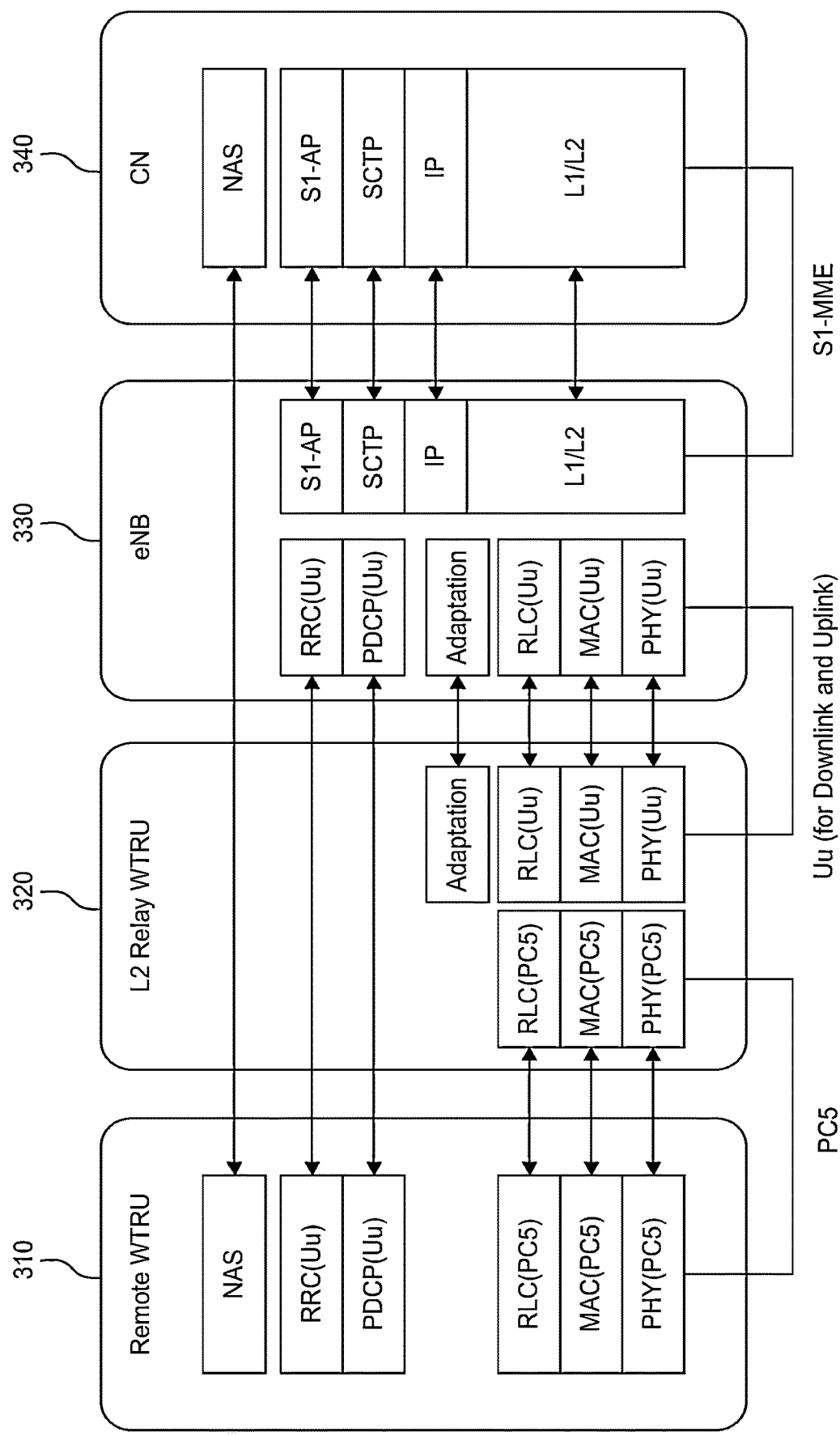
FIG. 3 illustrates an example of a Control plane radio protocol stack for layer 2 evolved WTRU-to-Network relay (PC5)

FIG. 3 illustrates an example of a control plane radio protocol stack for layer 2 evolved WTRU-to-Network relay (PC5). In the example of FIG. 3, there is a 310 a remote WTRU, a 320 L2 relay WTRU, a 330 eNB, and a 340 core network (CN).

In both examples of FIG. 2 and FIG. 3, each entity (e.g., remote WTRU, L2 relay WTRU, eNB, CN, etc.) show layers within the entity and how these layers may communicate with the respective layers within the other entities. In both examples shown in FIG. 2 and FIG. 3 there is a PC5 connection between the remote WTRU (e.g., which may be considered one of the sources/destinations) and the L2 relay WTRU; the L2 relay WTRU which may facilitate communication to the network from the remote WTRU, and the network may refer to a base station (e.g., eNB) and/or some other network node (e.g., CN). Also, in both examples shown in FIG. 2 and FIG. 3 there is a Uu (e.g., downlink and/or uplink) connection between the L2 relay WTRU and the eNB.

In some systems, relay solutions may be based on a one-to-one communication link established at the upper layers (e.g., ProSe layer) between two WTRUs, such as a remote WTRU and a relay WTRU (e.g., WTRU-to-Network relay). Such a connection may be transparent to the access stratum layer and connection management signaling and procedures performed at the upper layers may be carried by access stratum layer data channels. The access stratum layer may, therefore be unaware of such a one-to-one connection.

In some systems, such as NR V2X, the access stratum layer may support a unicast link between two WTRUs. This unicast link may be initiated by upper layers (e.g., as in the ProSe one-to-one connection). However, the access stratum layer may be informed of the presence of such unicast link, and any data that is transmitted in unicast fashion between the WTRUs. With such knowledge, the access stratum layer may support HARQ feedback, CQI feedback, and/or power control schemes which are specific to unicast.

A unicast link at the access stratum layer may be supported via a PC5-RRC connection. For example, a PC5-RRC connection may be defined as follows. A PC5-RRC connection may be a logical connection between a pair of a Source Layer-2 ID and a Destination Layer-2 ID in the access stratum. One PC5-RRC connection may correspond to one PC5 unicast link. The PC5-RRC signaling may be initiated after its corresponding PC5 unicast link establishment. The PC5-RRC connection and the corresponding SL-SRBs and SL-DRBs may be released when the PC5 unicast link is released as indicated by upper layers. For each PC5-RRC connection of unicast, one SL-SRB may be used to transmit the PC5-S messages before the PC5-S security has been established. One SL-SRB may be used to transmit the PC5-S messages to establish the PC5-S security. One SL-SRB may be used to transmit the PC5-S messages after the PC5-S security has been established, which may be protected. One SL-SRB may be used to transmit the PC5-RRC signaling, which may be protected and only sent after the PC5-S security has been established.

PC5-RRC signaling may include a SL configuration message (RRCReconfigurationSL) where a first WTRU configures the RX-related parameters of each a SL radio bearer (SLRB) in a second WTRU. Such a reconfiguration message may configure the parameters of each protocol in the L2 stack (e.g., SDAP, PDCP, etc.). The second WTRU may confirm or reject such a configuration, depending on whether it can support the configuration suggested by the first WTRU.

WTRU-to-WTRU relays may not have been adequately addressed, if at all, in legacy systems (e.g., LTE). Accordingly, there is a need for approaches to WTRU-to-WTRU relays (e.g., connection establishment, access stratum layer configuration, etc.). Similar to unicast links in NR V2X, a similar "connection" may exist at the access stratum layer between WTRUs involved in the relaying (e.g., the relay WTRU and the two remote WTRUs for which the relay WTRU is relaying traffic). Supporting such a connection as two independent NR V2X-like PC5-RRC connections between the relay WTRU and each of the two remote WTRUs, and replicating the functionality of PC5-RRC connection across each of these links, may present issues for one or more reasons.

For example, one issue may be modeling of the connection, where a PC5-RRC connection is a logical link between two WTRUs. For WTRU-to-WTRU relay(s), the logical link may need to involve at least three WTRUs (e.g., or more for multi-hop). So the general modeling may present problems not previously considered in legacy systems.

In another example, one issue may be SL configuration, where if a L2 relay is adopted for a WTRU-to-WTRU relay, the protocol stack may need to be similar to FIG. 2 or 3. In this case, some of the layers (e.g., SDAP, PDCP) may need to be configured in an end-to-end fashion between the remote WTRUs while the lower layers (e.g., RLC and MAC) may need to be configured both in the remote WTRUs and the relay WTRUs. Furthermore, the lower layer configurations (e.g., MAC and RLC) in each individual hop along the end to end link may need to be configured in a consistent fashion in order to maintain end-to-end QoS. Independent configuration, even for the lower layer, may not have been previously considered in legacy systems.

To address issues mentioned herein, and others, an approach is needed for access stratum layer configuration of each of the WTRUs in a relayed WTRU-to-WTRU and/or WTRU-to-Network relay path (e.g., either single hop or multi-hop relayed connection) that ensures a consistent configuration of the SLRBs in an end-to-end fashion.

In one or more embodiments, there may be methods, systems, and devices for implementing WTRU-to-WTRU relay connection establishment and configuration. Generally, there may be one or more control plane architectures for WTRU-to-WTRU relays. There may also be one or more link/SLRB configuration procedure(s) for WTRU-to-WTRU relays, which may address various aspects such as: interaction with upper layers; RRC message exchange processing; SL-SRB configuration; security handling for SL configuration; and/or, configuration determinations. Disclosed herein there may be one or more examples based on the one or more embodiments demonstrating a configuration procedure according to the techniques described herein.

Figure 4:
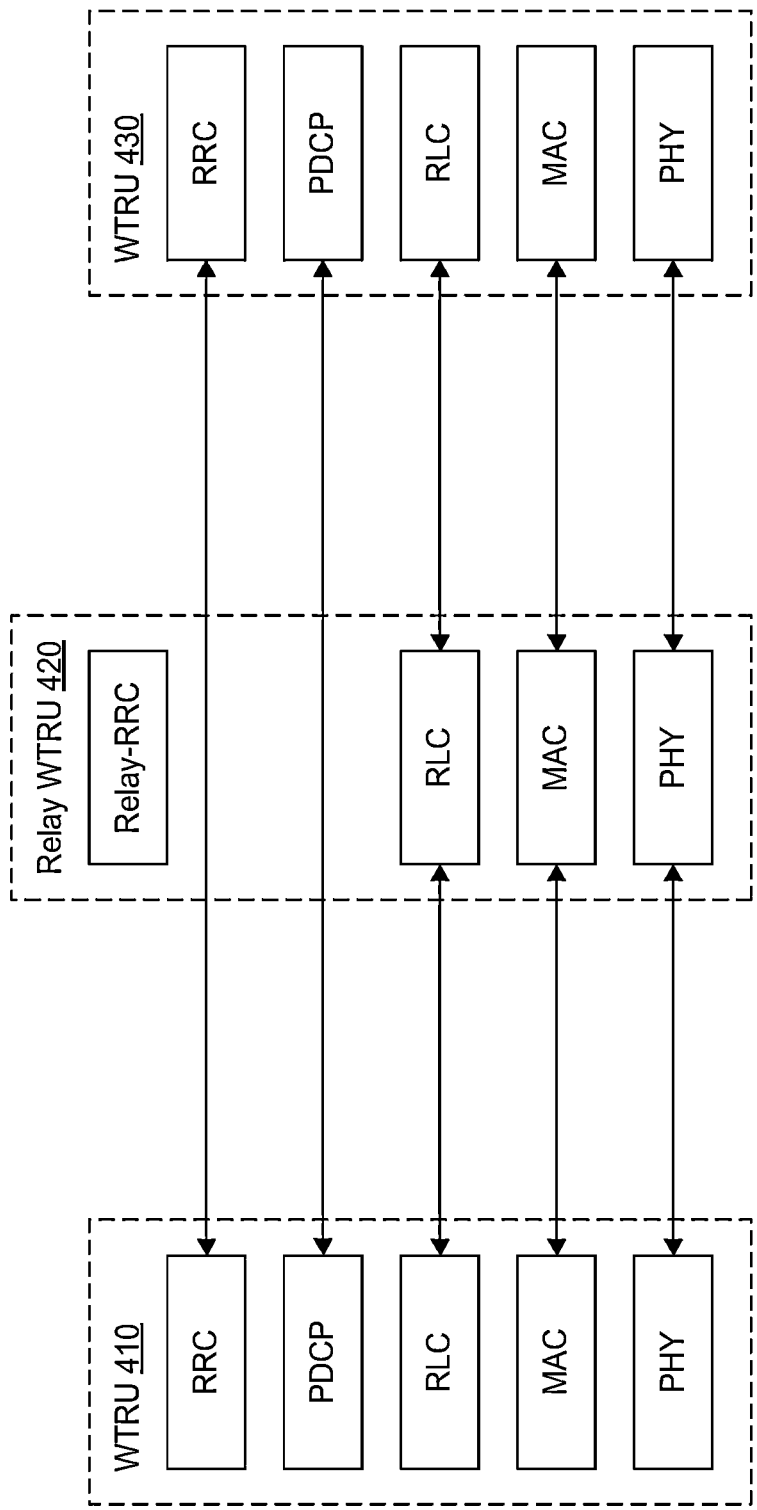
FIG. 4 illustrates an example of a control plane architecture for WTRU-to-WTRU relays.

FIG. 4 illustrates an example of a control plan architecture for WTRU-to-WTRU relays, where a relay WTRU may be configured with an RRC layer without PC5-RRC signaling functionality. In this example there may be a first remote WTRU (e.g., WTRU 410), a relay WTRU (e.g., relay WTRU 420), and a second remote WTRU (e.g., WTRU 430).

In the example of FIG. 4 example, the relay WTRU 420 may contain an RRC layer (e.g., without PDCP), where this RRC layer may be used to perform certain RRC functionality without the need to communicate PC5-RRC messaging/signaling with any of the remote WTRUs (e.g., WTRU 410 or other WTRUs not shown). Such functions may include: Detecting Radio Link Failure (RLF) on the link between the relay WTRU 420 and a remote WTRU, such as WTRU 410 (e.g., based on indications from the lower layers) and taking resulting actions; and/or, configuration of lower layers (e.g., MAC/RLC), where in one example the RRC layer may provide configuration of the lower layers, such as MAC/RLC, based on some preconfigured or predefined quantities/parameters associated with relays.

The resulting actions associated with detecting RLF may include, for example: Informing upper layers of RLF for a particular relayed link; Triggering a procedure at the lower layers associated with RLF at the relay (e.g., MAC CE transmission, RS transmission, CSI feedback transmission) such as initiation of relay discovery procedures or relay selection procedures at the access stratum layer; and/or, Informing lower layers to release all configuration associated with a relay link.

Figure 5:
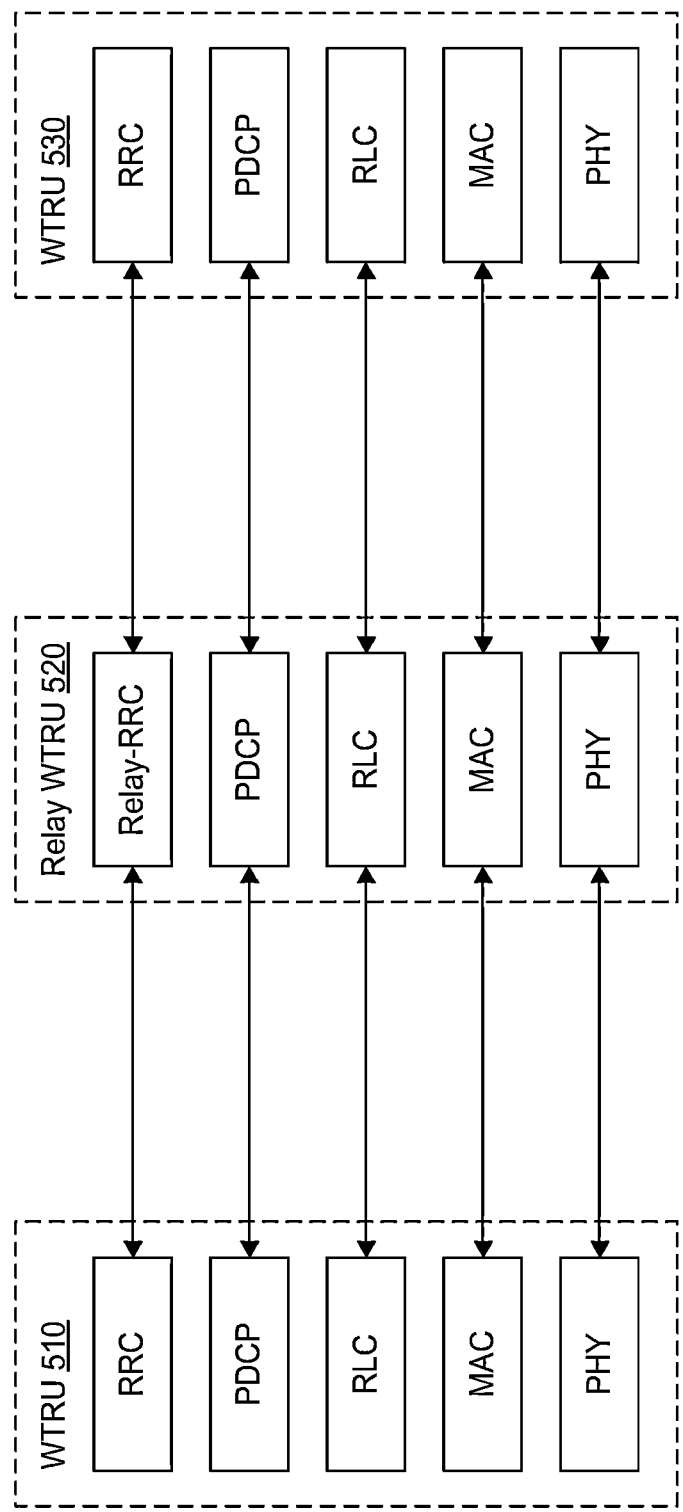
FIG. 5 illustrates an example of a control plane architecture for WTRU-to-WTRU relays.

FIG. 5 illustrates an example of a control plan architecture for WTRU-to-WTRU relays, where a relay WTRU may be configured with a transparent RRC layer having limited PC5-RRC signaling functionality. In this example there may be a first remote WTRU (e.g., WTRU 510), a relay WTRU (e.g., relay WTRU 520), and a second remote WTRU (e.g., WTRU 530). In this example, the relay WTRU 520 is configured with a PC5-RRC layer having PC5-RRC signaling functionality with the remote WTRU 510, but such functionality may be limited/modified for the relay WTRU 520. In addition, the RRC layer at the relay WTRU 520 may be fully transparent to the remote WTRUs (e.g., 510). Specifically, a remote WTRU (e.g., WTRU 510) may transmit a PC5-RRC message to the relay WTRU 520 which may be interpreted and/or forwarded to WTRU 530. While WTRU 510 may have some knowledge of the presence of a relay WTRU 520, the RRC layer at WTRU 510/530 may transmit RRC signaling via the relay WTRU 520 in the same way (e.g., same message structure/contents) that it would if WTRU 510 and WTRU 530 had a single connection.

The relay RRC of relay WTRU 520 may have the functions of: detecting RLF of the link, where triggered procedures may be as in the example of FIG. 4, but may additionally involve the trigger of some RRC signaling; and/or, configuration of one or more lower layers, where such configuration may involve extracting some of this configuration from PC5-RRC signaling received from one of the remote WTRUs 510/530.

Figure 6:
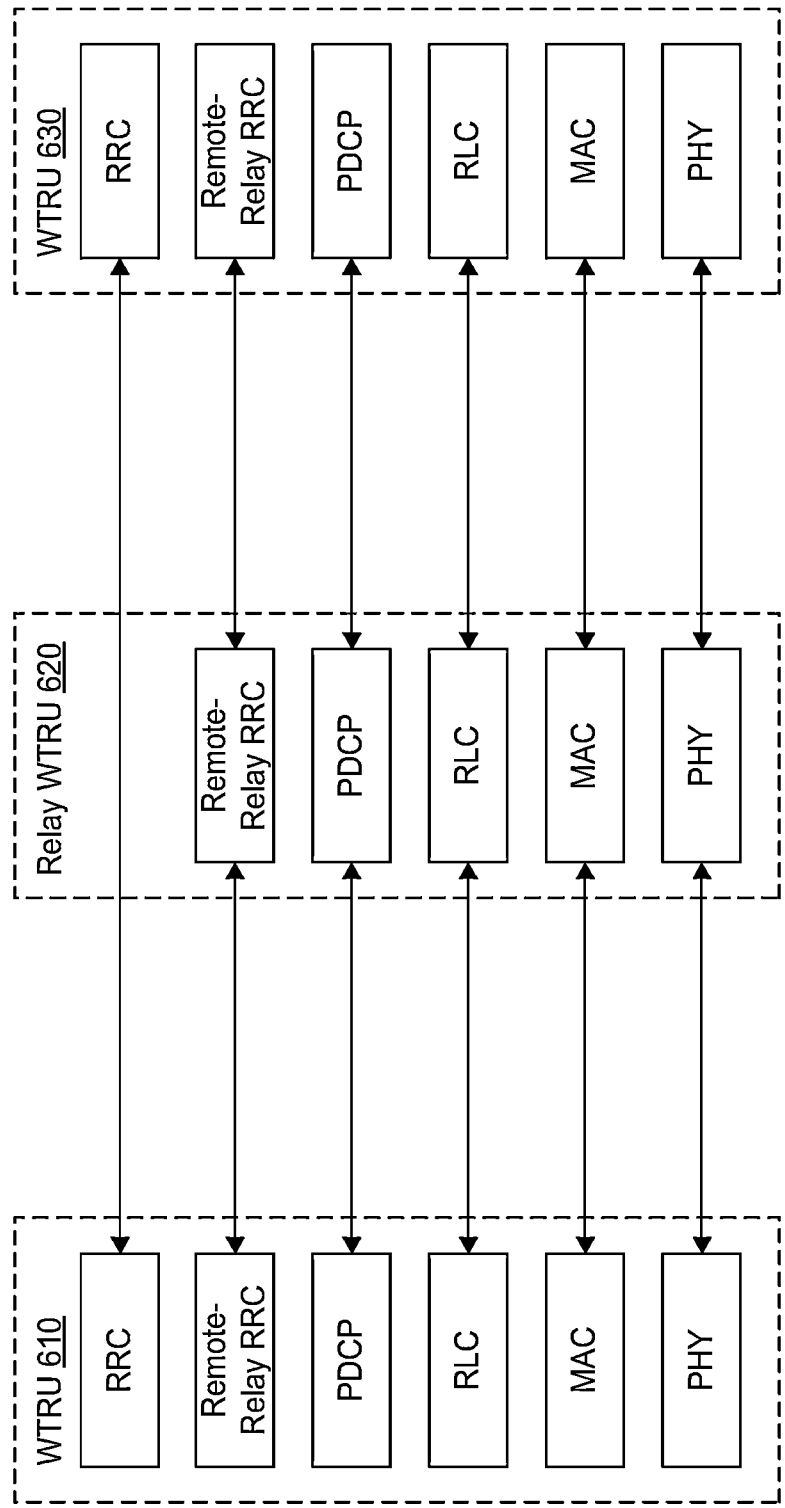
FIG. 6 illustrates an example of a control plane architecture for WTRU-to-WTRU relays.

FIG. 6 illustrates an example of a control plane architecture for WTRU-to-WTRU relays, where the relay WTRU and remote WTRU may be configured with a separate RRC layer or sublayer (e.g., remote-relay layer) which may be visible at the remote WTRU and/or configured in each of the remote WTRUs. In this example there may be a first remote WTRU (e.g., WTRU 610), a relay WTRU (e.g., relay WTRU 620), and a second remote WTRU (e.g., WTRU 630). In addition, the remote WTRUs (e.g., 610/630) may also communicate via an end-to-end RRC layer. Functionality of the PC5-RRC layer may be split between the end-to-end RRC layers (e.g., labelled RRC) and the remote-relay RRC layer. Furthermore, the remote-relay RRC layer may be responsible for RRC signaling with the remote WTRU(s) (e.g., 610/630) for configuration of lower layers (e.g., only lower layers), while the end to end RRC layers may be responsible for configuration of upper layers (e.g., SDAP, PDCP) and possibly on or more lower layers.

As discussed herein there may be one or more architectures for implementing relay communication system. In order to implement a relay system, there may be one or more WTRU-to-WTRU relay link/SLRB configuration procedures, wherein these configuration procedures may apply to any of the example relay architectures described herein. For demonstration purposes, the example of FIG. 1E may be referred to, but any of the other example figures may be applicable. Generally, a first remote WTRU (e.g., source 191) may configure a SL radio bearer (SLRB) as an end-to-end bearer where the data for that SLRB is relayed via a relay WTRU (e.g., relay 192). The end-to-end bearer may exist over the first link (e.g., the radio link 194 between source 191 and relay 192) and a second link (e.g., the radio link 195 between relay 192 and destination 193). The configuration of such a relayed SLRB may have a relay component for the configuration. The relay component of the configuration may be included (e.g. encapsulated) within the configuration of the relayed SLRB, and may contain information which may be relevant only to the relay WTRU.

The relay component for the configuration may comprise of one or more of the following: configuration of the RLC, MAC, and PHY at the relay WTRU; configuration of the RLC and/or MAC part of an SLRB at the relay WTRU and/or at a second remote WTRU (e.g., destination 193); whether an SLRB and/or a QoS flow is allowed to be relayed or not; whether an SLRB is allowed to be split over two separate paths (e.g., a first path via relay R1 and a second path via relay R2, a first path via relay R1 and a second path directly between source 191 and destination 193, etc.); routing rules for the splitting of traffic on an SLRB split between different paths; and/or, configuration of certain relaying functions, such as configuration of an adaptation layer at the relay.

The configuration of certain relay functions and/or layers may comprise of: rules for mapping/multiplexing a logical channel/RLC entity over a first link (e.g., link 194) to a logical channel over a second link (e.g., link 195); rules for creation of a logical channel/RLC entity over the second link based on the logical channels present over the first link; rules for selection of logical channel ID on the second link based on logical channel ID on the first link, or vice versa; and/or, LCP restrictions to be applied at the relay WTRU which may be applicable to relayed data and/or data generated at the relay WTRU and intended for the second remote WTRU.

In some cases, WTRU-to-WTRU relay link/SLRB configuration procedures may address interaction(s) with upper layers. In one case, a WTRU may receive/determine information from/using the upper layers, possibly associated with a unicast link and/or a pair of source/destination L2 ID, for the purposes of relaying and/or configuration of relaying. Such information may be received by a source/destination WTRU (e.g., source 191 and/or destination 193) and/or by a relay WTRU (e.g., relay 192). Source/destination WTRUs and relay WTRUs may respectively receive and/or determine a different set of information from upper layers.

The access stratum layer may receive information based on one or more of the following conditions: upon initiation by the upper layers of a unicast link (e.g., possibly a unicast link which is configured through a WTRU to WTRU relay); upon completion/establishment by the upper layers of a unicast link (e.g., possibly a unicast link which is configured through a WTRU to WTRU relay); and/or, upon trigger by the access stratum layer, where such trigger may be initiated by completion of an access stratum layer discovery or relay selection procedure, RLF of an existing unicast link at the access stratum layer, and/or reception of a SL measurement report, possibly associated with a relay link.

Examples of this information received by a source/destination WTRU and/or relay WTRU may include one or more of the following: indication that a unicast link and/or pair of source/destination L2 ID are associated with a relayed link as opposed to a direct link; one or more relay unique identities; an association of L2 source and/or L2 destination ID with L2 source and/or L2 destination ID of another WTRU; and/or, a list of identities associated with WTRUs along the path of a related unicast link.

For the indication that a unicast link and/or pair of source/destination L2 ID are associated with a relayed link as opposed to a direct link, such an indication may be in the form of a link type (e.g., direct link vs relayed link).

For the one or more relay unique identities (e.g., provided to a relay 192), in one example, a relay WTRU may receive a relay source and/or destination ID and associate the relay source and/or destination ID with the need to relay one or more SL transmissions received based on such source/destination ID. Specifically, a relay WTRU may receive/determine a relay destination L2 ID from upper layers. Upon reception of a SL transmission destined to the L2 ID, the WTRU may perform routing of the transmission to a relayed RLC entity or determine to retransmit the received SDU to the next link using the received relay source L2 ID as the source L2 ID of the transmission.

For the association of L2 source and/or L2 destination ID with L2 source and/or L2 destination ID of another WTRU, this may be used for determination of the addressing to use in the next hop transmission for a relayed SDU. Specifically, a relay WTRU may use such an association to determine the source and/or destination ID for transmission of an SDU when it receives a SDU associated with a relay specific L2 ID it has received/determined from upper layers. Additionally/alternatively, a WTRU may use such an association to determine the receiving RLC entity when it receives an SDU associated with a relay specific L2 ID it has received from upper layers.

For the list of identities associated with WTRUs along the path of a relayed unicast link, this list may be an ordered list of identities (e.g., in order of each of the WTRUs in sequence of the relayed path, such as the case of a multi-hop relay path, an order determined by the WTRU based on one or more rules, an order determined by the network, a preconfigured order, etc.).

In some cases, WTRU-to-WTRU relay link/SLRB configuration procedures may address RRC message exchange/processing. A first remote WTRU (e.g., source 191) linked through a relay may initiate two separate configuration procedures. Specifically, the first remote WTRU may initiate two independent and/or related SL configuration procedures when it has been indicated that a unicast link is relayed through a relay WTRU (e.g., relay 192). The procedures may include a first procedure to configure one or more relay WTRUs (e.g., relay 192): in one case, this procedure may be associated with configuration of only the lower layer (e.g., RLC, MAC, PHY, etc.) of the relay WTRU. The procedures may also include a second procedure to configure the first remote WTRU (e.g., end-to-end WTRU 191/193); in one case, this procedure may be associated with configuring at least the upper layers (e.g., SDAP, PDCP, etc.). Either procedure may be performed in any order.

In one case, a WTRU may initiate a SL RRC configuration procedure in response to receiving a configuration message. Specifically, a relay WTRU (e.g., relay 192) may trigger a procedure for link establishment, configuration, or similar process with a second remote WTRU (e.g., destination 193) as a result of receiving a similar procedure initiated with it by a first remote WTRU (e.g., source 191). The relay WTRU may send a message to the second remote WTRU which will prompt the second remote WTRU to carry out a configuration procedure, a link establishment procedure, or some similar procedure; the relay WTRU may send this message as a result receiving a message itself from the first remote WTRU (e.g., which prompted the same action in the relay WTRU).

For example, a relay WTRU (e.g., relay 192) may receive a SL configuration message from a first remote WTRU. In response to receiving of the SL configuration message and/or in response to the relay WTRU successfully applying the received configuration received from the first remote WTRU, the relay WTRU may initiate a similar SL configuration procedure (e.g., transmission of SL configuration message) with a second remote WTRU. The relay WTRU may further determine the contents and/or configuration parameters associated with the SL configuration message to second remote WTRU based on the configuration received from the first remote WTRU. Such determination is described in more detail herein.

In another example, a relay WTRU may receive a SL configuration message from the first remote WTRU. In response to receiving the SL configuration message and/or in response to the relay WTRU successfully applying the received configuration received from the first remote WTRU, the relay WTRU may inform/process the received configuration with upper layers. In such a case, the relay WTRU may initiate a unicast link between the relay WTRU and second remote WTRU.

In one instance, the first remote WTRU may determine the success of the first procedure based on success of the second procedure. Specifically, a relay WTRU may determine to report success/failure to a received SL configuration message based on the ability to apply its own configuration and/or reception of a success message/ACK received in response to the second procedure initiated following the first procedure. For example, the relay WTRU may receive a SL reconfiguration message from the first remote WTRU and may report failure immediately upon inability to apply the received SL configuration at the relay WTRU. In the case the relay WTRU is able to successfully apply the configuration, the relay WTRU may initiate transmission of a SL configuration message to second remote WTRU before responding to the first remote WTRU's configuration message. If the second remote WTRU responds with a configuration failure, the relay WTRU may respond to the first remote WTRU's configuration message (e.g., first procedure) with failure. If the second remote WTRU responds with a confirmation/successful application of the configuration, the relay WTRU may respond to the first remote WTRU's configuration (e.g., first procedure) with configuration/success. In another example, relay WTRU may decide to relay the entire configuration message to the second remote WTRU. Relay WTRU may send a confirmation/success to the first remote WTRU if it receives a confirmation/success from the second remote WTRU of the relayed configuration message.

A WTRU (e.g., relay 192) may include information in the failure message to differentiate a failure that occurred due to its own configuration, or due to receiving a configuration failure from another WTRU (e.g., destination 193). Such information may be included in a cause value and/or the information may include a cause value; for example, a different identity/value (e.g., an integer) may be used to identify a different cause; the "cause value element" may be used to refer to the information element, and then the value of that element may indicate the specific cause.

A WTRU may further include all or part of the failure message received in the second procedure within the failure message associated with the first procedure.

In one case, a WTRU may transmit/receive/forward a configuration message containing configurations for other WTRU(s). Specifically, a WTRU may include configuration(s) intended for multiple WTRUs in a single configuration message. This may be applicable to the WTRU-to-WTRU relay scenario, where a WTRU may configure multiple hops of a relayed link, or a relay and remote WTRU, by transmitting the configuration for the different destined WTRUs in the same RRC message. Generally, a WTRU receiving a configuration message intended for multiple WTRUs may perform one or more actions.

A WTRU receiving a configuration message intended for multiple WTRUs may decode all or part of the message, depending on the whether the WTRU is configured to be a relay WTRU, possibly for a specific L2 source/destination ID. For example, a WTRU configured as a remote WTRU (e.g., destination 193) for a specific destination ID may decode the entire message.

A WTRU receiving a configuration message intended for multiple WTRUs may decode part of the message, and forward another part of the message, depending on whether the WTRU is configured to be a relay WTRU, possibly for a specific L2 source/destination ID. For example, a WTRU configured as a relay WTRU for a specific destination ID may decode a portion of the message, and forward another portion of the message to an another L2 destination ID that is associated with the first L2 destination ID. The association between the received L2 ID and the second L2 destination ID (for forwarding) may be configured by upper layers.

A WTRU receiving a configuration message intended for multiple WTRUs may forward the entire message, depending on whether the WTRU is configured to be a relay WTRU, possibly for a specific L2 source/destination ID.

A WTRU receiving a configuration message intended for multiple WTRUs may create a new RRC message comprising of forwarded portions of the received portion, in addition to new configuration to be provided to the next WTRU.

The WTRU may further decide the decode/forward behavior depending on the: SRB or LCH associated with the received message; the protocol layers configured in the received message; and/or, the L2 source ID associated with the received message.

A WTRU may, during the forwarding of all or a part of an RRC message, perform deciphering without RRC processing. A WTRU may, following such deciphering, perform ciphering of the same RRC message, possibly with a new security key. Alternatively, a WTRU may transmit the same RRC message without additional ciphering.

A WTRU may determine the portion of an RRC message to forward versus the portion of an RRC message to send to RRC layer for decoding based on: predefined structure of the message itself (e.g., the RRC message may contain an octet string which encapsulates the RRC message to be forwarded); and/or, a relay identity, member identity, hop identity or similar included in the RRC message, PDCP header, RLC header, or adaptation layer.

In one case, a WTRU may determine the value of a configuration timer based on the number of WTRUs along a relayed path. Specifically, the WTRU may be configured with a different link configuration expiry timer, herein referred to as T4xx, depending on the intended recipient of the configuration and/or whether the unicast link is established via a relay and/or the number of relays along the relayed unicast link path.

In one instance, a WTRU may be configured with two different values of T4xx to use for transmission of a configuration message but associated with: different SL-SRBs, where for example one value of T4xx is used for configuration procedure over a first SL-SRB and a second value of T4xx is used for configuration procedure over a second SL-SRB; different L2 IDs or similar identifier, where for example one value of T4xx is used for configuration message transmission associated with a first identity (e.g., L2 ID, node ID, member ID, or similar), where such ID may be transmitted in one or more of the protocol layers and/or may identify the destined WTRU of the configuration; different layers to be configured, where for example one value of T4xx is used for configuration procedure for one set of protocol layers (e.g., RLC, MAC, PHY) and a second value of T4xx is used for configuration procedure for a second set of protocol layers (e.g., PDCP, SDAP); and/or, different types of configuration message, where for example one value of T4xx is used for a first configuration message type and a second value of T4xx is used for a second configuration message type, where a configuration message type may comprise of a different message, different format of the message, or the like.

In another instance, a WTRU may determine the value of T4xx based on information provided by upper layer in combination with Network configuration. Such information may relate to whether a unicast link is established through a relay, and/or the number of relays in the relay path for a relayed unicast link. For example: a WTRU may use a configured value of T4xx for a non-relayed path; a WTRU may increase or scale the value of T4xx by a certain predetermined or configured amount if the unicast link is through a relay; and/or, a WTRU may increase or scale the value of T4xx by a certain predetermined or configured amount for each relay in the relayed path.

In some cases, WTRU-to-WTRU relay link/SLRB configuration procedures may address Signaling Radio Bearers (SL-SRB) configuration. In one case, a WTRU may be configured with multiple SL Signaling Radio Bearers (SL-SRBs) for transmission of RRC/PC5 messages to the same L2 Destination/Unicast Link depending on whether the unicast link is relayed or not. Specifically, a first remote WTRU (e.g., source 191) may be configured with and/or enable multiple SL-SRBs for a single unicast link. Each SL-SRB may be associated with the transmission of a configuration intended for a different WTRU in the relayed WTRU-to-WTRU relay path. For example, the first remote WTRU may establish/forward/transmit a first SL-SRB for the configuration of a relay WTRU (e.g., relay 192) and a second SL-SRB for the configuration of a second WTRU (e.g., destination 193). The first remote WTRU may be preconfigured to transmit a configuration using two different SL-SRBs depending on information provided/determined in an upper layer configuration, as described herein. For example, a first remote WTRU may be informed/determined by upper layers that a unicast link is relayed through a WTRU-to-WTRU relay, and may configure/enable two SL-SRBs for transmission as a result (e.g., one for sending configuration information to the relay, and another for sending configuration information to the destination). On the other hand, if the upper layers indicate/determine that the unicast link is not configured via a relay WTRU a second SL-SRB may be configured/enabled for transmission of a configuration to a second remote WTRU (e.g., destination 193) and the first SL SRB may not be configured.

The relay WTRU may process the message (e.g., configuration message) associated with each of the two SL-SRBs differently depending on the configuration of the relay WTRU provided/determined by upper layers. Specifically, a WTRU may be configured as provided/determined by upper layers to receive from two different SL-SRBs using information (e.g., L2 IDs discussed herein and/or the indication that the WTRU is a relay) from upper layers. For example, a WTRU may be configured to act as a relay WTRU (e.g., relay 192) with a provided destination L2 ID, and may associate/enable two or more SL-SRBs to that destination ID. A WTRU (e.g., relay 192) may further determine reception behavior for RRC messages from the configuration from upper layers. For example, a relay WTRU may forward messages received on a first SL-SRB, while decoding/forwarding to upper layers messages received on a second SL-SRB.

In one instance, a WTRU may establish/enable a second SL-SRB or tear down the first SL-SRB depending on successful completion of a configuration procedure. Specifically, a WTRU may establish/enable/configure a second SL-SRB associated with a unicast link or pair of source/destination L2 ID upon successful completion of a configuration procedure. Such a configuration procedure may comprise of a transmission of a SL configuration RRC message and/or reception of an acknowledgement message. Such a configuration procedure may be performed on the first SL-SRB. Upon failure of the procedure (e.g., reception of a reject message, or expiry of a timer) the WTRU may instead release the configuration associated with the first SL-SRB.

For example, a remote WTRU (e.g., source 191 and/or destination 193) may receive an indication, and/or determine, from upper layers for the establishment of a unicast link via/with a relay WTRU with a given L2 ID. Upon receiving this indication, the remote WTRU may establish a first SL-SRB associated with the L2 ID and initiate a configuration procedure (e.g., transmission of a SL configuration message to the relay WTRU). Upon successful acknowledgement of the configuration message from the relay WTRU, the remote WTRU may establish a second SL-SRB with a different entity (e.g., the destination WTRU). The WTRU may further initiate a second configuration procedure using the second SL-SRB. Upon failure of either the first or second procedure (e.g., for the relay and the destination, respectively), the remote WTRU may release both the first SL-SRB and the second SL-SRB (if established).

In the above example, the first SL-SRB may be associated with a transmission of a configuration message to a relay WTRU, while the second SL-SRB may be associated with a transmission of a configuration message to another WTRU (e.g., or vice versa). The above example may be extended to the case of multi-hop relay. Specifically, upper layers may indicate N relays over the path, and a successful configuration over a first SL-SRB may establish N additional SL-SRBs. Alternatively, each successful configuration over SL-SRB x may result in establishment of SL-SRB x+1.

In one instance, there may be a distinction between configurations for receiving vs forwarding information on a SRB and/or LCH. Specifically, a WTRU may (e.g., a relay 192) may be configured with two receiving SRBs associated with the same L2 source/destination ID pair, whereby one SRB may be configured for reception of RRC configurations and another SRB may be configured for forwarding without interpretation. Further, upon reception from a first SRB, the relay WTRU may process the PDU (e.g., sending/using upper layers for PDCP/RRC decoding), while upon reception from a second SRB or LCH, the relay WTRU may relay the received RLC PDU to an TX RLC entity for transmission to a second remote WTRU.

In one example where there may be multiple SRB/LCH, a WTRU may be configured with a different LCH ID to SRB/DRB mappings depending on whether the WTRU is configured as a relay WTRU (e.g., relay 192). Specifically, a non-relay WTRU may be associated with LCH1 as an end-to-end SRB, LCH2 as a relay SRB, and LCH3, 4, and the like as DRBs. Alternatively, a relay WTRU may associate LCH2 as an SRB (e.g., hence decode RRC message), and LCH1, LCH3, 4, and the like as DRBs (e.g., hence forward to an outgoing LCH).

In another example where there may be multiple SRB/LCH, a WTRU (e.g., relay 192) may change the LCH of a received message to be relayed to a predefined transmit LCH when the received LCH is associated with an SRB to be relayed, and the WTRU is configured as a relay WTRU. Specifically, LCH1 may be associated with an end-to-end SRB (e.g., between source 191 and destination 193), while LCH2 may be associated with a relay SRB for configuring the relay WTRU from the first remote WTRU. Relay WTRU, when configured to be a relay for a specific L2 destination ID, may map all messages received on LCH2 to LCH1. Such a predefined mapping may be associated only for SL-SRB and not SL DBR.

In some cases, WTRU-to-WTRU relay link/SLRB configuration procedures may utilize one or more security techniques in the handling of SL configuration. Generally, a first remote WTRU may be a source (e.g., source 191) and may use one or more security techniques to discriminately communicate with a relay WTRU (e.g., relay 192) and/or a second remote WTRU that is the destination (e.g., destination 193). the first remote WTRU may be configured with separate security key(s) (e.g., one for relay 192 and destination 193) for a single unicast link used in a relay operation. For example, a first remote WTRU may transmit a configuration message to a L2 destination ID, but some or all of the message may be destined to a different WTRU (e.g., not associated with the L2 destination ID). The techniques used for a given scenario as described herein may be used alone or in any combination with any other techniques for another scenario described herein (e.g., combining two of the described scenarios).

In one example scenario, a WTRU may use a different security key for exchanging configuration information that is destined for a different WTRU type. Specifically, the WTRU may generate or be provided with (e.g., receive from the network) a different key for communicating a message that is destined for a different WTRU type, where the WTRU type may comprise a different role in the relaying path. For example, the first remote WTRU (e.g., source 191) may generate/receive a first key for sending a configuration (e.g., configuration information instructions/message) to a second remote WTRU (e.g., destination 193), and a second key for sending a configuration to a relay WTRU (e.g., relay 192). Although the transmission by the WTRU is made to the same WTRU (e.g., the relay WTRU), the intended destinations for each configuration that each use different keys may be different. Methods for indicating the destination for each configuration are further described herein.

In another example scenario, a WTRU may use a different security key for exchanging configuration(s) associated with different protocol layers. Specifically, the WTRU (e.g., source 191) may generate or be provided with (e.g., receive from the network) a first key for providing/sending a first configuration associated with a first set of protocol layers (e.g., SDAP/PDCP) and a second key for providing/sending a second configuration associated with a second set of protocol layers (e.g., RLC, MAC, PHY). The WTRU may further restrict its configuration messages to include only the protocol layers that can be associated with each key. Specifically, the WTRU, when selecting a first key that is associated with a first set of protocol layers, may send only the configurations associated with those protocol layers in any message encrypted with such a key.

In another example scenario, a WTRU may use a different security key for exchanging configuration over a different logical channel (LCH) or signaling radio bearers (SRB). Specifically, a WTRU may be configured with two SRBs associated with the same L2 destination ID. The WTRU may use a first key for transmissions to a first SRB and use a second key for transmissions to a second SRB.

In the above scenarios, different security keys may further be used for different WTRUs along a relay path. For example, a first key may be used for the first relay in a multi-hop path, a second key may be used for a second relay along a path, and so on.

In one instance, a WTRU may securely protect or encrypt different portions of an RRC message using different keys. Specifically, the WTRU (e.g., source 191) may use the different security keys (e.g., described in the scenarios herein) for securely protecting different parts of the same RRC message. For example, a first remote WTRU may cipher a first configuration (e.g., RRC IE, message, or similar) with a first key, and include this first configuration within an RRC message (e.g., ciphered and/or integrity protected with a second key). For the demonstrative purposes of this example, the RRC message may comprise of two parts, a first configuration and a second configuration, each using a portion ciphered with a first and second key, respectively; however, this is not intended to limit the application of this technique to just two part RRCs, but can be generally applied to any RRC message comprising of at least two configurations. The first configuration may be included within the RRC message, for example, as an octet string. A first receiving WTRU (e.g., relay 192) may decipher and be configured using the first configuration within the RRC message, and any contents of the RRC message besides the first configuration, such as the second configuration, may be deciphered and used using the second key. The first receiving WTRU may then relay the first and/or second configuration as is, or it may be added to a new RRC message to be relayed to a second remote WTRU (e.g., destination 193).

In some cases, a WTRU may carry out one or more relay link/SLRB configuration procedures that address SL configuration determination. In one case, as part of receiving/requesting configuration information, a relay WTRU (e.g., relay 192 that may be connected to a cell/network) may indicate to a network (e.g., base station, functional entity, network node, and/or the like) whether a requested configuration is for relaying or not. Specifically, the relay WTRU may request a SL configuration from the network specific for relaying by indicating in the request for configuration that such a configuration is specific to relaying. The relay WTRU may include a flag or Information Element (IE) in the request (e.g., SLUEInformation message), which is set when the relay WTRU that is requesting configuration intends to operate as a relay WTRU. Alternatively, a relay WTRU may request configuration specific for acting as a relay by including relay-related information required by the relay WTRU to provide such information. Alternatively/additionally, a first remote WTRU may request the configuration information for acting as a relay from a network, as discussed herein (e.g., previously), but then send that configuration information (e.g., configure) another WTRU to act as the relay using the received configuration information from the network.

In an example, a WTRU (e.g., remote or relay) may request configuration information (e.g., related to relay), and the WTRU may include one or more of the following pieces of information: mapping of the source and/or destination L2 ID at the receiving entity/part of the relay WTRU to the source and/or destination L2 ID at the transmitting entity/part of the relay WTRU, and possibly a mapping associated to each relayed unicast link configured at the relay WTRU; RX-related configuration at the relay WTRU provided by the first remote WTRU (e.g., source 191); and/or, any portion of the TX-related configuration at the first remote WTRU that may have been sent to the relay WTRU (e.g., LCH ID(s), number of HARQ/RLC retransmissions, etc.).

A WTRU may request configuration information (e.g., related to relay) from a network node immediately at, immediately after, or sometime during one or more of the following (e.g., at the start/end of one or more of the following triggers): receiving an indication and/or determining (e.g., by the WTRU upper layers) that the WTRU will act as a relay WTRU for an established unicast link; receiving an indication and/or determining (e.g., by the WTRU upper layers) any relay-related information, such as; receiving an indication and/or determining (e.g., by the WTRU upper layers) that an existing unicast link is to be relayed via the WTRU; and/or, receiving a SL configuration message from another WTRU.

For the trigger related to receiving a SL configuration message from a peer WTRU, one or more of the following may apply: the SL configuration may be associated with configuration of a relay part or protocol layers associated with a relay; the WTRU may be configured (e.g., by upper layers of the WTRU) with relay information (e.g., source/destination ID association/mapping) as described herein; the WTRU may be configured and/or authorized (e.g., by upper layers of the WTRU) to act as a relay WTRU; and/or, the WTRU may satisfy a network based configuration allowing it to operate as a relay WTRU (e.g., satisfy may mean send feedback, like an acknowledgement, and/or comply with an instruction from the network, like an RRC message) (e.g., satisfy may mean that the relay WTRU may be configured with a threshold for measurement, like an RSRP measurement, CBR measurement, load measurement, and the WTRU may operate as a relay if the measurement is above a threshold).

In one case, a WTRU may determine the configuration of the next hop of the relay WTRU to ensure end-to-end QoS. When a relay WTRU selects a SLRB-related parameters, it may do so in a way that ensures the end-to-end QoS is met over the entire relayed link (e.g., multiple hops between multiple relay WTRUs). However, since the relay WTRU may not have one or more upper layers configured (e.g., SDAP) the WTRU may not have access to the QoS information of the flows configured at the first WTRU (e.g., the source 191). Furthermore, the SLRB configurations may be determined by the WTRU-state and network node (e.g., gNB) under which the relay WTRU is connected/in coverage, and may therefore change over the path of the relay.

To address this, a first remote WTRU (e.g., source 191) may send information about the selected configuration (e.g., TX configuration of the SLRBs at source 191) to the relay WTRU (e.g., relay 192) for the relay WTRU to use to select its own configuration parameters for the link between relay WTRU and a second remote WTRU (e.g., destination 193). For example, such information may be sent in an RRC message intended for the relay WTRU. The relay WTRU, upon reception of the TX configuration parameters of the SLRB, may derive its own configuration parameters for its own link with the second remote WTRU.

Generally, a WTRU may be preconfigured with, or provided with, a predefined list of lower layer parameters (e.g., parameters of RLC, MAC, PHY) that may fall into one or more of the following categories: a TX parameter the relay WTRU must re-use exactly from the first remote WTRU (e.g., the relay WTRU uses the same value of the TX parameter as determined at the second remote WTRU); a TX parameter the relay WTRU must derive from the parameter used by the first remote WTRU (e.g., the relay WTRU uses a value of the TX parameter that is derived from the value used by the first remote WTRU); a TX parameter the relay WTRU can freely choose; and/or, a TX parameter the relay WTRU may choose based on the network configuration associated with the relay WTRU's own state/coverage (e.g., associated with the camped cell or connected gNB).

Regarding the TX parameter the relay WTRU must derive from the parameter used by the first remote WTRU (e.g., the source 191), such a derivation or mapping may further depend on one or more of the following: Channel Busy Ratio (CBR), for example, where the relay WTRU may be configured with a mapping function for the parameter which depends on CBR (e.g., different measured CBR may result in mapping the parameter differently); network configuration, where the mapping function may be (pre) configured by the network; and/or, number of hops of the relay link, where the mapping function may depend on the number of hops associated with the relayed link.

In one scenario, a first remote WTRU (e.g., source 191) may transmit the QoS information associated with each of its QoS flows (e.g., the list of QoS flows established at the first remote WTRU for the relayed unicast link, and the QoS profile for each flow). In one instance, the first remote WTRU may send a list of LCHs (e.g., LCH IDs). The first remote WTRU may also indicate an association to each of the LCHs established at the first remote WTRU. For example, the first remote WTRU may send a list of QoS flows (e.g., with QoS profiles) and the associated LCH ID for each of these QoS flows/QoS profiles. A relay WTRU, having received the transmission from the first remote WTRU, may determine the lower-layer configuration (e.g., PHY, MAC, RLC) by determining a set of SLRBs that would be created based on the QoS flows (e.g., from pre-configuration, or by request to the network), and then re-using the lower layer configuration of these pseudo SLRBs for each of the new LCHs created for the TX at the relay WTRU. Specifically, the relay WTRU may create an RLC entity for TX for each logical channel index received from WTRU A, and may map the logical channel index to that RLC entity based on received configuration for the associated LCH. This approach may reduce signaling between the two WTRUs, but may result in inconsistent QoS parameters in the case where the WTRUs are under coverage of different base stations (e.g., gNB).

In one scenario, the first remote WTRU may send the TX parameter configuration associated with each SLRB/LCH to the relay WTRU. The relay WTRU may re-use the parameter as is, or it may derive a new parameter as described herein.

In one scenario, the first remote WTRU may send the TX parameter configuration associated with each SLRB/LCH to the relay WTRU. The relay WTRU may confirm use of this parameter to the gNB. Specifically, the relay WTRU may send the parameter to the gNB. In case the gNB rejects the use of the parameter, the relay WTRU may indicate failure of the configuration procedure.

In the above scenarios addressing parameter configuration for a multi-hop situation(s), the decision for the configuration of the parameters for the relay WTRU may be made at the relay WTRU, however, other scenarios where the first remote WTRU (e.g., the source 191) selects the TX configuration for the relay WTRU may be applicable as well. Additionally, while only one relay WTRU is discussed (e.g., referring in some cases to FIG. 1E for illustrative purposes), these scenarios may apply to more than one relay WTRU scenarios (e.g., multi-hop situations having multiple links).

In some cases, a range parameter may be used to account for factors effected by hops of in a multilink relay. Specifically, the range parameter may be used to select an SLRB configuration and for the RX WTRU to determine whether to perform HARQ feedback. Further, the range parameter may be used to account for the distance between each hop of a relay link when configuring the next hop of the relay.

In one approach, a WTRU may split the range parameter into separate distinct range parameters and apply each range parameter over each hop of the relay. For example, the first remote WTRU may split the distance associated with the range parameter (e.g., X meters) into two portions X1 and X2 (where X1+X2=X), and assume X1 is to be the effective range for the link between the first remote WTRU and the relay WTRU, and X2 is to be the effective range for the link between the relay WTRU and the second remote WTRU. In one instance, the first remote WTRU may split the value of the range in half. SLRB configuration and/or behavior over the link between the first remote WTRU and the relay WTRU may use X1 (e.g., half the total range) as the assumed range parameter for the data. The first remote WTRU may send the effective range (e.g., half the total range) to the relay WTRU, which may use this effective range over the link between the relay WTRU and the second remote WTRU.

In an example, the first remote WTRU and/or relay WTRU may use the new effective range when requesting an SLRB configuration from the Network, and/or selecting and SLRB from SIB or pre-configuration.

In an example, the first remote WTRU and/or relay WTRU may transmit the new effective range in the SCI for WTRU R and/or WTRU B respectively to determine whether to respond to HARQ feedback.

In an example, the use of a range parameter for TX/RX behavior may use the effective range parameter rather than the original range parameter provided for the QoS flow.

In some cases, a source WTRU may determine/provide a configuration of individual links over the relayed path. Specifically, a first remote WTRU (e.g., source 191) may provide the configurations of the end-to-end SLRB over each of the individual links of the relayed path (e.g., links 194 and 195). This may apply also for the case of a multi-hop relayed path. Specifically, a first remote WTRU (e.g., source 191) may configure any/all of the following (e.g., in a situation of a L2 relay such as in the examples of FIGS. 2 and 3): the receiving SDAP entity parameters at the second remote WTRU; the receiving PDCP entity parameters at the second remote WTRU; the receiving RLC entity parameters at both relay WTRU and the second remote WTRU; the transmitting RLC entity parameters at relay WTRU; the receiving MAC entity parameters at both the relay WTRU and the second remote WTRU; the transmitting MAC entity parameters at the relay WTRU; the receiving PHY entity parameters at both the relay WTRU and the second remote WTRU; and/or, the transmitting PHY entity parameters at the relay WTRU.

In one case, the source WTRU may encapsulate multiple RRC configurations (e.g., for different WTRUs) into a single RRC message. For example, the first remote WTRU (e.g., source 191) may send a single RRC message containing RRC configurations associated with different WTRUs to be configured along the relay path. In this case, the first remote WTRU may determine the presence of one or more relay WTRUs along the path to the second remote WTRU (e.g., destination 193). The first remote WTRU may determine the presence of the one or more relay WTRUs based on one or more of the following: determination made at one or more upper layers; and/or relay/discovery selection procedure at the access stratum layer.

The upper layers may provide/determine an indication to the access stratum layer at the first remote WTRU that a unicast relay link has been established. Also, the upper layers may provide/determine an identification of each of the WTRUs along the relay link. For example, upper layers may provide/determine an ordered sequence of L2 IDs to the first remote WTRU. Alternatively, upper layers may provide/ determine the number of WTRUs on the relay path and provide only the L2 ID of the next WTRU in the path. Each WTRU along the path may determine the next hop based on a routing table (e.g., possibly provided/determined by its own upper layers).

For the relay/discovery selection procedure at the access stratum layer, a WTRU may initiate a relay selection procedure at the access stratum layer, which determines the identification of each WTRU in the relayed path, as well as the number of WTRUs.

The first remote WTRU may determine the configuration parameters for each link based on one or more rules described herein. The first remote WTRU may receive/ determine a common key (e.g., integrity protection, ciphering, etc.) from upper layers to be used for security for the sub-messages to be interpreted by each of the WTRUs along the relay path. In such a situation, the first remote WTRU and all of the WTRUs along the relay path may be able to decode/decipher the common configuration message. Alternatively, the first remote WTRU ciphers/integrity may protect each sub-message independently. The WTRU may then include each ciphered/integrity protected sub-message into a single PDU (e.g., a single RRC message to be transmitted to the next WTRU on the relay path).

The first remote WTRU may tag different sub-messages in the RRC message (e.g., associated with different WTRUs along the path) with the specific WTRU identity. Specifically, each sub-message in the RRC message may be associated with a WTRU ID. For example, each sub-message may be associated with the L2 ID of the WTRU along the relay link. Alternatively, each sub-message may be associated with an index, where increase/decrease of the index represents the next WTRU along the relayed path. Alternatively, each sub-message may be associated with a member ID received from the upper layers.

A relay WTRU may receive the single RRC message from the previous WTRU along the path and may determine its own RRC configuration sub-message based on the associated identity. The relay WTRU may receive/determine this identity from the upper layers. The relay WTRU may decode/apply its own RRC configuration. Specifically, the relay WTRU may create an RLC entity for transmission using the received configuration from the first remote WTRU. The WTRU may further link a received RLC entity to the corresponding transmit RLC entity based on linking (e.g., implicit or explicit) provided in the source configuration.

The relay WTRU may create a new RRC message (e.g., SL RRC configuration message) with the remaining contents of the received RRC message and send the new SL RRC configuration to the next WTRU in the relay path (e.g., another relay in the case of multi-hop, or the destination). In the case where the next WTRU is the second remote WTRU (e.g., destination 193), the second remote WTRU may not perform such an operation of forwarding the remainder of the message. The relay WTRU may include, with the new RRC message transmitted, the L2 ID of the next hop for the relay link based on the routing table provided/determined by upper layers. The relay WTRU may wait for acknowledgement of transmission of the newly transmitted message before acknowledging the received (e.g., original) single configuration message.

In one case, a source WTRU may transmit separate RRC messages to each WTRU in the link. For example, a first remote WTRU (e.g., source 191) may transmit multiple RRC messages to configure each of the WTRUs along the relay path. The first remote WTRU may determine the presence of one or more relay WTRUs along the path to a second remote WTRU (e.g., destination 193) based on similar mechanisms as described herein (e.g., in the previous case).

The first remote WTRU may transmit each RRC message on a different SL-SRB (e.g., LCH). Alternatively, the first remote WTRU may use a single SL-SRB for all configuration messages. The first remote WTRU may perform a configuration procedure based on some specified order, for example: the first remote WTRU may configure the relay WTRU(s) first before configuring the second remote WTRU, where the first remote WTRU may configure each relay WTRU on the relay link in order of their path (e.g., first relay along the relay path is configured first, or first relay along the relay path is configured last); and/or, the first remote WTRU may configure the second remote WTRU first before configuring any of the relay WTRU(s).

During the configuration procedure with each WTRU, the first remote WTRU may wait for confirmation of successful completion of configuration of a given WTRU before configuring the next WTRU in the relay path. Specifically, the first remote WTRU may set a configuration timer and wait for a response message, such as a configuration complete message or an error message. The first remote WTRU may, if a specific configuration with a peer WTRU fails, send a link release message or similar failure indication message to other peer WTRUs that may have been configured prior to the peer WTRU which provided the failure message.

In some cases, each relay WTRU may determine a configuration associated with the next hop in the link. Generally, a WTRU (e.g., source WTRU or relay WTRU) may configure the parts of the SLRB for which it has a peer WTRU in the next hop of the relay path. For example (e.g., using the L2 relay architecture related to the examples of FIGS. 2 and 3), there may be a relay path assuming a first remote WTRU (e.g., source 191), a relay WTRU (e.g., relay 192), and a second remote WTRU (e.g., destination 193), where one or more of the following may occur: the first remote WTRU configures its own TX related parameters for all layers (e.g., SDAP, PDCP, RLC, MAC, PHY); the first remote WTRU configures the RX parameters for lower layers at the relay WTRU (e.g., RLC, MAC, PHY); the first remote WTRU configures the RX parameters for the upper layers at the second remote WTRU (e.g., SDAP, PDCP); relay WTRU configures its own TX related parameters for lower layers (e.g., RLC, MAC, PHY); and/or, relay WTRU configures the RX parameters for the lower layers at the second remote WTRU (e.g., RLC, MAC, PHY).

Without limitation, the above examples may be extended to multi-hop, where a first relay WTRU may configure its own TX related parameters for lower layers and the RX related parameters for a second relay WTRU, and the like.

In one case, a source WTRU may initiate lower layer configuration before end-to-end upper layer configuration. In one example, a first remote WTRU (e.g., source 191) may initiate configuration of the lower layers (e.g., in the possibly first relay of the path) prior to configuring a second remote WTRU (e.g., destination 193). A WTRU may determine whether to perform such a procedure based on an indication received at or a determination from the upper layers (e.g., an indication/determination that a unicast link has been/will be established through a relay WTRU rather than directly with the destination WTRU). The first remote WTRU may determine specific SLRB parameters for the unicast link based on the presence of the relay WTRU. Specifically, the first remote WTRU may select from a different set of (pre) configured SLRB parameters (e.g., from SIB, pre-configuration, or dedicated signaling) based on the information that such a link is a relayed link.

In one example, a first remote WTRU (e.g., source 191) may first initiate a configuration of the lower layers with a first relay WTRU. The first remote WTRU may start a configuration timer (T400) specific to lower-layer configuration of a relayed link, using information about the relayed link, as described herein. Upon successful configuration (e.g., reception of a configuration complete message), the first remote WTRU may then initiate a configuration of the upper layers with the second remote WTRU. The first remote WTRU may use a different SL-SRB for lower layer versus upper layer configuration message transmission. Alternatively, the first remote WTRU may indicate explicitly the intended destination for the transmission (e.g., in the RRC message, or in a protocol header within an adaptation layer or any lower layer PDU).

The first remote WTRU may be configured with independent security keys for transmission of the lower layer configuration and the upper layer configuration and may select the appropriate set of keys to use for each configuration (e.g., lower layer vs upper layer) to perform ciphering and/or integrity protection.

The first relay WTRU may respond to the configuration message from the first remote WTRU immediately following configuration of its RX parameters and/or configuration of its lower-layer TX parameters. Alternatively, the first relay WTRU may perform configuration of its RX parameters and/or its lower-layer TX parameters, and then initiate configuration of the lower layer parameters at the next hop prior to responding to the first remote WTRU. Specifically, the first relay WTRU may respond to the first remote WTRU only after reception of a response from the next WTRU in the relay path (e.g., a second relay WTRU, or destination 193). Specifically, the first relay WTRU may respond with configuration failure message upon reception of a configuration failure message from the next WTRU in the relay path.

The first relay WTRU may create a configuration message for the next path based on the received configuration parameters (e.g., RX parameters) and/or information about the selected TX parameters by the first remote WTRU, as described further herein.

In one case, a source WTRU may initiate upper layer configuration before lower layer configuration. Specifically, a first remote WTRU (e.g., source 191) may initiate and/or complete configuration of the upper layers (e.g., end-to-end configuration with WTRU 3) prior to configuring the lower layers of the relay WTRU (e.g., relay 192). A WTRU may determine whether to perform such a procedure based on an indication from or a determination made by the upper layers (e.g., indication/determination that a unicast link has been/will be established through a relay WTRU rather than directly with the destination WTRU). The first remote WTRU may determine specific SLRB parameters for the unicast link based on the presence of the relay. Specifically, the first remote WTRU may select from a different set of (pre) configured SLRB parameters (e.g., from SIB, pre-configuration, or dedicated signaling) based on the knowledge that such a link is a relayed link.

In an example, a first remote WTRU may create/configure/enable a new SL-SRB (e.g., a relay-link SRB) with a first relay WTRU to perform lower-layer configuration at the first relay WTRU. The first remote WTRU may further create/configure/enable such a lower layer SL-SRB upon successful configuration of the upper layer (end-to-end) link.

In an example, a first relay WTRU may create/configure/enable a new SL-SRB with a second relay WTRU or with a destination WTRU to perform lower-layer configuration with the next WTRU in the relay path. The first relay WTRU may further create/configure/enable such a lower layer SL-SRB upon one or more of the following: an indication/determination from the upper layers that a WTRU will act as a relay; and/or, reception of the end-to-end (e.g., upper layer configuration) message to be relayed to the destination WTRU.

In these examples related to the order of upper/lower layer configuration, the techniques described herein with respect to one approach may be similarly applied to another approach (e.g., when the remote WTRU is configured before the relay, configuring the upper layers may happen before the lower layers; when the relay WTRU is configured before the remote, configuring the lower layers happens before the upper layers).

Figure 7:
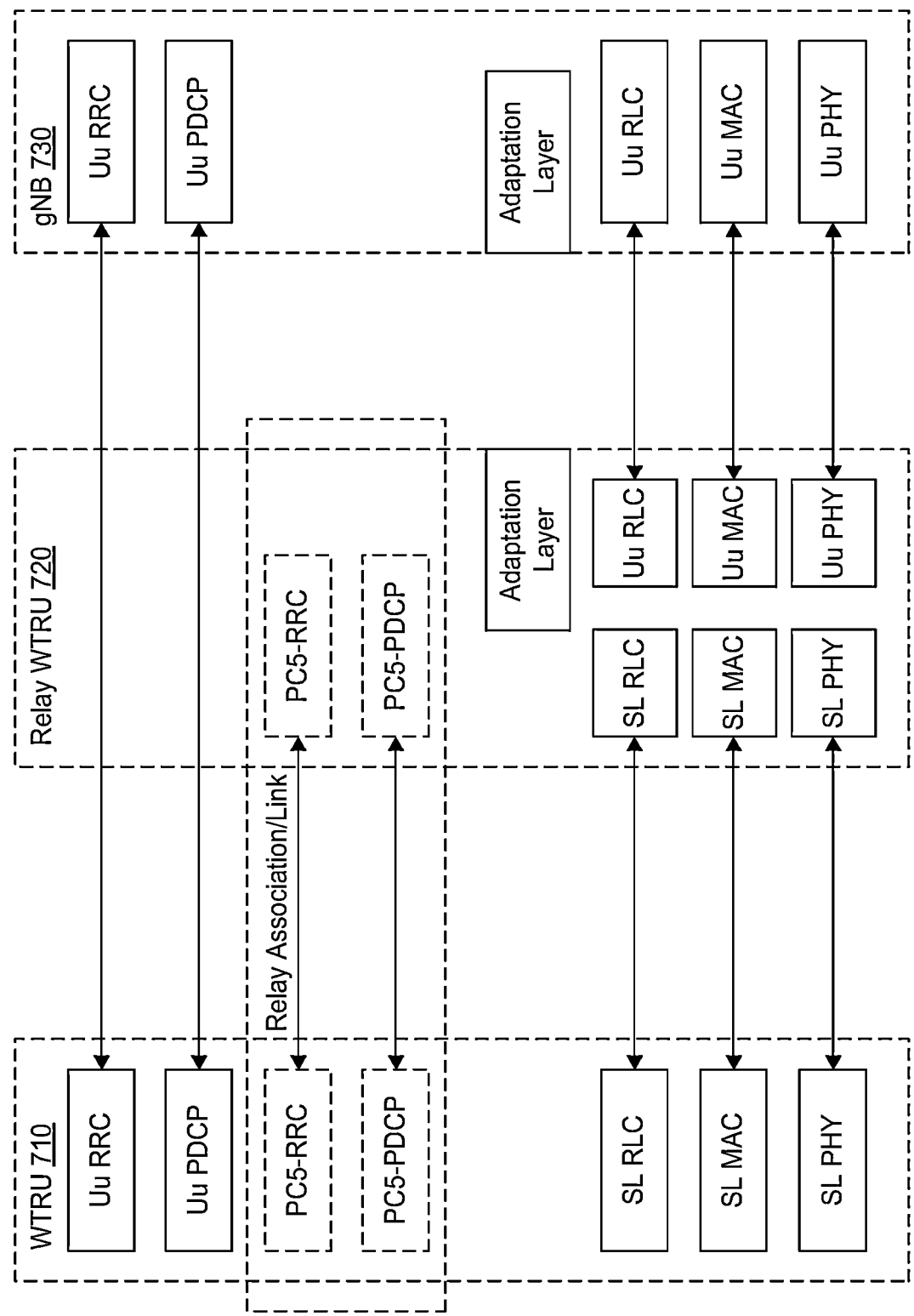
FIG. 7 illustrates an example of a control plane architecture for WTRU-to-NW relays.

In some cases, instead of a WTRU-to-WTRU relay scenario, there may a WTRU-to-network (NW) relay scenario, and there may be one or more approaches for connection establishment and configuration. FIG. 7 illustrates an example of a control plane architecture for a WTRU-to NW relay having a SL-RRC connection (e.g., PC5-RRC connection) between the remote WTRU 710 and the relay WTRU 720. Specifically, the relay WTRU 720 may be configured with a SL-RRC layer to communicate with the remote WTRU 710 (e.g., and establish the SL RRC connection). Once the SL RRC connection is established, Uu RRC signaling (e.g., in addition to Uu traffic) may be exchanged between the remote WTRU 710 and the NW (e.g., gNB 730) as though the remote WTRU 710 were communicating directly via Uu. All Uu RRC traffic may be forwarded via the relay WTRU 720. The SL-RRC connection may be used to configure the SL connection/link for the association between the relay link and the remote WTRU 710. Once such association is established, the remote WTRU 710 may communicate with the NW 730 via the relay.

Upon establishment of the PC5-RRC connection with the relay WTRU 720, the remote WTRU 710 Uu state transitions may be made via Uu RRC signaling exchange with the NW 730 via relayed Uu RRC signaling. The remote WTRU 710 may be in one or more states of RRC_CONNECTED, RRC_IDLE, and/or RRC_INACTIVE in Uu while maintaining a SL-RRC connection to the relay WTRU 720.

In one case, there may be one or more conditions for establishing a Uu RRC connection via a WTRU-to-NW relay. A first remote WTRU (e.g., source 191) may establish/resume a Uu RRC connection directly on Uu or via a WTRU-to-NW relay (e.g., relay 192 linking to a network node 193). Triggers to establish a Uu connection may be the same, or different, triggers for Uu in legacy (e.g., arrival of UL data, initiation of a PDU session, reception of paging, etc.). A WTRU Out of Coverage (OOC) (e.g., source 191) may need to choose to establish a Uu RRC connection via a WTRU-to-NW relay (e.g., relay 192) since it has no other option of communicating. A WTRU (e.g., source 191) in coverage (e.g., camped to a cell) may be configured with rules for deciding whether to establish a Uu connection via a WTRU-to-NW relay (e.g., relay 192), or directly via Uu. In some cases, such rules may determine the order of the connection procedure (e.g., whether to initially attempt a connection via a relay and then attempt the connection via Uu directly, or initially attempt the connection via Uu directly and then attempt a connection via a relay). In other cases, such rules may indicate that only one connection should be attempted (e.g., via a relay only, or via Uu only) and if the establishment fails via the selected link, the WTRU may consider itself to be barred or out of service. In either situation, a number of factors may be involved in deciding the link over which to establish the connection.

A first remote WTRU (e.g., source 191) may make the decision of relay versus direct connection, both, and/or neither, based on one or more of the following factors: whether a remote WTRU has a PC5-RRC connection established with a relay WTRU; Uu cell quality; SL quality (e.g., based on SL CQI, SL RSRP, flow/congestion control measurements, etc.); indication from a peer WTRU (e.g., remote or relay); property associated with the Uu DRB/LCH initiating the resumption; based on the amount of data pending for transmission by the remote WTRU; based on the DC configuration at the remote WTRU, or the activation state of the SCG at the WTRU; based on the cell configuration; based on the presence of SL traffic (e.g., non-relayed); and/or, based on the camped cell relationship with the cell serving the relay WTRU. These factors may be taken alone, or taken in combination with one or more other disclosed factors. For example, a remote WTRU may be configured with two thresholds such as Uu quality and SL quality, and may decide on SL or UL depending on the quality of each link with respect to the corresponding threshold.

One factor that may be involved in deciding the link over which to establish a connection may be whether the remote WTRU has a PC5-RRC connection established with a relay WTRU. For example, a remote WTRU may initiate a PC5-RRC connection establishment procedure with a relay WTRU. Such establishment may be triggered by upper layers. Such establishment may be known by the access stratum layer to be for the purposes of relaying only. A remote WTRU may establish a Uu connection via a WTRU-to-NW relay only if it has an active PC5-RRC connection established with a relay WTRU.

One factor that may be involved in deciding the link over which to establish a connection may be Uu cell quality. For example, a remote WTRU may establish/resume a Uu RRC connection via a relay WTRU as long as the Uu quality (e.g., RSRP) of the camped cell is below a threshold.

One factor that may be involved in deciding the link over which to establish a connection may be SL quality (e.g., based on SL CQI, SL RSRP, flow/congestion control measurements, etc.). For example, a remote WTRU may establish/resume a Uu RRC connection via a relay WTRU as long as the PC5 link quality is above a threshold. Such link quality may be derived from SL CQI reports, SL RSRP reports, reports of the buffer occupancy, or similar, from the another WTRU (e.g., relay WTRU). In another example, a remote WTRU may establish a Uu RRC connection via a relay WTRU as long as the sidelink CBR is below a threshold. A remote WTRU may change from a direct Uu link to a relayed Uu link if the CBR changes accordingly.

One factor that may be involved in deciding the link over which to establish a connection may be one or more indications from the relay WTRU. For example, a remote WTRU may establish/resume a Uu RRC connection via a relay WTRU if the relay WTRU allows this, or based on information provided by the relay WTRU. For example, a remote WTRU may receive an indication from the relay WTRU that a relayed connection cannot be established. Such indication may come in the form of a response to a PC5-RRC reconfiguration message (e.g., a reconfiguration failure). Such indication may come in the form of a PC5-RRC message or other protocol layer message initiated by the relay WTRU (e.g., a flow control message explicitly/implicitly indicating such; e.g., a PC5-RRC message broadcast by the relay WTRU indicating that the relay should not be accessed).

One factor that may be involved in deciding the link over which to establish a connection may be one or more properties associated with the Uu DRB/LCH initiating the resumption. A remote WTRU in RRC_INACTIVE may determine the link (e.g., via relay or Uu) to resume its RRC connection based on a property or a configuration aspect of the bearer which triggered the resumption. For example, a WTRU may be configured with a bearer/LCH or set of bearers/LCH which allow resumption via one link or another only. For example, a WTRU may be configured to perform resumption via Uu for bearers configured for small data. For example, a WTRU may be configured to perform resumption via Uu if the priority of the LCH meets some (pre) configured condition.

One factor that may be involved in deciding the link over which to establish a connection may be based on the amount of data pending for transmission by a WTRU. For example, a remote WTRU may be configured to perform resumption via a relay WTRU or via Uu if the amount of data pending for transmission by the remote WTRU is above/below a threshold.

One factor that may be involved in deciding the link over which to establish a connection may be based on the DC configuration at the remote WTRU, or the activation state of the SCG at the remote WTRU. For example, a remote WTRU may be allowed to resume via a relay WTRU if it is configured with single connectivity, or if the WTRU is configured with a deactivated SCG. Otherwise, if the remote WTRU is configured with dual connectivity, and/or the remote WTRU has an activated SCG at the time the remote WTRU was sent to INACTIVE, the remote WTRU may resume via direct Uu connectivity.

One factor that may be involved in deciding the link over which to establish a connection may be based on the cell configuration. For example, a remote WTRU may be configured to connect via a relay WTRU if the cell on which the remote WTRU is camped provides configuration for sidelink and/or relaying.

One factor that may be involved in deciding the link over which to establish a connection may be based on the presence of SL traffic (e.g., non-relayed). For example, a remote WTRU may be configured to connect via a relay WTRU if the remote WTRU has SL data to transmit, possibly to the same WTRU acting as the relay, at the time when it also has Uu data to transmit.

One factor that may be involved in deciding the link over which to establish a connection may be based on the camped cell relationship with the cell serving the relay WTRU. For example, a remote WTRU may be configured to connect via a relay WTRU if the remote WTRU is camped to the same or related cell to the cell serving the relay WTRU. Relatedness may be determined by comparing, for example, system information of the cell acquired via Uu by the remote WTRU, and system information forwarded by the relay WTRU. A related cell may be defined as, for example, one or more of the following: part of a list of cells known by a WTRU to be related (e.g., INACTIVE paging area or similar); having a pre-configured relationship between the cell IDs; having the same PLMN or allowed PLMNs; and/or, having some other common information between the system information of the two cells (e.g., identifier, specific IE, etc.).

Figure 8:
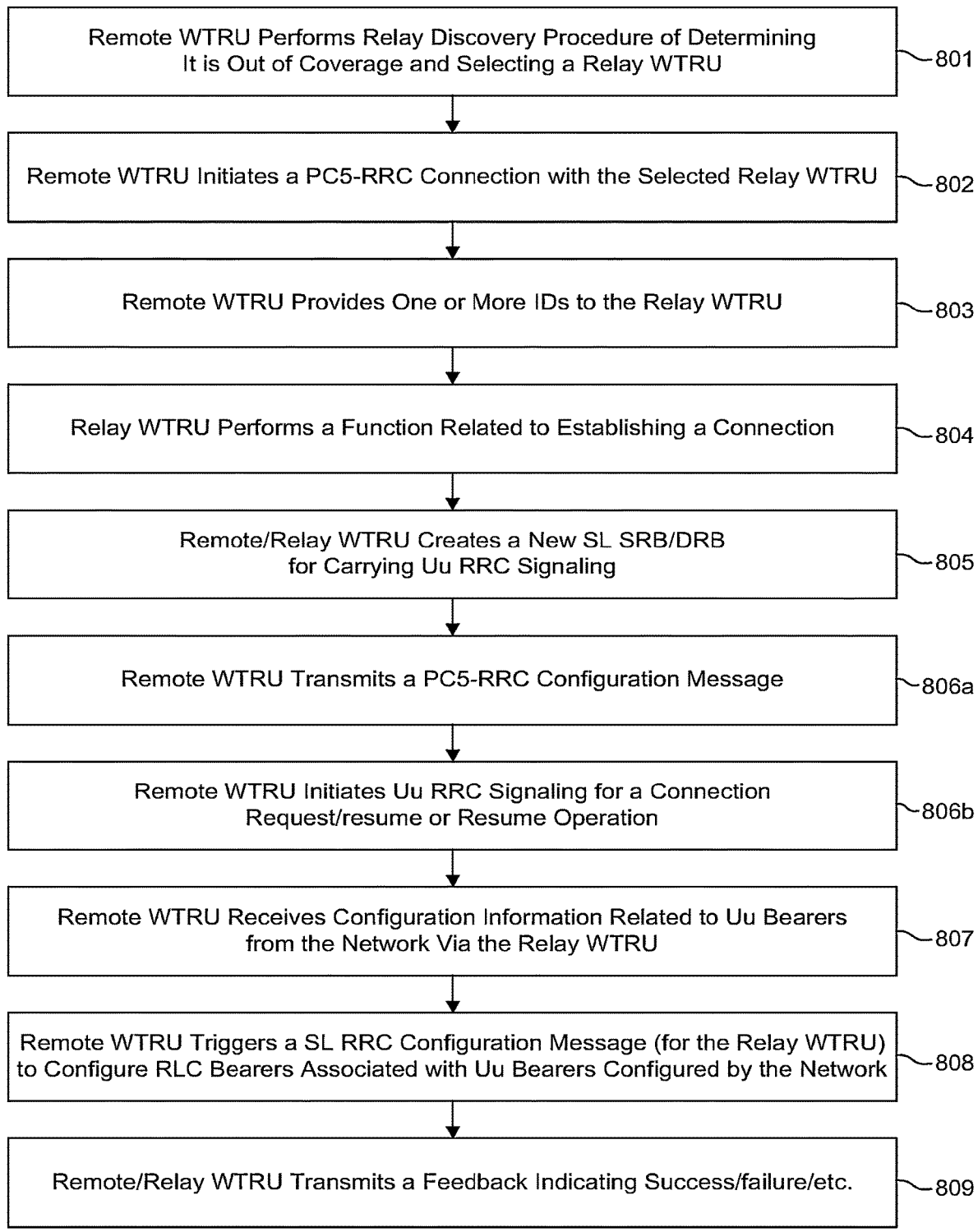
FIG. 8 illustrates an example procedure of establishing a Uu session via a relay WTRU.

In one case, there may be one or more procedures for establishing a Uu session via a relay WTRU. FIG. 8 illustrates an example procedure of establishing a Uu session via a relay WTRU. The steps shown, and described herein with relation to FIG. 8, are numbered for demonstrative purposes only, are not intended to limit the order (e.g., the steps may be performed in any order), preclude additional steps from being a part of this or any other related process (e.g., there may be a step before a first step, or there may be a step between a first step and a second step, etc.), and/or require that any step be performed (e.g., one or more steps may be omitted). Further, only part of a step may be carried out.

At 801, the remote WTRU may perform a relay discovery procedure while out of coverage, and select a relay WTRU. Alternatively, if the remote WTRU is in coverage and RRC_CONNECTED, it may receive the relay WTRU to connect to via the NW, or may receive a list of relay WTRUs to connect to and select among them (e.g., select the best relay WTRU).

At 802, the remote WTRU (e.g., upper layers) may initiate a PC5-RRC connection with the selected relay WTRU. The remote WTRU may continue to monitor such PC5-RRC connection to determine whether to tear down and/or initiate a different link (e.g., in the case of mobility). Triggering of a PC5-RRC connection may be initiated by the initiation of an access (Uu) by the upper layers for which the remote WTRU determines that such access should be made via the WTRU-to-NW relay, as per conditions defined herein.

At 803, the remote WTRU may provide a WTRU ID to the relay WTRU (e.g., in the PC5RRCReconfiguration message) upon establishment of the PC5-RRC connection (e.g., by upper layer). The WTRU ID provided by the remote WTRU may depend on the RRC/coverage state of the remote WTRU when the PC5RRCReconfiguration message is triggered. Specifically, the remote WTRU may: send an TMSI or similar CN identifier to the relay WTRU when the remote WTRU establishes the PC5-RRC connection while it is out of coverage, or while it is in coverage of Uu and RRC_IDLE prior to the establishment of the PC5-RRC connection; send a RAN area ID when the remote WTRU establishes a PC5-RRC connection while it is in coverage and RRC_INACTIVE prior to the establishment of the PC5-RRC connection; and/or, send a C-RNTI when the remote WTRU establishes a PC5-RRC connection while it is in coverage and RRC_CONNECTED.

Alternatively, the remote WTRU may provide several/all of the IDs to the relay WTRU, and inform the relay WTRU of a state change, as described herein.

The relay WTRU may further provide the WTRU ID(s) of all connected remote WTRUs to the network.

In some situations, the remote WTRU may inform the relay WTRU of its RRC state (e.g., with respect to Uu) and/or coverage state, possibly at the time in which it provides the ID and/or following a change in such state. For example, the remote WTRU may inform the relay WTRU of the remote WTRUs RRC state and/or coverage state upon establishment of the PC5-RRC connection. For example, the remote WTRU may send a PC5-RRC message upon change of Uu state (e.g., from RRC_CONNECTED to RRC_IDLE, from RRC_CONNECTED to RRC_INACTIVE, etc.). For example, the remote WTRU may send a PC5-RRC message upon change of Uu coverage. A change of Uu coverage that may trigger such a message may be characterized by one or more parameter disclosed herein, such as when measurements of the Uu (e.g., RSRP/RSRQ/etc.) fall above/below a threshold.

The relay WTRU may use the information of the RRC state/coverage from one or multiple remote WTRUs to perform one or more of the following (e.g., without loss of generality, for operations on SL which apply to both relay and remote WTRU(s), and/or the remote WTRU may also perform the same upon its own Uu state transition): inform the network of its allowed state transitions and/or the state(s) of the connected remote WTRUs and/or the establishment of a PC5-RRC connection with a remote WTRU; initiate connection establishment/resume (e.g., a relay WTRU may be moved to INACTIVE/IDLE by the network, where if the relay WTRU has at least one connected remote WTRU in Uu RRC connected, the relay WTRU may initiate a connection establishment/resume immediately following the transition to INACTIVE/IDLE); initiate/change discovery transmission behavior (e.g., a relay WTRU may change the periodicity of discovery message transmissions; e.g., a relay WTRU may start/stop discovery transmissions); initiate/change SL measurement reporting/request (e.g., a relay WTRU may start/stop transmission of CSI requests/measurements to the remote WTRU; e.g., a relay WTRU may change the periodicity of SL RSRP measurement reports, and/or configuration); and/or, initiate/change SL RLF monitoring (e.g., a relay WTRU may start/stop SL RLF monitoring with the specific remote WTRU when the remote WTRU moves from one Uu RRC state to another Uu RRC state; e.g., a relay WTRU may apply a different set of SL RLF parameters, such as a number of consecutive HARQ NACK triggering RLF, with a remote WTRU, depending on the RRC state of the remote WTRU).

Regarding the relay WTRU informing the network, in one example the relay WTRU may inform the network (e.g., via a Uu RRC message) upon the establishment of a PC5-RRC connection with a remote WTRU. The relay WTRU may provide to the network, in the Uu RRC message: the remote WTRU Uu ID(s) as described herein, and/or the SL L2 ID(s) corresponding to the remote WTRU; and/or, the location of the remote WTRU. For example, the remote WTRU may provide its WTRU location (e.g., in the form of a zone ID) to the relay WTRU, which the relay WTRU may include in the RRC message; and/or, the list or number of connected remote WTRUs connected to the relay for relaying services. In another example, a relay WTRU may inform the network that it should remain in RRC connected, due to the presence of at least one remote WTRU in RRC_CONNECTED. For example, a relay WTRU may transmit an RRC message. In another example, a relay WTRU may inform the network when there is at least one remote WTRU in RRC_CONNECTED, or when there is a change from 0 to at least 1 (e.g., or vice versa) remote WTRUs in RRC_CONNECTED, for example: a relay WTRU may send a Uu RRC message to the network when the number of remote WTRUs in RRC_CONNECTED changes to/from 0; and/or, a relay WTRU in RRC_IDLE/RRC_INACTIVE may trigger an RRC connection with the network when the number of remote WTRUs in RRC_CONNECTED changes from 0 to at least 1.

At 804, upon establishment of the PC5-RRC link (e.g., by upper layers) and/or reception of the RRCReconfiguration message, the relay WTRU may perform one or more of the following: trigger a RACH procedure; initiate a connection establishment procedure (e.g., in case the relay WTRU is RRC_IDLE) or a connection resume procedure (e.g., in case the relay WTRU is in RRC_INACTIVE); inform the network that the remote WTRU is connected and provide the received WTRU ID to the network; and/or, trigger a PC5Reconfiguration procedure with the remote WTRU.

Upon establishment of a PC5-RRC connection by the remote WTRU and/or successful configuration of the PC5-RRC RLC channels and/or successful Uu connection establishment procedure, the relay WTRU may provide relay-related configuration to the remote WTRU. Specifically, the relay WTRU may provide one or more of the following to the remote WTRU (e.g., in a PC5RRC message): a groupcast L2 ID to be monitored by the remote WTRU while connected to the relay WTRU; system information, such as to provide system information from a network node (e.g., gNB) with which the relay WTRU is camped/connected (e.g., a relay WTRU may transmit a PC5-RRC message which encapsulates one or more SIB(s) acquired from the camped/connected gNB); and/or, SL DRX configuration, such as to provide the remote WTRU with the expected SL DRX configuration (e.g., resources to be monitored by each remote WTRU while in DRX).

Regarding providing the groupcast L2 ID, the relay WTRU may receive/determine (e.g., from upper layers or from the network), a groupcast L2 ID for broadcast of control messages to all attached remote WTRUs. Specifically, the remote WTRU may initiate filtering for such groupcast L2 ID upon receiving it from the relay WTRU. For example, a relay WTRU may broadcast a release message (e.g., to inform the remote WTRUs to release the association with the relay and initiate link establishment to another relay) to all remote WTRUs using the broadcast address. Specifically, the relay WTRU may broadcast system information, or changes in system information using a groupcast message addressed to the groupcast L2 ID associated with the relay connection.

At 805, the remote and/or relay WTRU may create a new SL-SRB/DRB for carrying of Uu RRC signaling, as described further herein. Creation of such SL-SRB/DRB for Uu RRC signaling may involve the exchange of PC5-RRC signaling for configuration of the SL RLC bearer. Alternatively, a default configuration may be assumed.

At 806a, the remote WTRU may transmit a PC5-RRC configuration message to provide information for admission control by the relay WTRU, as described further herein.

Additionally/alternatively, at 806b, the remote WTRU may initiate Uu RRC signaling for a connection request, connection resume, or resume operation (e.g., for the case where the WTRU is resuming an RRC connection which was previously established and active via Uu).

At 807, following completion of the Uu RRC signaling in 806a and/or 806b, the remote WTRU may receive (e.g., from the network in dedicated signaling over the relayed Uu bearers) a configuration for the Uu DRBs and corresponding mapping to SL RLC bearers. Specifically, the remote WTRU may receive, in a Uu RRC reconfiguration message, a Uu bearer configuration (e.g., containing the configuration of PDCP, SDAP only) in addition to the associated RLC bearer configuration.

At 808, the remote WTRU may trigger a SL RRC configuration message to configure the RLC bearers associated with the Uu bearers configured by the network. The remote WTRU may derive the RLC bearer configuration to be provided to the relay WTRU from the configuration provided by the network At 809, upon successful SL RRC configuration procedure (e.g., reception of a SL configuration confirm), the remote WTRU and/or the relay WTRU may send a Uu configuration complete message to the network, or a similar RRC message indicating successful configuration of the bearer. Upon failed SL RRC configuration procedure (e.g., for reasons of access control), the remote WTRU and/or relay WTRU may send an indication of failure to the network, and in some cases the indication includes the failure cause.

In one case, there may be conditions at the remote WTRU for initiating/maintaining/releasing a relay association/link or triggering a SL bearer configuration procedure(s). A WTRU may initiate an association with a relay based on one or more triggers. Additionally, a WTRU may initiate a sidelink reconfiguration message with a relay WTRU as a result of one or more triggers. A WTRU may perform relay association first, and then may later perform SL Bearer Configuration Procedure. Similar/same triggers may apply to both or either. Specifically, for one or more of the triggers described herein where references is made to establishing a link, the same triggers may be used for performing a SL bearer configuration procedure to establish a SL bearer (e.g., a SL RLC bearer for L2 relaying architecture). For example, a WTRU may use one or more of the below triggers to initiate SL bearer configuration procedure with the relay WTRU. For example, a WTRU may use one or more of the below triggers to create a SL RLC bearer for transmission.

In some cases, a remote WTRU may determine whether or not to initiate a relay/association link with a relay WTRU and/or initiate SL bearer configuration procedure(s) based on one or more factors/triggers, such as: coverage of the remote WTRU; amount of traffic on Uu related to Uu capacity condition; availability of an appropriate relay WTRU; location of the remote WTRU (e.g., in relation to the relay WTRU); whether the relay WTRU is part of a configured set of relays provided by the network; measurements of the SL at the remote/relay WTRU; QoS of the Uu flows/bearers configured at the remote WTRU, and/or an estimated achievable QoS; explicit/implicit indication by the network via Uu; and/or, a Uu RRC state of the remote WTRU.

For the factor related to coverage of the remote WTRU, in one example, a remote WTRU may initiate a relay association/link when it detects an out of coverage condition, such as: Uu RSRP falls below a threshold; cell selection criteria (e.g., S criteria) is not met; and/or, a WTRU cannot find a suitable cell to camp on, potentially associated with an allowed PLMN.

For the factor related to amount of traffic on Uu related to Uu capacity condition, a remote WTRU may initiate a relaying link to offload the Uu traffic. For example, a remote WTRU may initiate a relay association/link based on one or more of the following: The amount of data in the buffers associated with Uu traffic is above a (pre) configured threshold; and/or, the amount of data associated with a specific bearer or RLC channel is above a (pre) configured threshold.

For the factor related to availability of an appropriate relay WTRU, where the appropriateness of the WTRU may be based on one or more of the following (e.g., regarding the relay WTRU): signal quality (e.g., from the discovery message); support of an upper layer service (e.g., relaying service, as indicated in the upper layer discovery message); connection of the relay to an allowed PLMN/network; location of the relay in terms of zone ID or similar (e.g., compared to the location of other relays and/or the location of the remote WTRU). For example, a remote WTRU may receive system information from the relay WTRU (e.g., broadcast on SL, transmitted along with a discovery message, transmitted in PC5-RRC, etc.) before or after performing the relay association link. If the system information is received prior to performing the association link, the remote WTRU may determine whether to initiate a link with the relay based on information in the received system information. For example, the remote WTRU may initiate a link if the PLMN(s) in the relayed system information is part of the allowed PLMNs at the WTRU. If the system information is received after performing the association link, the remote WTRU may determine whether to maintain or release the relay association link based on information in the received system information. For example, the remote WTRU may release the link if the PLMN(s) in the relayed system information is part of the allowed PLMNs at the WTRU. Similar signaling/behavior may be observed by the WTRU for other information in system information which allows a WTRU to connect to the network (e.g., admission control)

For the factor related to location of the remote WTRU (e.g., possibly in relation to the relay WTRU), in one example, the remote WTRU may initiate/release a link if it is located in a zone that is configured as an allowed/not allowed zone for connection to a relay WTRU. In one example, the remote WTRU may initiate/release a link if the distance between the remote WTRU and the relay WTRU is above/below a threshold.

For the factor related to whether the relay WTRU is part of a configured set of relays provided by the network, in one example, the network may provide (e.g., in dedicated Uu signaling) a set of allowed relay WTRUs, and the remote WTRU may be allowed to initiate a link only to one of these allowed relays.

For the factor related to one or more measurements of the SL at the remote/relay WTRU, in one example, the measurements may comprise of CBR, CR, CQI, RSRP, any function of the sensing results (e.g., average number of available resources), and/or the like.

For the factor related to QoS of the Uu flows/bearers configured at the remote WTRU (e.g., along with an estimated number of available QoS), in one example a remote WTRU may release a link, or indicate release of the link to the relay WTRU and/or NW (e.g., via the relayed link) if the remote WTRU determines that the end-to-end QoS cannot be met based on some preconfigured conditions associated with the SL quality. For example, the WTRU may be configured with a release condition for each configured Uu bearer, QoS flow, or QoS quantity (e.g., 5QI), where such a release condition may be in terms of a measurement disclosed herein (e.g., CBR). For example, a WTRU may be configured with a threshold CBR for each configured Uu bearer, and the WTRU may release the link and/or inform the relay WTRU/NW when the measured CBR exceeds the threshold for any established bearer.

For the factor related to explicit/implicit indication by the network via Uu, in one example, a remote WTRU may receive an explicit indication from the network via Uu signaling to initiate a relay link. Upon reception of such an indication from Uu, the remote WTRU may initiate a link to a relay WTRU. Such indication may be in the form of, or contained within: a paging message; a dedicated RRC message (e.g., a WTRU may receive an RRCReconfiguration message (via Uu) which initiates a relay association, then the WTRU may determine to initiate such relay association due to the contents of the reconfiguration message, where, for example, a WTRU may initiate an association with a relay if it receives an RRCReconfiguration message containing a SLRB configuration); a MAC CE or DCI; and/or, the like. A WTRU may further initiate a PC5-RRC connection implicitly based on the indication received from the network in Uu signaling (e.g., a paging message; a dedicated RRC message; and/or a MAC CE or DCI). For example, the WTRU may receive a SL grant from the network, where such a sidelink grant may be received while the WTRU does not have any SL data to transmit in its buffers. Additionally/alternatively, such a sidelink grant may be received following indication by the WTRU to the network (e.g., transmission of SLWTRUInformation) that a new QoS flow on sidelink is to be established, or that a new unicast link should be established (e.g., indicated by upper layers).

For the factor related to the Uu RRC state of the remote WTRU, in one example, a condition to establish and/or release a PC5-RRC connection and/or a radio bearer on PC5 may depend on the Uu RRC state of the remote WTRU, possibly in conjunction with other conditions. For example, a remote WTRU may allow the use of a particular condition for establishing/releasing a PC5-RRC connection when the remote WTRU is in a specific Uu RRC state (e.g., RRC_CONECTED, RRC_INACTIVE, RRC_IDLE). Specifically, a remote WTRU may allow release of a PC5-RRC connection based on measurements, or use a different set of criteria for such measurements, when the remote WTRU is in RRC_IDLE/RRC_INACTIVE, as opposed to RRC_CONNECTED.

Such determination(s) described herein (e.g., determinations using the above factors) may result in, or be manifested by, one or more of the following at the remote WTRU (e.g., "initiate a link" may actually be manifested by one or more of the following WTRU behavior): the remote WTRU may determine at, and/or inform, the upper layers of the desire to initiate/release a PC5 unicast link; the remote WTRU may inform upper layers of the relay WTRU(s) that are allowed for relaying function (e.g., based on the PLMN/system information associated with the network the relay is connected to); the remote WTRU may initiate transmission of a PC5-RRC reconfiguration message to configure the PC5-Unicast link; the remote WTRU may store/release a PC5-RRC context for the established PC5-RRC connection; and/or, the remote WTRU may release an established PC5-RRC connection and may inform the network of such (e.g., through a SLWTRUInformation message), and/or send a release message to the relay WTRU.

In some situations, a remote WTRU may be configured with conditions on whether/when to release a PC5-RRC connection (e.g., trigger a release message to the peer/relay WTRU) autonomously while the remote WTRU is in RRC_IDLE/RRC_INACTIVE. A remote WTRU, when releasing a PC5-RRC connection while in RRC_IDLE/INACTIVE, may maintain such RRC state (e.g., IDLE/INACTIVE) via Uu. Alternatively, the remote WTRU may release its RRC state (e.g., move to OOC) when it releases the PC5-RRC connection. Such conditions may be related to or defined by one or more of the following: a period of time whereby the WTRU is in IDLE/INACTIVE on Uu; a QoS and/or bearers configured at the remote WTRU; based on explicit indication(s) received by the network in a release message; based on measurements of sideline (e.g., CBR, CR, SL RSRP, SL CQI, etc.); a target state (e.g., associated with the release); and/or, based on coverage/measurements of Uu.

For the conditions relating to or defined by the period of time whereby the WTRU is in IDLE/INACTIVE mode on Uu, in one example, the remote WTRU may be configured with a timer for IDLE/INACTIVE, whereby the timer is started when the remote WTRU is transitioned to RRC_IDLE/RRC_INACTIVE. The timer may be restarted upon resume/connection establishment, possibly via the relay. The remote WTRU may release the PC5-RRC connection upon expiry of the timer.

For the conditions relating to or defined by the QoS and/or bearers configured at the remote WTRU, in one example, the remote WTRU's INACTIVE context may comprise of the bearers that are maintained while in RRC_INACTIVE. A remote WTRU may determine whether/when to release the PC5-RRC connection based on the bearer configuration or some element associated with the bearer configuration.

For the conditions relating to or defined by an explicit indication received by the network in the release message, in one example, the remote WTRU may receive a release to IDLE/INACTIVE from the network which indicates whether the remote WTRU should release or keep the PC5-RRC connection. If the WTRU releases the PC5-RRC connection, it may maintain the IDLE/INACTIVE state with the network assuming a non-relayed (e.g., via Uu) link.

For the conditions relating to or defined by measurements of sidelink (CBR, CR, SL RSRP, SL CQI, etc.), in one example, the remote WTRU in RRC_INACTIVE/RRC_IDLE may be configured with a threshold CBR, above which a remote WTRU may release the PC5-RRC connection.

For the conditions relating to or defined by the target state (e.g., associated with the release), in one example, the remote WTRU may be configured to always release the PC5-RRC connection when it is released to RRC_IDLE, but configured to maintain the PC5-RRC connection when it is released to RRC_INACTIVE, possibly in combination with other conditions described herein.

For the conditions relating to or defined by coverage/measurements of Uu, in one example, a remote WTRU may release the PC5-RRC connection when it receives a release message, and when the measurements of Uu are above a threshold. In such a case, the remote WTRU may maintain the RRC state with the network via direct (Uu) interface.

In some situations, a WTRU may receive a Uu reconfiguration via a Uu RRC reconfiguration relayed via a relay WTRU. This WTRU may be configured with conditions on sidelink for which the RRC reconfiguration cannot be applied, and the WTRU may fail the reconfiguration (e.g., respond with an RRC reconfiguration failure) based on the sidelink conditions. Specifically, any condition described herein (e.g., in the situations described herein related to conditions for initiating/releasing a link) may be used for conditions associated with failing a Uu reconfiguration. Further, a Uu reconfiguration may configure the remote WTRU with a Uu related aspect that is not allowed for a given sidelink condition, given the sidelink configuration. For example, a WTRU may receive a reconfiguration to configure a Uu bearer with a specific QoS. The WTRU may determine a failure has occurred for the reconfiguration if the measured CBR at the remote WTRU is larger than a threshold, and/or if the measured relay RSRP is less than a threshold where such thresholds may further be associated with the given bearer configuration or QoS for the Uu bearer In some situations, a WTRU may trigger a SL reconfiguration and/or bearer establishment as a result of reception of a Uu (re) configuration. In such situations, a Uu bearer may be mapped to a specific SL bearer when the Uu bearer is established via a relay WTRU, a SL configuration aspect may be tied to a Uu configuration aspect for which the SL is being used for relaying, and/or a SL configuration aspect may be tied to the Uu bearer(s) currently active.

In one instance, a WTRU (e.g., remote WTRU or relay WTRU) may be configured with a rule or mapping between a Uu bearer to SL bearer. Specifically, a WTRU may be configured with a rule to map data arriving at a Uu bearer to a specific SL bearer. Examples of such rules may be: a WTRU may be configured with a mapping of Uu QoS flows to SL bearer, and upon creation of Uu bearer associated with the mapped Uu QoS flows, the WTRU may create/map a Uu bearer to a SL bearer that has the associated Uu QoS flows; and/or, a WTRU may be configured with a mapping of Uu bearer ID to SL bearer ID, and a WTRU may, upon establishment of an RRC_CONNECTION with the network, receive a dedicated configuration for the SL bearers, along with a mapping of Uu bearer ID to SL bearer ID, where the WTRU may create a SL bearer upon configuration of the Uu bearer by the network and perform the linking based on the bearer ID.

In one instance, a WTRU may create a SL bearer upon reception of a Uu reconfiguration that initiates creating a Uu bearer, assuming the SL bearer is not currently created and/or the Uu bearer created is currently mapped to a SL bearer.

In one instance, a WTRU may determine a SL configuration aspect (e.g., a parameter associated with SL configuration, a SL bearer configuration, etc.) based on a Uu configuration aspect associated with a Uu bearer that is mapped to the corresponding SL bearer.

In one instance, reception of a Uu reconfiguration (e.g., at the remote WTRU) may trigger/initiate a SL reconfiguration for the SL. Specifically, a WTRU may initiate reconfiguration of a SL parameter, bearer, or the like as a result of the network change of a particular Uu configuration parameter, bearer, or the like. Such reconfiguration may further be tied to an association or dependency between a Uu configuration parameter/bearer/or the like and a SL configuration parameter/bearer/or the like. Examples of a SL configuration parameter, bearer, or the like, may be one or more of: SDAP, PDCP, RLC, MAC layer etc. configuration (e.g., a flow to bearer mapping configuration); RS configuration (e.g., for CQI reporting); HARQ enable/disable setting; PHY layer parameters related to power control, resource selection, etc. (e.g., a maximum number of retransmissions, a maximum transmit power); and/or, a similar or related parameter or condition.

For example, a WTRU may be configured with a mapping or association between a Uu configuration parameter and a SL configuration parameter. Upon change of such a Uu configuration parameter, the WTRU (e.g., remote WTRU) may initiate a reconfiguration of the associated SL configuration parameter. The WTRU may: modify configuration of a SL bearer, such as a change in any SDAP, PDCP, RLC, or MAC layer configuration for a SL bearer; and/or, initiate a SL reconfiguration transmission on PC5-RRC (e.g., as a result of the change in SL bearer reconfiguration triggered by Uu reconfiguration).

For example, a WTRU may be configured with one or more SL RLC sequence number size associated with a Uu PDCP sequence number size. The WTRU may trigger a reconfiguration of a SL bearer upon reception of a Uu reconfiguration.

For example, a WTRU may be configured with a rule to define HARQ enable/disable for a SL bearer based on the configuration of the Uu bearer transported over the SL bearer (e.g., characteristic of and/or the number of QoS flows mapped to the Uu bearer). Upon reception of a Uu reconfiguration which may require a change of the HARQ enable/disable, the WTRU may reconfigure the SL bearer associated with the reconfigured Uu bearer (e.g., change the HARQ enable/disable of the SL bearer).

For example, a WTRU may be configured with a rule to define a SL bearer configuration aspect (e.g., HARQ enable/disable, LCH priority, etc.) based on the presence of one or more particular Uu bearers currently mapped to the SL bearer and/or the number of Uu bearers currently configured and mapped to the SL bearer.

In some situations, a first remote WTRU (e.g., source 191) may trigger SL bearer establishment by a relay WTRU (e.g., relay 192) upon reception of Uu bearer (re) configuration. In some cases, there may be an issue where a Uu bearer configuration is bi-directional, and may be sent to the remote WTRU transparently of the relay WTRU (e.g., via RRC). The SL bearer configuration may be from the TX WTRU perspective, and therefore may be known to the relay WTRU.

In some cases, a remote WTRU, may initiate a procedure for triggering a SL bearer establishment in the relay WTRU upon reception of a Uu bearer (re) configuration. This procedure may comprise of one or more messages, such as a PC5-RRC message (e.g., a SL Reconfiguration message or a new PC5-RRC message) containing one or more of the following: a portion/subset of the Uu configuration received from the network (e.g., a remote WTRU may send the DL configuration associated with a Uu bearer to the relay WTRU via a PC5-RRC message; e.g., the PC5-RRC message may contain IEs associated with a Uu configuration, such as in an encapsulated RRC message); a suggested/determined PC5-RRC configuration for the relay WTRU that is derived by the remote WTRU, using mechanisms disclosed herein. Upon reception of the message(s), the relay WTRU may initiate a SL bearer configuration (e.g., towards the relay WTRU) using the information provided by the remote WTRU, and possibly using one or more mechanisms disclosed herein.

In some instances, a relay/remote WTRU may create a new SL/Uu SRB/DRB (e.g., RLC bearer) upon establishment of a link for relaying. Uu RRC signaling may be carried over the SL via one or more dedicated SL-SRB or SL DRB. This SL-SRB or SL DRB may comprise of a SL RLC bearer only (e.g., for relaying Uu end-to-end RRC signaling). For example, the SL-SRB or SL DRB may comprise of a SL bearer having only RLC/MAC/PHY configuration (e.g., without package data convergence protocol). A remote WTRU and/or relay WTRU may establish this SL-SRB/SL DRB upon successful establishment of a PC5-RRC connection for the purposes of relaying. Specifically, the relay/remote WTRU may create one or more such SL-SRB/DRB upon: transmission of an PC5-RRC reconfiguration to the peer WTRU (e.g., relay or remote), where such reconfiguration is for the purposes of a relaying link; reception of a complete message to the above reconfiguration; and/or, indication or determination (e.g., from upper layers) that a PC5-RRC connection is established (e.g., after the indication/determination from upper layers) and/or establishment of the PC5-RRC connection (e.g., the AS layer establishes the connection).

For transmission(s) by the remote WTRU, the remote WTRU may create a SL RLC bearer for transmission of Uu RRC signaling. For reception by the relay WTRU, the relay WTRU may create a SL RLC bearer for reception. Configuration of the SL RLC bearer may be predetermined. Alternatively, the remote WTRU may transmit a PC5-RRC configuration to configure the SL RLC bearer for carrying of Uu RRC messages (e.g., in the UL via the relay).

For transmission(s) by the relay WTRU, the relay WTRU may create a SL RLC bearer for transmission of Uu RRC signaling. For reception by the remote WTRU, the remote WTRU may create a SL RLC bearer for reception. Configuration of the SL RLC bearer may be predetermined. Alternatively, the remote WTRU may transmit a PC5-RRC configuration to configure the SL RLC bearer for carrying the Uu RRC messages (e.g., in the DL via the relay).

A relay/remote WTRU may relay/map all Uu RRC signaling (e.g., SRB0, SRB1, SRB2) to the one or more dedicated SL-SRB/DRB (e.g., SL RLC bearer). For example, a remote WTRU may map SRB0 to one SL RLC bearer, and SRB1/SRB2 to a second SL RLC bearer. Alternatively, a remote WTRU may map SRB0 Uu messages to a first SL RLC bearer, SRB1 Uu RRC messages to a second SL RLC bearer, and SRB2 Uu RRC messages to a third RLC bearer. Alternatively, the remote WTRU may map SRB0, SRB1, and SRB2, all to the same SL RLC bearer. In the case where multiple Uu SRBs are mapped to a single RLC bearer, the remote WTRU may further include an identifier (e.g., in the adaptation layer) to identify the RRC message (e.g., SRB1 or SRB2).

A remote WTRU may create/establish a SL RLC bearer (e.g., a second SL RLC bearer) upon reception of a Uu RRC message received over the first SL RLC bearer. Specifically, a remote WTRU may create/establish a first SL RLC bearer for transmission of Uu RRC messages over SRB0. The WTRU (e.g., remote), upon reception of an RRCResume message, or an RRCSetup message via a relay WTRU, may create/establish a second SL RLC bearer for transmission of the Uu RRC messages over SRB1.

Similarly, a relay WTRU may map all messages received from the remote WTRU over one of the SL RLC bearers for Uu signaling to a Uu RLC bearer for signaling. This Uu RLC bearer may be a new RLC bearer (e.g., Uu RLC bearer corresponding to Relay-SRB0, Relay-SRB1, Relay-SRB2). The relay WTRU may establish this Uu RLC bearers upon reception of an reconfiguration from the network. For example, a relay WTRU may inform the network that it is acting as a relay (e.g., by transmitting SLWTRUInformation following the establishment of the first PC5-RRC connection with a remote WTRU for relaying purposes) and may then receive the configuration of the Uu RLC bearers for Relay-SRB0/1/2 from the network in a reconfiguration message. Alternatively, a relay WTRU may use its existing SRB0/1/2 configuration for transmitting both its own RRC messages as well as any RRC messages received from a SL RLC bearer with a remote WTRU.

In one case, there may be conditions for the release of a SL-SRB/DRB for Uu RRC signaling. A WTRU (e.g., relay) may release the new SL RLC bearers for Uu signaling upon one or more of the following: SL RLF is detected with the relay WTRU; Uu RLF, or a similar message indicating a disconnection is indicated by the relay WTRU to the remote WTRU; and/or, a connection is moved to a connection directly via Uu (e.g., establishment of SRB0 or SRB1 via Uu; e.g., reception of an RRC message from the network or from the relay)

In one case a WTRU (e.g., remote) may receive configuration for SL-SRB/DRB for Uu RRC signaling directly from the network (e.g., over Uu interface). Specifically, the WTRU may receive configuration for the SL RLC bearer for carrying Uu SRB0/1/2 from the network. Further, the WTRU may receive dedicated RRC signaling via Uu (e.g., when the WTRU is connected directly via Uu) with the configuration to be used for the SL RLC bearer carrying SRB0/1/2. Alternatively, the WTRU may receive the configuration of SL RLC bearer carrying SRB0/1/2 via Uu RRC signaling carried over the relayed path.

In some situations, a relay WTRU (e.g., relay 192) may trigger an RRC connection upon establishment of a link request from a first remote WTRU (e.g., source 191). The relay WTRU may initiate an RRC connection/RRC resume procedure with the network (e.g., network node 193) upon one or more of the following: receiving an indication regarding and/or determining (e.g., by upper layer(s) a link establishment with a remote WTRU for the purposes of relaying; receiving, from a remote WTRU, a SL RRC reconfiguration, where such reconfiguration may indicate (e.g., implicitly or explicitly) that the PC5-RRC connection is for the purposes of relaying; and/or, receiving, from a peer WTRU, an implicit/explicit indication that the remote WTRU is attempting to establish a Uu connection (e.g., a remote WTRU may have a PC5-RRC connection with a relay WTRU while the remote WTRU is in RRC_IDLE).

Regarding initiating an RRC connection/resume based on the reception of a SL RRC reconfiguration, in some cases a remote WTRU may, upon initiation of Uu connection establishment via a relay, first initiate a PC5-RRC connection with the relay WTRU. Such PC5-RRC connection with the relay WTRU may trigger a PC5-RRC message containing an indication (e.g., flag) indicating the connection is for relaying with the network and/or information related to relaying (e.g., any relay-related information described herein for the purposes of relaying, such as the remote WTRU's paging identity). Alternatively, the relay WTRU may determine from upper layers that a PC5-RRC connection has been established for the purposes of relaying. Following either trigger, the relay WTRU, if it is in RRC_IDLE/RRC_INACTIVE, may trigger a connection establishment/resume with the network.

Regarding initiating an RRC connection/resume based on the reception of an implicit/explicit indication, in some cases the remote WTRU may performing one or more actions upon a trigger (e.g., implicit/explicit indication), such as for establishing/resuming a Uu RRC connection.

One action the remote WTRU may perform upon a trigger may be to transmit a Uu RRC message (e.g., a connection request or resume request) while including a protocol flag indicating the need for initiating an RRC connection via the relay. For example, a remote WTRU may include a flag in the header of the adaptation layer, RLC layer, or any sublayer visible to the relay WTRU. The relay WTRU, upon reception of such flag, may initiate a connection establishment.

One action the remote WTRU may perform upon a trigger may be to transmit a PC5-RRC message which indicates the desire to establish a Uu RRC connection. Such message may be used for other purposes. For example, such message may comprise of a PC5-RRC reconfiguration message for establishing one or more SLRBs, possibly for relaying. Alternatively, such message may further encapsulate the required Uu RRC signaling for initiating the connection establishment. Specifically, a remote WTRU may include, in a PC5-RRC message to the remote WTRU, a container encapsulating the Uu RRC message (e.g., Uu connection request, or a Uu resume request).

One action the remote WTRU may perform upon a trigger may be to transmit a SL MAC CE indicating that one or more upper layer(s) is intending to establish a Uu connection via the relay.

One action the remote WTRU may perform upon a trigger may be to transmit a SL SCI indicating implicitly/explicitly that the SL transmission is needed for establishing a Uu connection. For example, the sending/receiving of SL SCI may initiate a specific type/form of resource selection required for relaying (e.g., mode 2b/d-like). The remote WTRU may, upon receiving an indication to establish/resume a Uu connection via a SL relay, may initiate such resource selection type/form, and transmit the corresponding SCI.

As discussed herein (e.g., above disclosed actions from the remote WTRU perspective), a relay WTRU may, upon reception of one or more of the following, initiate a connection establishment/resume with the network: a flag/indicator in the adaptation layer, or other layer), header of any PDU received on a SL RLC bearer to be relayed; a PC5-RRC message with an explicit indicator indicating the need to establish/resume a connection; a PC5-RRC message containing an encapsulated Uu RRC message; a Uu RRC message containing an encapsulated PC5-RRC message; a SL MAC CE; and/or, a special SL SCI, as described herein.

Upon one or more of the conditions/triggers disclosed herein, the relay WTRU may perform one or more actions, such as indicate to the network, either during or following the connection establishment, that the connection is for the purposes of relaying. For example, the relay WTRU may include a cause value in the connection/resume request message indicating the request for a relayed connection. For example, the WTRU may send a SLWTRUInformation during or following the connection establishment.

In one case, the relay WTRU may trigger connection establishment/resume when it is currently in RRC_IDLE/RRC_INACTIVE; and the relay WTRU may not trigger establishment/resume when the relay WTRU is already in RRC_CONNECTED, and instead transmit an RRC message (e.g., SLWTRUInformation).

In some cases, the trigger of connection establishment/resume upon receipt of a PC5-RRC message may depend on factors concerning service continuity at the remote WTRU. For example, whether the relay WTRU performs establishment/resume of a Uu connection may depend on factors at the remote WTRU to ensure service continuity at the remote WTRU, such as factors indicating whether the remote WTRU had/has an established Uu connection (e.g., direct or via another relay) at the time of transmission of the PC5-RRC message, and/or the type of ongoing service. This may be addressed in more than one approach, such as a remote WTRU controlled approach, a relay WTRU controlled approach, or variation thereof.

In the remote WTRU controlled approach, generally, a remote WTRU may decide/determine whether to have the relay WTRU trigger establishment (e.g., sending a message to the relay WTRU), and the relay WTRU may follow what is in the message from the remote WTRU. For example, a remote WTRU may send a message (e.g., indication or information) to the relay WTRU (e.g., using a PC5-RRC message) following and/or triggered by establishment of a PC5-RRC connection between the relay WTRU and the remote WTRU. The message may instruct, or provide a basis for decision by, the relay WTRU. The sending of the message may be conditioned on aspects related to service continuity. The relay WTRU may establish/resume an RRC connection upon receipt of the message. In this approach, the establishment/resumption of a connection by the relay WTRU may be dependent on the remote WTRU.

In relay WTRU controlled approach, generally, a remote WTRU may send a message to a relay WTRU, and the message may only contain information that the relay WTRU may then use to determine/decide establishment (e.g., based on the type of message, the content of the message, and/or other factors disclosed herein). For example, a relay WTRU may make a determination of whether to establish/resume an RRC connection upon receipt of a message or upon establishment of a PC5-RRC connection from the remote WTRU, possibly based on information present in the message and/or other information present at the relay WTRU.

Alternatively, there may be a combination/variation of the above disclosed approaches.

There may be one or more factors that may be used to determine whether the remote WTRU may transmit a message (e.g., in the remote WTRU controlled approach) or whether to initiate connection establishment/resume at a relay WTRU based on the information received from the remote WTRU (e.g., in the relay controlled approach): Uu measurements; remote WTRU RRC state; trigger for initiating the PC5-RRC connection with the relay WTRU, or the Uu procedure which may have triggered the initiation of the PC5-RRC connection with the relay and/or transmission of the message to the relay WTRU; service type; priority; QoS; and/or, other related factors described herein.

For the factors related to Uu measurements, the condition may be based on the value of the Uu measurements at the remote WTRU (e.g., whether such measurements are above/below a threshold), possibly further in the case where the remote WTRU is connected via Uu prior to connection to the relay. For example, a remote WTRU may transmit an explicit indication to trigger a relay WTRU connection/resume when the remote WTRU's measurements are above a threshold.

For the factor relating to a remote WTRU RRC state, the condition may depend on the remote WTRU's RRC state when the PC5-RRC connection was triggered. For example, a remote WTRU may transmit an explicit indication to trigger a relay WTRU connection/resume when the remote WTRU is in Uu RRC_CONNECTED, possibly at the time when the PC5-RRC connection with the relay WTRU was established. For example, a remote WTRU may include an indication of its Uu RRC state in the PC5 message and the relay WTRU may be triggered to perform establishment upon reception of such indication if the remote WTRU was in Uu RRC_CONNECTED.

For the factor related to the trigger for initiating the PC5-RRC connection with the relay WTRU, or the Uu procedure which may have triggered the initiation of the PC5-RRC connection with the relay and/or transmission of the message to the relay WTRU, the condition may depend on the procedure which triggered initiating the PC5-RRC connection with the relay WTRU. Such triggers may be a gNB initiated PC5-RRC connection (e.g., in the case of a Hand Over/Off (HO) from direct to indirect, or indirect to indirect transition), a Uu-RLF at the remote WTRU, SL-RLF at the remote WTRU, a Uu re-establishment trigger at the remote WTRU, a Uu re-establishment failure at the remote WTRU, a conditional HO, or the like. For example, a remote WTRU may transmit/include an indication to a relay WTRU if the PC5-RRC connection is established as a result of a Uu RLF and/or the remote WTRU experiences Uu RLF, possibly while PC5-RRC connected to a relay WTRU or possibly while directly connected via Uu. For example, a remote WTRU may transmit/include an indication to a relay WTRU if the PC5-RRC connection is established as a result of a mobility command (e.g., HO to indirect connection), or if such a mobility command is received while PC5-RRC connected to a remote WTRU or directly connected via Uu. Alternatively, some other procedures (e.g., relay reselection) may result in not transmitting the message, or transmitting the message to the remote WTRU without the explicit indication.

For the factors relating to service type, priority, QoS, etc., the condition may be a function of the service and/or QoS of the service active at the remote WTRU, which may indirectly be a function of the established Uu bearers, LCH, or the like. For example, a WTRU may transmit the message/indication if at least one of the LCHs established at the remote WTRU is configured to enable transmission of the message/indication, or if the remote WTRU has at least one LCH configured with a priority above a configured threshold. For example, a remote WTRU may transmit the Uu LCH priority (ies) in the SL message, and the relay WTRU may determine whether to initiate the connection depending on the LCH priority (e.g., relative to a configured threshold).

In the case of the relay controlled approach, the relay WTRU may use one or more factors (e.g., combine more than one factors disclosed above with other factors as disclosed herein) at the relay WTRU to determine whether to establish/resume a connection, such as: access restrictions at the relay WTRU (e.g., broadcast by the cell to which the relay WTRU is camped); and/or, inactive state configuration and/or SIB at the relay WTRU. For the access restrictions at the relay WTRU, in one example, a relay WTRU may be configured with a mapping between the level of information triggering a resume, and the allowable access categories/classes to the target cell, and may perform the resume as long as the conditions associated with triggering the resume that are associated with the allowable access class are satisfied. For the inactive state configuration and/or SIB at the relay WTRU, in one example, the relay WTRU may be configured (e.g., in the inactive state configuration, or in SIB) with the rules (e.g., thresholds) related to Uu measurements received from the remote WTRU that would trigger a resume by the relay WTRU.

In some cases, a relay WTRU may initiate an RRC communication procedure triggered by the reception of a message on a SL RLC bearer for Uu RRC signaling. Specifically, the relay WTRU may initiate an RRC connection and/or RRC resume (e.g., while in an RRC_IDLE/RRC_INACTIVE state) upon the reception of a message received on a SL RLC bearer created/configured for carrying Uu RRC signaling. In one instance, a relay WTRU in an INACTIVE state may initiate a RRC connection resume upon reception, from a remote WTRU, of a message received on the SL RLC bearer configured for carrying of Uu SRB0. In one instance, a relay WTRU in IDLE state may initiate a connection establishment upon reception, from a remote WTRU, of a message received on a SL RLC bearer configured for carrying of Uu SRB0.

Figure 9:
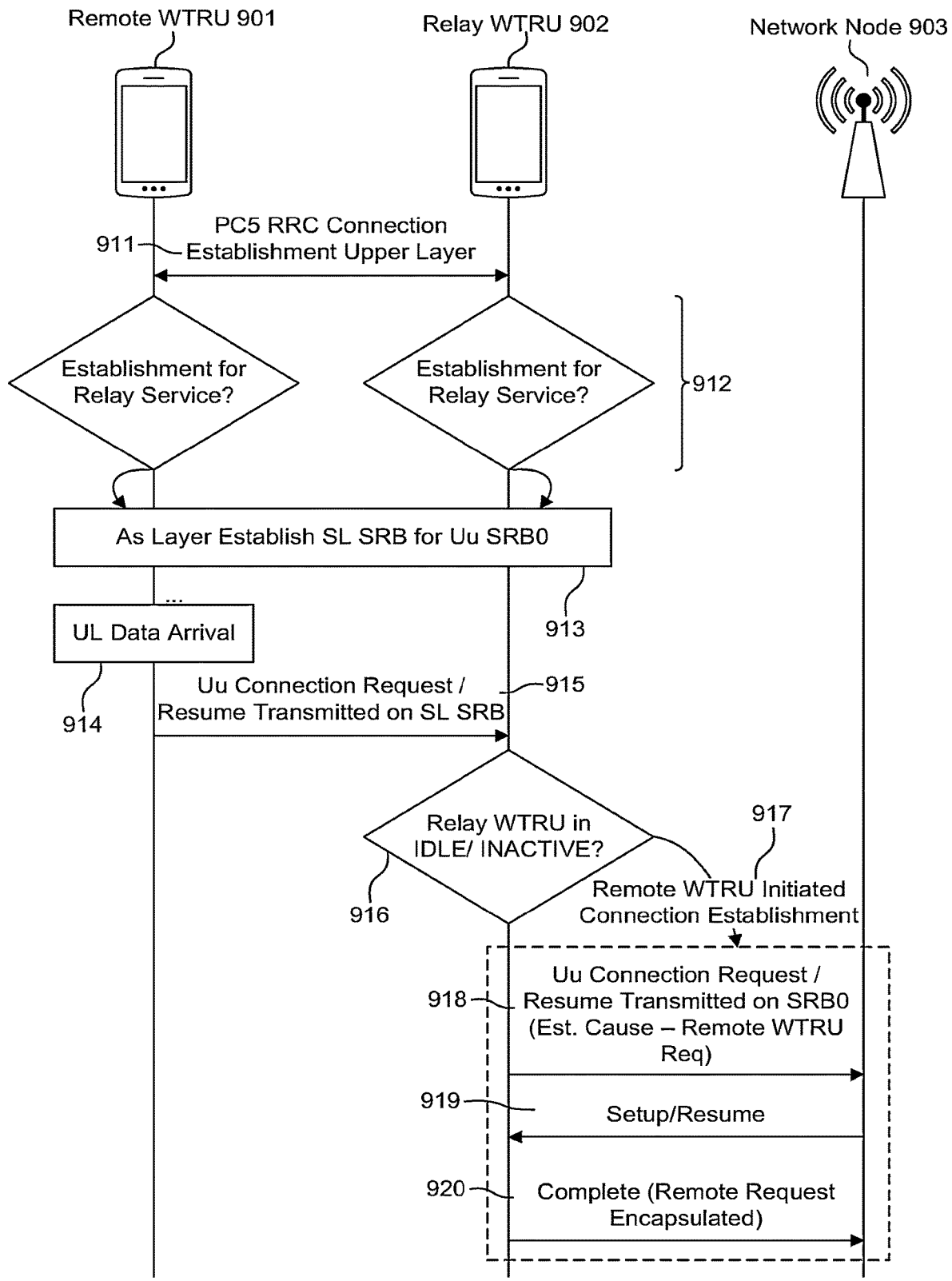
FIG. 9 illustrates an example of a relay WTRU triggering an RRC connection.

FIG. 9 illustrates an example of a relay WTRU performing a Uu connection procedure triggered by a remote WTRU. Generally, there may be a remote WTRU 901, a relay WTRU 902, and a network node 903. There may be a PC5-RRC connection at 911 between the remote WTRU 901 and the relay WTRU 902 (e.g., between the upper layers of each respective entity). At 912, a Uu (e.g., relayed) service may be established in the remote WTRU 901 (e.g., similar to a regular establishment, except via a relay). Following establishment of the PC5-RRC connection specific for relaying at 911, the relay WTRU 901 and remote WTRU 902, both of which may be in RRC_IDLE/RRC_INACTIVE, may establish a SL-SRB for carrying of Uu SRB0 at 913 (e.g., the establishment of 912 may trigger the establishment of the SL-SRB). Upon the need to send data 914 (e.g., arrival/generation of a PDU) at the remote WTRU 901, the remote WTRU 902 may transmit a Uu connection request/resume 915 on the SL-SRB. The relay WTRU 902, if it is in RRC_IDLE/RRC_INACTIVE 916, may initiate connection request/resume 917 upon reception of a transmission on the SL-SRB. The relay WTRU 902 may indicate at 918 (e.g., to the network node 903) that the connection request/resume is triggered by a connection from the remote WTRU 901 (e.g., by providing an indication/information with a cause value). The network node 903 may respond at 919 to the connection request/resume (e.g., success, failure, other information related to connection request/resume). The relay WTRU 902 may further include the PDU that may have been sent by the remote WTRU 901 on the SL-SRB, which triggered the connection request/resume. The relay WTRU 902 may include the PDU in its own RRC message to the network node 903, possibly associated with the connection request/resume procedure (e.g., not shown). For example, the relay WTRU 902 may encapsulate the PDU in the complete message of the resume/establishment procedure. Alternatively, the relay WTRU 902 may wait for the connection to be completed (e.g., 919), and send the PDU on the associated UL RLC channel on which SRB0 is mapped at 920 (e.g., similar to what the relay WTRU 902 would do if it were in RRC_CONNECTED when the remote WTRU 901 sends the PDU).

In some cases, connection establishment (e.g., request/resume) signaling for the remote and relay WTRU may be sent together and/or encapsulated. A relay WTRU may encapsulate a message received on PC5-RRC, possibly associated with a Uu RRC message carried over a specific SL RLC bearer, within its own Uu RRC message transmitted to a network node. For example, a relay WTRU may include in an RRC connection request, or RRC resume request, a message received from the remote WTRU over the SL RLC bearer carrying Uu RRC signaling (e.g., the remote WTRU's own RRC connection request). The relay WTRU may perform the encapsulation when it receives the message over the SL RLC bearer from the remote WTRU while the relay WTRU is itself in RRC IDLE and/or RRC INACTIVE states. The SL RLC bearer may comprise of the SL RLC bearer associated with carrying of Uu RRC signaling (e.g., SRB0, SRB1, or SRB2).

Similarly, a relay WTRU may receive an encapsulated Uu RRC message(s) (e.g., an RRC connection request or RRC resume message) within a Uu RRC message received from a network node. The relay WTRU may forward the encapsulated message (e.g., which may be received as a bit string at the RLC layer or adaptation layer) to the SL RLC bearer for the intended remote WTRU (e.g., based on routing information included in the adaptation layer), and forward/process the remainder of the message (e.g., the non-encapsulated part) to upper layers for further message decoding.

In some cases, a relay WTRU may determine behavior and/or a Uu RLC channel upon receiving a first RRC message (e.g., SRB0) for remote WTRU. As described herein, a relay WTRU may forward messages from the SL RLC bearer for SRB0 onto a mapped UL RLC bearer (e.g., determined by the adaptation layer configuration), or may trigger its own RRC message that may encapsulate the data from the SL RLC. In addition, a relay WTRU may utilize a default Uu RLC channel to forward such a message. In addition, a relay WTRU may perform a transmission of data to the network while remaining in RRC_INACTIVE state (e.g., inactive data transmission).

In one scenario, a relay WTRU may determine which of one or more forwarding behaviors, such as those described herein, to use based on one or more factors, such as: the relay WTRU's RRC state; the access category/class of the remote/relay WTRU; the QoS of the specific access by the remote WTRU; and/or, network configuration rules, or presence of configuration associated with the access.

For the factor relating to the relay WTRU's RRC state, in one example, a relay WTRU in RRC_CONNECTED may forward the first RRC message from the remote WTRU on a (pre) configured Uu RLC channel, while it may encapsulate the message in its own RRC message (e.g., possibly associated with its own connection establishment procedure) when the relay WTRU is RRC_IDLE/RRC_INACTIVE.

For the factor related to the QoS of the specific access by the remote WTRU, in one example, the remote/relay WTRU may be configured with multiple SL RLC channels for transmission of Uu SRB0, where each SL RLC channel may correspond to a specific QoS property of the data which triggered the access (e.g., LCH priority or priority indication associated with the LCH and/or a configuration associated to whether to allow data transmission in RRC_INACTIVE state). The relay WTRU may select the Uu RLC channel and/or whether to piggyback the transmission in an RRC message specifically based on the SL RLC channel.

For the factor related to basing determination on network configuration rules, or the presence of configuration associated with such access, in one example a relay WTRU may forward the first message on a default Uu RLC bearer in case it is not configured with (e.g., in the adaptation layer) a mapping from the SL RLC channel carrying SL-SRB0 and a Uu RLC channel and/or is not configured with an adaptation layer. Otherwise, it may forward the message on the configured Uu RLC channel. For example, a relay WTRU may forward the first message by encapsulating it in an UL RRC message in case it is not configured with (e.g., in the adaptation layer) a mapping from the SL RLC channel carrying SL-SRB0 and a Uu RLC channel and/or is not configured with an adaptation layer. Otherwise, it may forward the message on the configured Uu RLC channel.

In some cases, an issue may arise when there is a connection establishment/resume failure at the relay WTRU. For example, a relay WTRU may fail to establish/resume an RRC_CONNECTION upon trigger by a remote WTRU to establish/resume an RRC connection. The relay WTRU in RRC_IDLE/RRC_CONNECTED may receive a PDU on a dedicated SL RLC channel for transmission of Uu SRB0 message by the remote WTRU, or may receive a PC5-RRC message indicating the desire of the remote WTRU to initiate/resume an RRC connection. Following this, the relay WTRU may request an RRC connection and may fail at establishing the connection. One or more techniques described herein may address this issue.

In one case, the relay WTRU may inform the remote WTRU of the failure to establish/resume an RRC connection. The relay WTRU may transmit the failure indication to the remote WTRU using one or more of the following: a PC5-RRC message (e.g., where the PC5-RRC message may be a dedicated PC5-RRC message used to indicate such a failure to the remote WTRU; alternatively, the relay WTRU may initiate a release of the PC5-RRC connection, and may transmit a release message to the remote WTRU); a MAC CE; and/or, a dedicated SCI (e.g., SCI format). A remote WTRU, upon reception of the failure message, may perform one or more of the following: Release the PC5-RRC connection with the relay WTRU; Initiate a release procedure with any other peer WTRU it may be serving as a multi-hop relay; Trigger a relay and/or Uu reselection and/or connection to another relay WTRU, or directly via Uu; Release all Uu bearers configured to be relayed via that relay.

In another case, the relay WTRU may delay transmission of the release message, or failure indication to a later time in response to the connection establish/resume failure. The relay WTRU may attempt a recovery procedure with the network. For example, a relay WTRU, upon resume failure, may transition to operating in an IDLE mode/state and initiate a cell selection procedure and connection (re) establishment. The relay WTRU may maintain the PC5-RRC connection during this procedure. The relay WTRU may inform the remote WTRU and possibly other remote WTRU(s) upon success/failure of the (re) establishment procedure. Specifically the relay WTRU, upon failed (re) establishment, may transmit the failure message, or release the PC5-RRC connection with the remote WTRU and possibly all other remote WTRUs. Further, the relay WTRU, upon successful (re) establishment, may inform the remote WTRU and possibly other remote WTRUs of the (re) establishment. Further, a relay WTRU may transmit a message (e.g., a PC5-RRC message) to inform one or more remote WTRUs of a (re) establishment. The relay WTRU may inform any particular WTRU (e.g., a WTRU to which the relay WTRU has a PC5-RRC connection with for relaying) of a (re) establishment depending on any of the following: the RRC state of the remote WTRU (e.g., a relay WTRU may inform the remote WTRU of the re-establishment of the remote WTRU is in RRC_INACTIVE, or if the remote WTRU is in RRC_IDLE); whether the remote WTRU triggered the connection establishment that resulted in the (re) establishment at the relay (e.g., a relay WTRU may inform only the remote WTRU which triggered the connection establishment at the relay which resulted in (re) establishment); and/or, whether the relay WTRU (re) established to the same or different cell (e.g., a relay WTRU may inform its remote WTRU(s) if the (re) establishment occurred to a cell which is different than the cell the relay WTRU was initially camped to, where a relay WTRU may trigger a message to the remote WTRU in this case, and/or a relay WTRU may further indicate in the message whether (re) establishment occurred to the same/different cell and/or indicate in the message the cell ID).

The behavior at the relay WTRU as discussed herein (e.g., in the above cases address procedures for after a connection failure) may further apply to connection establishment failure at the relay WTRU that may occur for other reasons (e.g., other than a remote WTRU connection establishment attempt), such as: relay connection establishment/resume triggered by the relay itself, where the relay WTRU in RRC_IDLE/RRC_INACTIVE triggers connection establishment as a result of reception of paging for itself, or arrival of uplink data for itself; and/or, relay WTRU triggers (re) establishment as a result of Uu RLF, or failed mobility (e.g., HO failure or CHO failure).

In some situations, a relay WTRU may inform a remote WTRU of mobility by the relay WTRU. Specifically, a remote WTRU may be PC5-Connected to a relay WTRU, but this connection may depend on the mobility of the relay WTRU.

In some cases, a relay WTRU may inform a remote WTRU of a mobility event which occurs at the relay WTRU. This mobility event may be one or more of the following: reconfiguration with sync at the relay WTRU; cell reselection by the relay WTRU; and/or, trigger and/or completion of a conditional handover (CHO).

For the mobility event regarding reconfiguration with sync at the relay WTRU, this may occur in one or more conditions occur: when the reconfiguration results in the change of the cell to which the relay WTRU is attached; when such reconfiguration results in the change of RAN area to which the relay WTRU is attached; and/or, when the RAN area of the remote WTRU is changed as a result of the procedure.

For the mobility event regarding cell reselection by the relay WTRU, this may occur in one or more conditions occur: when the reselection results in the change of the cell to which the relay WTRU is camped; when such reconfiguration results in the change of RAN area and/or system information identifier; and/or, when the RAN area of the remote WTRU is changed as a result of the procedure.

For the mobility event regarding the trigger and/or completion of a CHO, this may occur in one or more conditions occur: when the CHO results in the change of a cell to which the relay WTRU is attached; when the reconfiguration results in the change of RAN area to which the relay WTRU is attached; and/or, when the RAN area of the remote WTRU is change as a result of the procedure.

In some cases, a relay WTRU may inform a remote WTRU of a mobility procedure, for example, via a PC5-RRC message, a MAC CE, and/or other message transmitted on sidelink. The relay WTRU may further inform the remote WTRU only if the remote WTRU is in a certain RRC state(s) (e.g., only in RRC_IDLE/RRC_INACTIVE). The relay WTRU may include one or more of the following in such a message: the nature of the mobility (e.g., cell reselection, CHO triggered, CHO completed, etc.); an indication of whether the cell ID/area ID/system information tag has changed; new cell ID/area ID/system information tag; a subset of the system information of the new cell (e.g., the relay WTRU may transmit the PLMN ID, access information, or any system information that may affect the connection of the remote WTRU with the network to the remote WTRU); and/or, new sidelink resource configuration and/or bearer configuration.

A remote WTRU, upon indication of relay WTRU mobility received from the relay WTRU, may trigger a Uu-related procedure, such as: a release on PC5 and/or a relay/cell reselection procedure; and/or, Uu access, possibly via the relay WTRU. For example, such access may be a RAN area update procedure, a connection establishment/resume procedure, a re-establishment procedure, a 2-step/4-step RACH procedure, and/or any similar procedure, possibly related to transmission of a Uu RRC message. For example, such access procedure and/or whether or not it is performed, may further depend on the remote WTRU's RRC state.

A relay WTRU may determine whether/which procedure to trigger based on the information received from the remote WTRU in the release message. Specifically, a remote WTRU may determine whether to initiate a PC5 release/reselection based on this information. Specifically, a remote WTRU may determine whether or not to initiate a Uu access procedure based on this information. The information may be related to, or may be used by the remote WTRU to determine, whether the remote WTRU can operate on the new cell via the relay, or has all of the information required (e.g., bearer configuration) to operate on the new cell via the relay. The information may be related, or may be used by the relay WTRU to determine, whether the network has latest information (e.g., related to context information) of the remote WTRU.

In one example, a remote WTRU may trigger a Uu access procedure such as a RAN area update if the relay WTRU has reselected to a cell in which the relay WTRU's and/or remote WTRU's RAN area has changed.

In another example, a remote WTRU may receive new access parameters and/or allowed PLMN(s) from the relay associated with the new cell. The remote WTRU may determine, based on these access parameters, or based on the allowed PLMN, that the remote WTRU cannot initiate a network access to the cell via the relay. The remote WTRU may release the PC5 connection and/or trigger a cell/relay reselection procedure.

In some situations, a remote WTRU may determine the SL bearer/configurations associated with Uu transmissions through a WTRU-to-NW relay. Generally, a remote WTRU may transmit data intended to the network via a WTRU-to-NW, where the Uu intended transmissions may be associated with certain QoS characteristics associated with Uu (e.g., 5QI). In some cases, an issue may arise in determining how the remote WTRU determines the SL characteristics to use for the transmissions to the relay WTRU to satisfy the Uu QoS. To address this issue, Uu service data may be associated with a Uu QoS flow. A Uu QoS profile may correspond to any QoS characteristics associated with a flow of Uu service data, such as a QoS flow indicator (QFI), a 5-G QoS index (5QI), or other QoS characteristic, while a SL QoS profile may correspond to any QoS characteristic associated with a flow of SL service data such as a SL PQI (e.g., PC5 quality indicator), QFI, a range, a rate requirement, and/or any combination thereof.

In some cases, a WTRU may map Uu service data to an RLC sidelink bearer. The WTRU may create and/or be configured with an RLC sidelink bearer for transmission of Uu service data. The RLC sidelink bearer may comprise of a SL bearer comprising of a subset of the SL protocol stack for SL configuration of that bearer (e.g., SL RLC, SL MAC and SL PHY only). Without loss of generality despite the naming, the RLC sidelink bearer may comprise of any subset of protocol stack, not necessarily starting from the RLC layer downwards.

In some cases, a SL RLC bearer may be configured for either/both relayed and non-relayed traffic. The WTRU may be configured to transmit only Uu service data on an RLC sidelink bearer. Alternatively, the WTRU may be configured to transmit only non-relayed traffic (e.g., non Uu service data) on an RLC sidelink bearer. Alternatively, the WTRU may be configured to transmit both relayed and non-relayed traffic on an RLC sidelink bearer. Specifically, the WTRU may be configured with, and/or determine, a SL bearer for non-relayed transmissions (e.g., SL data service), for which the SL bearer may have an RLC sidelink bearer that may also be used for Uu service data. Under such circumstances, for example, the WTRU may map data from both Uu QoS flows and/or a Uu PDCP entity as well as a SL QoS flows and/or a SL PDCP entity to the same SL RLC bearer. The WTRU may include an identifier along with the PDU (e.g., at the PDCP layer, or in an adaptation layer) indicating whether a PDCP PDU contains data from a Uu bearer/Uu QoS flows or SL bearer/SL QoS flows.

A WTRU may receive a configuration for an RLC sidelink bearer indicating whether such RLC sidelink bearer is for relayed traffic only, non-relayed traffic only, or can be used for both traffic. The configuration may be in the form of an indicator. For example, absence of the indicator may indicate that the RLC bearer configuration is for non-relayed RLC bearers only. Alternatively/additionally, the presence of the indicator may indicate that the configuration is for relayed RLC bearers only, or is applicable to both. The WTRU may further receive an alternate set of configuration parameters with an RLC sidelink bearer configuration, where such alternative parameters may be used if the WTRU creates an RLC sidelink bearer to be used for relayed traffic. Specifically, if the WTRU creates an RLC sidelink bearer for relaying, the WTRU may use the alternate set of parameters when creating the bearer, otherwise, the WTRU may use the default set of parameters associated with the RLC bearer configuration when creating the RLC SL bearer.

In some cases, a WTRU may be provided with configuration(s) for an RLC sidelink bearer. The WTRU may be configured with the RLC, MAC, and/or PHY layer configuration for an RLC sidelink bearer. The WTRU may receive the configuration from the network via one or more of the following: pre-configuration; SIB (e.g., a remote WTRU may receive the configuration of the RLC sidelink bearer(s) in a SIB when the remote WTRU initiates a RRC connection with the relay WTRU while the remote WTRU is in RRC_IDLE/RRC_INACTIVE with the network over Uu); dedicated signaling via Uu or via the relay WTRU (e.g., a WTRU may receive an RRC reconfiguration from the network containing the configuration of the RLC sidelink bearer); and/or, from another WTRU (e.g., a relay WTRU, or a group leader WTRU).

In some cases, there may be triggers for creating an RLC sidelink bearer. The WTRU may trigger creation, and corresponding configuration via sidelink RRC configuration message to a peer WTRU, of a new RLC bearer following one or more of the following triggers (e.g., relay may trigger with the remote, or the remote may trigger with the relay): a WTRU moves transmission of a Uu bearer directly via Uu to a relayed link; a WTRU triggers Uu RLF while configured with a connection to a SL WTRU-to-NW relay; a WTRU initiates a SL RRC connection with a relay/remote WTRU for the purposes of relaying; a WTRU receives Uu service data in the DL, either directly on Uu or via a WTRU to NW relay; a WTRU has a Uu service data and/or does not have a sidelink RLC bearer configured to transmit the Uu service data with a specific QoS, or associated with a QoS flow, based on the bearer determination/mapping rules described herein; a WTRU changes path for Uu service data from one WTRU to NW relay to another WTRU to NW relay; and/or, a WTRU receives an RRC reconfiguration message, possibly via the relay, possibly which (re) configures the Uu bearers to be used via the relay.

In some cases, a WTRU may determine the RLC sidelink bearer for a flow of a Uu bearer. Mapping of Uu bearers to SL RLC bearer may be one to one. Specifically, a remote/relay WTRU may create a single SL RLC bearer for each Uu bearer configured by the network. Alternatively, mapping of Uu bearer to SL RLC bearers may be N to 1, or 1 to N (e.g., where N is a number other than 1). Specifically, a WTRU may be configured with one or more Uu bearers (e.g., to be relayed) and one or more SL RLC bearers (e.g., to carry the Uu traffic over SL), and may be configured with a mapping rule of Uu bearer to SL RLC bearer.

A WTRU may determine the mapping of a Uu bearer or Uu QoS flow to SL RLC bearer based on one or more of the following: a (pre) configured mapping of Uu QoS profile to SL QoS profile; a (pre) configured mapping of a Uu QoS profile to SL bearer; a (pre) configured mapping of a Uu bearer configuration or bearer ID to a SL bearer configuration or bearer ID; the determination is made implicitly from the mapping of Uu QoS profile and/or Uu bearer to SL RLC bearer observed/determined by the WTRU from the DL transmissions; the mapping may depend on the SL measurements/characteristics at the remote/relay WTRU such as the CBR, the CSI measurements, the SL RSRP measurements, etc.; the buffer status/occupancy and/or relaying delay at the relay WTRU, possibly determined by the remote WTRU based on status reports from the relay to the remote WTRU; and/or, the measurements of the channel quality of Uu at the relay WTRU.

Regarding the determination based on a (pre) configured mapping of Uu QoS profile to SL QoS profile, in one example, a WTRU may be (pre) configured with a mapping between a Uu QoS profile (e.g., a QFI or 5QI) and a SL QoS profile (e.g., a SL QFI or set of SL QoS parameters such as PQI and/or range and/or data rate). For a Uu QoS flow having a specific QoS profile or QFI, the WTRU may derive the associated SL QoS profile or equivalent QFI. The WTRU may then determine the RLC bearer to use based on the mapping of SL QoS profile to SL bearer, where the mapping may be used for any transmissions on SL.

Regarding the determination based on a (pre) configured mapping of Uu QoS profile to SL bearer, in one example, a WTRU may be (pre) configured with a mapping between a Uu QoS profile (e.g., a QFI or 5QI) and a SL bearer configuration. Such a mapping may be to a SL RLC bearer configuration only. Alternatively, such a mapping may be to a normal SL bearer and the WTRU may configure/create only the RLC bearer sidelink bearer from the configuration. In another example, a WTRU may be (pre) configured with an allowable set of Uu QoS profiles or Uu QFIs that be mapped to a SL RLC bearer within the SL RLC bearer configuration received from the network.

Regarding the determination based on a (pre) configured mapping of a Uu bearer configuration or bearer ID to a SL bearer configuration or bearer ID, in one example, a WTRU may be configured (e.g., in dedicated signaling) with a mapping between a Uu bearer ID and a SL bearer ID, where the SL bearer ID may correspond to a normal SL bearer or an RLC SL bearer. In another example, a WTRU may be configured with a N to 1 mapping between Uu bearer and SL RLC bearer. For instance, a WTRU may be configured with a set of allowable Uu bearer configurations, or Uu bearers, that may be mapped to a SL RLC bearer within the SL RLC bearer configuration. The allowable Uu bearers may be in the form of a list of bearer IDs or bearer configuration IDs. In another example, a WTRU may be (pre) configured with a list of SL RLC bearer configurations, each with a specific index. The WTRU may further receive a Uu bearer configuration which contains (e.g., in the PDCP configuration) the index of list of indices of SL RLC bearer configurations that the specific Uu bearer can be mapped to. In another example, a WTRU may receive a Uu bearer configuration with an associated SL RLC bearer configuration (e.g., in the same IE, or with a linking between the IEs) and the WTRU may map the Uu bearer to the corresponding RLC bearer.

Regarding the determination determined implicitly from the mapping of Uu QoS profile and/or Uu bearer to SL RLC bearer observed/determined by the WTRU from the DL transmissions (e.g., reflective Uu bearer to SL bearer mapping), in one example, a WTRU may determine the Uu QoS profile by determining the set of Uu QoS profiles of the data received from a DL bearer transmitted over a SL RLC bearer. The WTRU may then map the Uu service data in the uplink carried in an Uu bearer in uplink to the same or similar SL RLC bearer in the opposite direction. The same or similar SL RLC bearer may comprise of: an RLC bearer with the same ID (e.g., bearer ID, LCH ID, or similar), possibly for the case of an RLC AM bearer (e.g., Acknowledged mode of an RLC channel/bearer); and/or, an RLC bearer having same/similar SL configuration as the received SL bearer. In another example, a WTRU may determine the Uu bearers that were mapped to a particular SL RLC bearer in the DL and may map the corresponding Uu bearer in UL to the same or similar SL RLC bearer in the opposite direction. Same or similar SL bearer mapping may comprise of: the SL RLC bearer with the ID; and/or the SL RLC bearer with the same configuration of one or more parameters of RLC, MAC, or PHY.

Regarding where the mapping may depend on the SL measurements/characteristics at the remote/relay WTRU such as the CBR, the CSI measurements, the SL RSRP measurements, and the like, in one example a WTRU may be configured with a first mapping of Uu bearer to SL RLC bearer to be applied for a first range of measured CBR/CSI/SL RSRP and configured with a second mapping of Uu bearer to SL RLC bearer to be applied for a second range of measured CBR/CSI/SL RSRP. The WTRU may change the mapping upon change of the controlling measurement (e.g., CBR).

Regarding the buffer status/occupancy and/or relaying delay at the relay WTRU, possibly determined by the remote WTRU based on status reports from the relay to the remote WTRU, in one example a WTRU may be configured with a first mapping of Uu bearer to SL RLC bearer for a first level of buffer occupancy at the relay WTRU, and a second mapping of Uu bearer to SL RLC bearer for a second level of occupancy at the relay WTRU.

Regarding the measurements of the channel quality of Uu at the relay WTRU, in one example, a relay WTRU may be configured with a first mapping of Uu (DL) bearer to SL RLC bearer for a first level of Uu channel quality and a second mapping of Uu bearer to SL RLC bearer for a second level of channel quality. The WTRU may change the mapping upon change of the Uu quality detected by the relay WTRU. In another example, a remote WTRU may receive Uu channel quality measurement from the relay WTRU and may determine/change the mapping in a similar way to the relay WTRU.

In some cases, a WTRU may determine the RLC sidelink bearer configuration from an equivalent Uu bearer configuration, or vice versa. Specifically, the WTRU may determine a subset of parameters for an RLC SL bearer from the parameters of the equivalent Uu bearer configured with the same mapping of Uu QoS profile to Uu bearer, or vice versa). The WTRU may determine a subset of the SL RLC bearer configuration parameters by a (pre) configured rule by which the similar Uu bearer configuration parameters for a bearer configured for transmission of the QoS flow would normally be configured for Uu or was previously configured for Uu. For example, the WTRU may be configured with a mapping of QoS flow to a Uu bearer having a specific logical channel priority. For relaying, the WTRU may create a SL RLC bearer having a LCH priority derived from the Uu LCH priority. The derivation function may comprise of using the same value. Alternatively, the derivation function may comprise of applying a (pre) configured offset to the RLC SL bearer compared to the Uu bearer. Similar methods may be used for deriving the Uu bearer configuration from a SL bearer configuration.

In some situations, there may be conditions for triggering the release of one or more remote WTRUs by a relay WTRU. A relay WTRU serving one or more remote WTRUs may trigger a release of the one or more remote WTRUs. The relay WTRU may perform the release by sending a release message (e.g., RRC release) individually to each connected remote WTRU. Alternatively, the relay WTRU may perform the release by sending a release message in a broadcast/groupcast fashion (e.g., using a groupcast L2 ID as described herein).

A relay WTRU may send a release to one/more/all of its remote WTRUs under one or more of the following conditions: relay performs mobility and/or connects/camps to a cell; following a change of barring status or admission control status indicated by a current cell; based on explicit indication form the network; based on a change in the Uu RSRP measured at the relay WTRU; based on decisions related to admission control; and/or, based on indication/determination from/by upper layers.

For the condition where a relay WTRU performs mobility (e.g., hand over (HO), cell reselection, and/or sending a release to the remote WTRU) and/or connects/camps to a cell, in one scenario the cell may be associated with a different RAT compared to the RAT the relay WTRU was initially connected to. In another scenario, the new cell may not be SL capable, meaning, if a WTRU is handed over, or performs reselection to a cell which is SL incapable, it may send a release message. In another scenario, the cell may be associated to a different area, where such area may comprise of an existing area (e.g., RAN area, SI validity area, etc.) or a new area defined specifically for relaying (e.g., the relay WTRU is configured with an area code in a given cell and may send a release to one/more/all of its remote WTRU(s) when the area code changes). In another scenario, the cell may be barred for a service, potentially such service related to relaying (e.g., a relay WTRU may reselect to a cell which is barred for relaying service based on system information, where the relay WTRU may then send the release message to the WTRU(s). In another scenario, there may be a number/nature of links to the remote WTRU(s) not supported by the target cell, based on information received from the target cell (e.g., system information). For example, a relay WTRU may perform reselection to a cell which supports a maximum number of remote WTRUs for a given relay, and the relay WTRU may trigger a release on PC5 with a number of remote WTRUs in order to satisfy this number. For example, a relay WTRU may perform reselection to a cell which does not allow WTRU-to-NW relaying, and the relay WTRU may trigger a release on PC5 with all remote WTRUs.

For the condition that follows a change of barring status or admission control status indicated by current cell, in one example, the cell in which the WTRU is camped may change the barring status for a specific service, potentially related to relaying, and the relay WTRU may in turn send a release to the connected remote WTRU(s).

For the condition that is based on explicit indication from the network, in one example a relay WTRU may receive an RRC message from the network indicating that it should release its connected remote WTRU(s). In another example, a relay WTRU may receive a HO command or conditional HO command which includes a flag indicating whether any/all connected remote WTRUs should be released.

For the condition that is based on a change in the Uu RSRP measured at the relay WTRU, in one example a relay WTRU may transmit a release message to its connected remote WTRUs when the measured Uu signal strength (e.g., RSRP) falls outside of a configured range (e.g., associated with operation as a relay WTRU).

For the condition that is based on decisions related to admission control, this scenario is described further herein.

For the condition that is based on indication from upper layers, in one example a WTRU may receive indication to stop operating as a relay, and may consequently trigger the release of all remote WTRUs connected to it.

In some situations, a relay WTRU may prioritize cell reselection to cells which that maintenance of the remote WTRUs. A WTRU may prioritize cell reselection to a cell that allows the relay WTRU to maintain its connection to the remote WTRU. For example, a remote WTRU may be configured with a cell quality offset in the cell reselection rules such that such cells are prioritized. Prioritization may be based on the need for the relay WTRU to release the remote WTRU, based on the triggers/reasons described herein.

A relay WTRU may further perform this prioritization depending on conditions associated with its own traffic. For example, if the relay WTRU does not have any traffic to be transmitted from any of its own (non-relayed) bearers, or if the amount of traffic specific to the relay WTRU is below a threshold, the WTRU may perform this prioritization. For example, the relay WTRU may be configured with a condition that allows prioritization of a cell in cell reselection, such as an explicit configuration parameter, or a condition based on the type of bearers configured at the relay WTRU. For example, the relay WTRU may be configured with a condition that allows prioritization of a cell based on the amount of data recently transmitted by the relay WTRU.

In some situations, a remote WTRU may send cell information (e.g., PLMN, barring, etc.) provided by and/or determined by a relay WTRU to (e.g., its) upper layers. The remote WTRU may determine the cell information to be sent to upper layers (e.g., equivalent to the camped cell information) based on the information sent by the relay WTRU. A remote WTRU may provide this information to upper layers upon one or more of the following: upon establishment of a PC5-RRC connection with the relay WTRU; upon receiving system information from the peer (relay) WTRU; and/or, upon attempting an access to Uu via a relay WTRU. Such information may include PLMN, cell barred status, cell ID, relay WTRU ID, indication that the camped cell information is associated with a relay WTRU or a relayed connection, or any other information that may be present in SIB in legacy Uu.

There may be one or more approaches to access control via a WTRU-to-NW relay may. In some situations, a remote WTRU may determine cell barring status, whether to establish a PC5-RRC connection for relaying, and/or Uu connection via a relay based on sidelink characteristics.

In the methods describe herein (e.g., below), access by a remote WTRU to the NW via a WTRU-to-NW relay may be controlled/determined at a remote WTRU, possibly based on SL information determined at the remote WTRU or provided by the relay. The same methods may also be applicable to a relay WTRU performing access to the NW for relaying, where determination of whether such access may be allowed may further depend on sidelink characteristics and information obtained from the remote WTRU.

A remote WTRU may determine whether to access the cell via a relay WTRU. Such ability to access the cell may depend on sidelink characteristics with the WTRU-to-NW relay. Determination that a WTRU is allowed to access a cell may lead to one of a number of possible procedures initiated at the WTRU depending on the approach.

In one approach, a remote WTRU may determine whether to establish a PC5-RRC connection based on a combination of factors, including one or more of: the QoS (e.g., 5QI) and/or flow ID of the Uu QoS flow to be relayed via the WTRU-to-NW relay; the access identities provided by upper layers (e.g., a remote WTRU may initiate a PC5-RRC connection with a relay WTRU following network access initiated by upper layers that is associated with an upper layer access identifier); the bearer configuration to be created to carry the relayed traffic, whether such configuration comprises of an end to end bearer configuration, PC5-RLC channel configuration between the remote WTRU and the WTRU-to-NW relay, and/or Uu-RLC channel configuration between the relay WTRU and the network; and/or, sidelink measurements/characteristics measured by the remote WTRU and/or measured by the relay WTRU and provided by the remote WTRU (e.g., in PC5-RRC signaling). For the sidelink measurement, the measurements include or may be one or more of: CBR; SL CQI; SL RSRP; and/or, SL Resource selection statistics (e.g., amount of available resources from sensing, number of successful sidelink resource selection procedures, where successful may be characterized by obtaining an amount of available resources without increasing thresholds).

In another approach, a remote WTRU that has a PC5-RRC connection to a relay WTRU may determine whether to establish/resume a Uu connection via the relay based on the one or more of the factors as described herein (e.g., above).

In another approach, a remote WTRU that has a PC5-RRC connection to a relay WTRU, and a Uu connection established via the relay WTRU may determine whether to request a new bearer, accept a new bearer configuration from the network, or initiate a new Uu service based on the one or more of the factors as described herein (e.g., above).

In some instances, there may be actions associated with failed access control. A WTRU may perform one or more of the following actions in the event that an access is deemed not allowed: indicate to upper layers that access to the cell is barred; perform relay reselection; initiate direct access to the cell via Uu; and/or, start a timer, during which the WTRU delays subsequent access attempts while the timer is running. For the timer scenario, when the timer expires, the WTRU may retry access (e.g., a specified number of times) or perform one of the alternative actions upon failed access control.

In some instances, access barring parameters may be determined based on information derived from sidelink by the remote WTRU and/or provided by the peer (e.g., relay) WTRU. A remote WTRU may determine one or more access barring parameters for Uu access via a relay WTRU based on information provided by the relay WTRU. The access parameters may include one or more of the following, and may each be associated with an access identity provide by upper layers: whether an access is barred at a given time; value of a barring timer; range over which to select a random number to determine the barring timer, or whether the access is allowed; the access category; and/or, the number of attempts before initiating an action associated with failed access control, as described herein.

A WTRU may determine one or more of the above access parameters based on one or more of the following derived by the remote WTRU or provided by the peer WTRU: SL CBR;

SL CQI; SL RSRP; buffer occupancy and/or flow control reports (e.g., this may include buffer occupancy associated with relaying data at the relay WTRU; e.g., this may include indication that one or more remote WTRUs should reduce their transmission rate); congestion control information at the relay WTRU (e.g., this may include the relay or remote WTRU indicating the limitation in transmission parameters such as the allowable maximum power, maximum number of SL resources, maximum number of repetitions, etc. that may be limited by CBR; this may include the relay or remote WTRU indicating that it is limited in any of its transmission parameters due to CBR; e.g., this may include the relay or remote WTRU indicating the actual CBR); number of relayed Uu connections, potentially which are active; and/or, reception of a PC5-RRC reject message from the relay WTRU (e.g., sidelink reconfiguration reject message in response to a sidelink reconfiguration message). The reception of PC5-RRC is described further herein.

In a demonstrative example scenario, a remote WTRU may be configured with a mapping of Uu 5QI to maximum allowable CBR. The WTRU may determine the maximum allowable CBR by which it can establish a PC5-RRC connection with the relay WTRU based on the smallest CBR associated with the 5QIs of each of the Uu QoS flows configured/initiated at the WTRU. If the measured CBR is smaller than the smallest associated CBR determined as described herein, the remote WTRU may initiate the PC5-RRC connection for relaying on the first approach above, the remote WTRU may initiate/resume a Uu RRC connection for the second approach above, the remote WTRU may accept a bearer reconfiguration or request a new bearer for the third approach above. Otherwise, the remote WTRU may inform upper layers that the service/cell is unavailable/barred, or the remote WTRU may attempt access via direct Uu connection resume/establishment, or the remote WTRU may reject a NW reconfiguration to add a bearer.

In a demonstrative example scenario, a remote WTRU may initiate a PC5-RRC connection with a relay WTRU following a NW access initiated by upper layers that is associated with an upper layer access identifier. For example, a remote WTRU may be configured with a mapping of upper layer access identity (e.g., used for traditional access barring) to maximum SL CBR. The remote WTRU may receive such information via from the network (e.g., via system information directly received on Uu or forwarded by the relay WTRU). If the measured SL CBR determined by the remote WTRU is smaller than maximum SL CBR configured for the access identifier, the WTRU may perform any of the actions associated with successful admission control in the previous example. Otherwise, the WTRU may perform any of the actions associated with failed admission control in the previous demonstrative example scenario.

In a demonstrative example scenario, a remote WTRU may be configured with a mapping of end-to-end bearer configuration (e.g., PDCP/SDAP only, and/or SL RLC channel configuration and/or Uu RLC channel configuration) and SL CBR. Such configuration may have been received by the WTRU directly from the network (e.g., via Uu) or via a relayed link (e.g., system information or dedicated configuration forwarded by the relay WTRU). Specifically, an end-to-end bearer configuration may contain a maximum allowable CBR. If the measured CBR is less than the maximum allowable CBR, the WTRU may perform any of the actions associated with successful admission control in the previous example. Otherwise, the WTRU may perform any of the actions associated with failed admission control in the previous demonstrative example scenario.

In a demonstrative example scenario, a remote WTRU may determine the value of a barring timer following a barred access based on the buffer occupancy/flow control information provided by the relay WTRU, which may include the number of active links, the relaying buffer occupancy, or similar flow control information.

In some situations, a relay WTRU may send a SL message (e.g., in response to a remote WTRU message) which limits Uu access by the remote WTRU via the relay. In one approach, a relay WTRU may send a message (e.g., via PC5-RRC or other protocol layer such as adaptation layer) to one or more remote WTRUs. A remote WTRU may, upon reception of such message, or condition associated with the information provided in such a message, determine that it may/may not: initiate/resume a PC5-RRC connection with a relay; release an existing PC5-RRC connection with a relay WTRU; initiate a Uu RRC connection directly via Uu; initiate a Uu RRC connection via the relay WTRU; initiate a request for a bearer; accept/reject a Uu bearer configuration received by the network; and/or, indicate to upper layers that any access to a cell.

A remote WTRU may maintain/remember such condition (e.g., that it may not initiate a Uu RRC connection via a relay WTRU) for a period of time, or until reception of another message from the relay (e.g., the same message where the condition associated with the information provided re-allows access).

A relay WTRU may send such SL message upon one or more of the following triggers: periodically, based on a number of active PC5-RRC connections (e.g., use for the purposes of relaying); based on the buffer status of buffers associated with relay traffic; based on its own access control status with the network; and/or, in response to PC5-RRC message from the remote WTRU, such as a sidelink reconfiguration message, a message initiating a relay connection, or a message initiating a Uu connection which is received by the relay WTRU (or contains encapsulated sidelink RRC information, as described here) (e.g., a relay WTRU may transmit a reject message (or similar message) in response to a sidelink reconfiguration message).

For the periodical trigger, in an example, a relay WTRU may be configured with a periodicity for transmission of such message. The period may further depend on aspects such as SL measurements (e.g., CBR, CQI, SL RSRP), QoS of one or more ongoing links, number of relay links, relaying buffer status, Uu measurements (e.g., RSRP, RSSI, SINR).

For the trigger based on the number of active PC5-RRC connections, active may comprise of one or more of the following: PC5-RRC connection established with a peer WTRU; PC5-RRC connection with a remote WTRU where the remote WTRU is in RRC_CONNECTED or possibly also RRC_INACTIVE; and/or, PC5-RRC connection with a remote WTRU where the data rate being/having been relayed over some time exceeds a threshold. For example, a remote WTRU may transmit such SL message when the number of active PC5-RRC connections exceeds a threshold, and/or goes below another (possibly different) threshold.

For the trigger based on the buffer status of buffers associated with relay traffic, in an example, a relay WTRU may be configured with a threshold buffer occupancy and may send such message when such threshold is exceeded and or when the occupancy goes below (possibly a different) threshold.

For the trigger based on its own access control status with the network, in an example, a relay WTRU may transmit such message when it the relay WTRU access to the network is barred, based on Uu access control. In another example, a relay WTRU may transmit such a message when it successfully accesses the network via Uu, possibly after an initial attempt which was barred.

The relay WTRU may include one or more of the following in the SL message: indication of whether the access is allowed/not allowed (e.g., status of the access control); timer to be used by the remote WTRU for Uu access barring; SL measurements, such as CBR, CQI, RSRP; and/or, buffer status.

In one or more embodiments described herein, the following may be and/or may occur: a WTRU receives relay sequencing/identification information from upper layers; a WTRU Linked through a relay may initiate two separate configuration procedures; a WTRU may initiate a SL RRC Configuration Procedure in response to reception of a Configuration message/procedure; a WTRU determines success of first procedure based on success of second procedure; a WTRU transmits/receives/forwards a configuration message containing configurations for other (multiple) WTRU(s); a WTRU may determine the value of a configuration timer based on the number of WTRUs along a relayed path; a WTRU may be configured with multiple SL-SRBs for transmission of SL RRC/PC5 messages to the same L2 Destination/Unicast Link depending on whether the unicast link is relayed or not; a WTRU may establish/enable a second SL-SRB or tear down the first SL-SRB depending on successful completion of a configuration procedure; a WTRU may perform receiving and/or forwarding SRB/LCH configuration; a WTRU may be configured with different security key(s) for a unicast link needed for relay operation; a WTRU may security protect different portions of an RRC message using the different keys; a WTRU may indicates to the Network whether a requested configuration is for relaying or not; a WTRU determines the configuration of the next hop of the relay to ensure end-to-end QoS; and/or, compensation of the range parameter over the hops of a relay may be determined.

In one or more embodiments described herein, the following may be and/or may occur: Conditions for establishing a Uu RRC connection via a WTRU to NW relay; Remote WTRU provides a WTRU ID to the relay which depends on the remote WTRU RRC/coverage state; Remote WTRU informs the relay WTRU of its Uu RRC state upon link establishment or change of Uu state; Relay WTRU Behavior upon receiving a change of state indication from the remote WTRU; Establishment of a Unicast Link for Relaying may trigger the relay to provide relay-related configuration; Conditions for triggering the release of one or more remote WTRUs by a relay WTRU; Relay WTRU prioritizes cell reselection to cells which allow maintenance of the remote WTRUs; and/or, Remote WTRU sends cell information (e.g., PLMN, barring, etc.) provided by a relay to upper layers.

In one or more embodiments described herein, the following may be and/or may occur: Remote WTRU configured with conditions for releasing a PC5-RRC connection while in Uu IDLE/INACTIVE; The trigger of connection establishment/resume upon reception of a PC5-RRC message may depend on factors concerning service continuity at the remote WTRU; Relay WTRU determines behavior/Uu RLC channel upon receiving first RRC message (e.g., SRB0) from remote WTRU; Connection establishment failure handling at the relay WTRU; Relay WTRU informs remote WTRU of mobility by the relay.

In one or more embodiments described herein, there may be one or more systems, methods, and/or devices that address wireless transmit receive unit (WTRU)-to-WTRU relay connection establishment and configuration. For example: a WTRU may receive relay sequencing/identification information from upper layers; a WTRU Linked through a relay may initiate two separate configuration procedures; a WTRU may initiate a SL RRC configuration procedure in response to reception of a Configuration message/procedure; a WTRU may transmit/receive/forward a configuration message containing configurations for other (multiple) WTRU(s); a WTRU may determine the value of a configuration timer based on the number of WTRUs along a relayed path; a WTRU may security protect different portions of an RRC message using the different keys; a WTRU may indicate to the Network whether a requested configuration is for relaying or not; and/or a WTRU may determine the configuration of the next hop of a relay to ensure end-to-end QoS.

In one or more embodiments described herein, there may be a method implemented by a relay wireless transmit receive unit (WTRU). The relay WTRU may receive a data transmission using a sidelink signal radio bearer (SL-SRB) from a remote WTRU, wherein the data transmission is received after a PC5-radio resource control (RRC) connection has been established with the remote WTRU. The relay WTRU may transmit a relay connection message to a gNB upon receiving the data transmission, wherein the relay connection message comprises a request for a establishing a new connection or a request to resume a connection between the relay WTRU and the gNB. In some instances, the relay connection message includes an indication that the relay connection message was caused by the remote WTRU. In some instances, the relay WTRU is in an IDLE or an INACTIVE state when the data transmission is received. The relay WTRU may receive a remote connection message from the remote WTRU, wherein the remote connection message comprises a request for establishing a new connection or a request to resume a connection, and encapsulating the remote connection message in the relay connection message, wherein the relay connection message transmission includes the encapsulated message. The relay WTRU may further receive a response message from the gNB indicating that the new connection is established or that the request to resume the connection was successful.

As described herein, a higher layer may refer to one or more layers in a protocol stack, or a specific sublayer within the protocol stack. The protocol stack may comprise of one or more layers in a WTRU or a network node (e.g., eNB, gNB, other functional entity, etc.), where each layer may have one or more sublayers. Each layer/sublayer may be responsible for one or more functions. Each layer/sublayer may communicate with one or more of the other layers/sublayers, directly or indirectly. In some cases, these layers may be numbered, such as Layer 1, Layer 2, and Layer 3. For example, Layer 3 may comprise of one or more of the following: Non Access Stratum (NAS), Internet Protocol (IP), and/or Radio Resource Control (RRC). For example, Layer 2 may comprise of one or more of the following: Packet Data Convergence Control (PDCP), Radio Link Control (RLC), and/or Medium Access Control (MAC). For example, Layer 3 may comprise of physical (PHY) layer type operations. The greater the number of the layer, the higher it is relative to other layers (e.g., Layer 3 is higher than Layer 1). In some cases, the aforementioned examples may be called layers/sublayers themselves irrespective of layer number, and may be referred to as a higher layer as described herein. For example, from highest to lowest, a higher layer may refer to one or more of the following layers/sublayers: a NAS layer, a RRC layer, a PDCP layer, a RLC layer, a MAC layer, and/or a PHY layer. Any reference herein to a higher layer in conjunction with a process, device, or system will refer to a layer that is higher than the layer of the process, device, or system. In some cases, reference to a higher layer herein may refer to a function or operation performed by one or more layers described herein. In some cases, reference to a high layer herein may refer to information that is sent or received by one or more layers described herein. In some cases, reference to a higher layer herein may refer to a configuration that is sent and/or received by one or more layers described herein.

Although features and elements are described above in particular combinations, one of ordinary skill in the art will appreciate that each feature or element can be used alone or in one or more combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer. Generally, as used herein a backslash "/" may indicate "and", "or", or "and/or".

What is claimed:

1. A method implemented by a relay wireless transmit receive unit (WTRU), the method comprising:
    determining one or more configurations, wherein the one or more configurations includes information relating to a sidelink radio link control (SL-RLC) channel;
    creating the SL-RLC channel between the relay WTRU and a remote WTRU based on the one or more configurations, wherein the SL-RLC channel is associated with a Uu bearer of the remote WTRU, and wherein the SL-RLC channel is created after a PC5-radio resource control (RRC) connection is established between the relay WTRU and the remote WTRU;
    receiving a first message using the SL-RLC channel from the remote WTRU:
    on a condition that the relay WTRU is in an IDLE state when the first message is received, transmitting a second message, wherein the second message comprises a request to establish a new connection between the relay WTRU and a network;
    on a condition that the relay WTRU is in an INACTIVE state when the first message is received, transmitting a third message, wherein the third message comprises a request to resume a previous connection between the relay WTRU the network; and
    sending the first message to the network using a radio link control (RLC) channel between the relay WTRU and the network based on a mapping between the Uu bearer and the RLC channel after the new connection is established or the previous connection is resumed between the relay WTRU and the network.

2. The method of claim 1, wherein upon establishing the Uu bearer, a packet data unit (PDU) is sent on the RLC channel on which a Signal Radio Bearer 0 (SRB0) is mapped, wherein the PDU is part of the first message.

3. The method of claim 1, further comprising receiving a response message from a base station of the network indicating that the new connection is established or that the request to resume the previous connection was successful.

4. The method of claim 1, wherein at least part of the first message is transmitted to a base station of the network.

5. The method of claim 1, wherein the relay WTRU acts as a cellular relay between the remote WTRU and the network.

6. A relay wireless transmit receive unit (WTRU), the relay WTRU comprising:
    a processor and
    a transceiver,
    the processor and transceiver are configured to determine one or more configurations, wherein the one or more configurations includes information relating to a sidelink radio link control (SL-RLC) channel;
    the processor and transceiver are configured to create the SL-RLC channel between the relay WTRU and a remote WTRU based on the one or more configurations, wherein the SL-RLC channel is associated with a Uu bearer of the remote WTRU, and wherein the SL-RLC channel is created after a PC5-radio resource control (RRC) connection is established between the relay WTRU and the remote WTRU;
    the processor and transceiver are configured to receive a first message using the SL-RLC channel from the remote WTRU:
    on a condition that the relay WTRU is in an IDLE state when the first message is received, the processor and transceiver are configured to transmit a second message, wherein the second message comprises a request to establish a new connection between the relay WTRU and a network;
    on a condition that the relay WTRU is in an INACTIVE state when the first message is received, the processor and transceiver are configured to transmit a third message, wherein the third message comprises a request to resume a previous connection between the relay WTRU the network; and
    the processor and transceiver are configured to send the first message to the network using a radio link control (RLC) channel between the relay WTRU and the network based on a mapping between the Uu bearer and the RLC channel after the new connection is established or the previous connection is resumed between the relay WTRU and the network.

7. The relay WTRU of claim 6, wherein upon establishing the Uu bearer, a packet data unit (PDU) is sent on the RLC channel on which a Signal Radio Bearer 0 (SRB0) is mapped, wherein the PDU is part of the first message.

8. The relay WTRU of claim 6, wherein the processor and transceiver are configured to receive a response message from a base station of the network indicating that the new connection is established or that the request to resume the previous connection was successful.

9. The relay WTRU of claim 6, wherein at least part of the first message is transmitted to a base station of the network.

10. The relay WTRU of claim 6, wherein the relay WTRU acts as a cellular relay between the remote WTRU and the network.

* * * * *